(12) United States Patent
Hardage

(10) Patent No.: US 9,829,590 B2
(45) Date of Patent: Nov. 28, 2017

(54) EXTRACTING SV SHEAR DATA FROM P-WAVE MARINE DATA

(71) Applicant: Board of Regents of the University of Texas System, Austin, TX (US)

(72) Inventor: Bob A. Hardage, Burnet, TX (US)

(73) Assignee: Board of Regents of the University of Texas System, Austin, TX (US)

(*) Notice: Subject to any disclaimer, the term of this patent is extended or adjusted under 35 U.S.C. 154(b) by 0 days.

(21) Appl. No.: 15/084,830

(22) Filed: Mar. 30, 2016

(65) Prior Publication Data
US 2016/0349390 A1 Dec. 1, 2016

Related U.S. Application Data

(63) Continuation of application No. 13/663,081, filed on Oct. 29, 2012, now abandoned, which is a continuation of application No. 13/413,562, filed on Mar. 6, 2012, now Pat. No. 8,325,559, which is a continuation-in-part of application No. 13/287,746, filed on Nov. 2, 2011, now Pat. No. 8,243,548, which is a continuation-in-part of application No. 13/217,064, filed on Aug. 24, 2011, now Pat. No. 8,164,979, which is a continuation of application No.
(Continued)

(51) Int. Cl.
*G01V 1/28* (2006.01)
*G01V 1/30* (2006.01)
*G01V 1/38* (2006.01)
*G01V 1/42* (2006.01)

(52) U.S. Cl.
CPC ............... *G01V 1/286* (2013.01); *G01V 1/38* (2013.01); *G01V 1/42* (2013.01); *G01V 2210/125* (2013.01); *G01V 2210/1297* (2013.01); *G01V 2210/1427* (2013.01); *G01V 2210/56* (2013.01)

(58) Field of Classification Search
CPC .......... G01V 1/286; G01V 1/284; G01V 1/38; G01V 1/42; G01V 2210/56; G01V 2210/1297; G01V 2210/1427; G01V 2210/125
USPC ............................ 367/21, 38, 43, 75; 702/16
See application file for complete search history.

(56) References Cited

U.S. PATENT DOCUMENTS

| | | |
|---|---|---|
| 4,393,488 A | 7/1983 | Gassaway et al. |
| 4,397,005 A | 8/1983 | Gassaway et al. |
| 4,472,794 A | 9/1984 | Chelminski |

(Continued)

OTHER PUBLICATIONS

International Preliminary Report on Patentability, Int'l App. No. PCT/US2012/062553, dated May 6, 2014, 5 pages.
(Continued)

*Primary Examiner* — Daniel L Murphy
(74) *Attorney, Agent, or Firm* — Becker Patent Law, LLC

(57) ABSTRACT

A system and method of processing seismic data obtained using a plurality of towed single-component receivers in a marine environment is described, the towed single-component receivers configured to measure compressional P waves. The method comprises retrieving seismic data from a storage device, the seismic data comprising P-P data and shear mode data, wherein the P-P data and shear mode data were both received at the towed single-component receivers configured to measure compressional P waves to generate the seismic data. The method further comprises processing the seismic data to extract SV-P shear mode data and generating shear mode image data based on the extracted shear mode data.

6 Claims, 40 Drawing Sheets

Related U.S. Application Data

12/870,601, filed on Aug. 27, 2010, now Pat. No. 8,040,754.

(56) References Cited

U.S. PATENT DOCUMENTS

| | | | |
|---|---|---|---|
| 4,596,005 | A | 6/1986 | Frasier |
| 4,660,674 | A | 4/1987 | Airhart |
| 4,766,574 | A | 8/1988 | Whitmore et al. |
| 4,794,573 | A | 12/1988 | Bell et al. |
| 4,803,669 | A | 2/1989 | Airhart |
| 4,817,062 | A | 3/1989 | De Buyl et al. |
| 4,870,625 | A | 9/1989 | Young et al. |
| 4,881,209 | A | 11/1989 | Bloomquist et al. |
| 5,010,976 | A | 4/1991 | Airhart |
| 5,154,254 | A | 10/1992 | Thompson et al. |
| 5,265,066 | A | 11/1993 | Svenning et al. |
| 5,410,517 | A | 4/1995 | Andersen |
| 5,610,875 | A | 3/1997 | Gaiser |
| 5,660,674 | A | 8/1997 | Saindon et al. |
| 5,742,560 | A | 4/1998 | Krebs |
| 5,995,905 | A | 11/1999 | Ikelle et al. |
| 6,018,496 | A | 1/2000 | Stanke et al. |
| 6,061,298 | A | 5/2000 | Madtson et al. |
| 6,094,401 | A | 7/2000 | Masak et al. |
| 6,128,580 | A | 10/2000 | Thomsen |
| 6,292,754 | B1 | 9/2001 | Thomsen |
| 6,351,991 | B1 | 3/2002 | Sinha |
| 6,488,117 | B1 | 12/2002 | Owen |
| 6,498,990 | B2 | 12/2002 | Hardage et al. |
| 6,556,921 | B1 | 4/2003 | Hardage et al. |
| 6,564,150 | B2 | 5/2003 | Gilmer et al. |
| 6,714,867 | B2 | 3/2004 | Meunier |
| 6,834,235 | B2 | 12/2004 | Muijs et al. |
| 7,035,737 | B2 | 4/2006 | Ren |
| 7,058,513 | B2 | 6/2006 | Gilmer et al. |
| 7,104,956 | B1 | 9/2006 | Christopher |
| 7,164,619 | B2 | 1/2007 | Robertsson et al. |
| 7,178,626 | B2 | 2/2007 | Matherne et al. |
| 7,286,938 | B2 | 10/2007 | Amundsen et al. |
| 7,336,561 | B2 | 2/2008 | Borresen |
| 7,418,349 | B2 | 8/2008 | Anders Robertsson et al. |
| 7,453,765 | B2 | 11/2008 | Ikelle |
| 7,466,626 | B2 | 12/2008 | Baaren |
| 7,577,061 | B2 | 8/2009 | Williamson et al. |
| 7,628,248 | B2 | 12/2009 | Wei et al. |
| 7,639,567 | B2 | 12/2009 | Sitton et al. |
| 7,664,603 | B2 | 2/2010 | Rosten et al. |
| 7,706,211 | B2 | 4/2010 | Bakulin et al. |
| 7,835,225 | B2 | 11/2010 | Sollner et al. |
| 7,894,298 | B2 | 2/2011 | Manen et al. |
| 8,040,754 | B1 | 10/2011 | Hardage |
| 2002/0163857 | A1 | 11/2002 | Bahorich et al. |
| 2003/0010565 | A1 | 1/2003 | Brooks et al. |
| 2003/0187583 | A1 | 10/2003 | Martin et al. |
| 2004/0076077 | A1 | 4/2004 | Robertsson |
| 2005/0090987 | A1 | 4/2005 | Amundsen et al. |
| 2006/0126433 | A1 | 6/2006 | Meldahl |
| 2006/0153005 | A1 | 7/2006 | Herwanger et al. |
| 2009/0052277 | A1 | 2/2009 | Swanson |
| 2010/0067325 | A1 | 3/2010 | Sun et al. |
| 2010/0085835 | A1 | 4/2010 | Tang et al. |
| 2010/0135114 | A1 | 6/2010 | Teague et al. |
| 2010/0139927 | A1 | 6/2010 | Bakulin et al. |
| 2010/0315903 | A1 | 12/2010 | Liang et al. |
| 2011/0130967 | A1 | 6/2011 | Bakulin et al. |

OTHER PUBLICATIONS

Extended European Search Report, App. No. 12844932.9; PCT/US2012062553, dated Jun. 3, 2016, 9 pages.

European search report, App. No. 13757294.7; PCT/US2013028908, dated Jun. 10, 2016, 9 pages.

El Allouche N., et al, "Acquiring shear-wave information in shallow water environment from field data near Ghent, Belgium," SEG Expanded Abstracts 27, 1278 (2008), pp. 1278-1282.

International-Type Search Report for Eurasian Patent Application No. 201390209 with English Translation, dated May 16, 2014, 2 pages.

International Search Report and Written Opinion for PCT/US2013/028908, dated Jun. 24, 2013, 7 pages.

Abstract Only—Borchardt, T. M., Key elements of regional seismic velocity models for long period ground motion simulations, Journal of Seismology, Apr. 2008, v. 12, No. 2, Springer Netherlands, pp. 217-221.

Abstract Only—Doherty, F., How 3DVSP has become a practical proposition, First Break, May 2004, issue 5, v. 22.

Abstract Only—Ma, X-Q., Global joint inversion for the estimation of acoustic and shear impedances from AVO derived P- and S-wave reflectivity data, First Break, Oct. 2001, issue 10, v. 19.

Abstract Only—Wathelet, M., et al. Array performances for ambient vibrations on a shallow structure and consequences over V's inversion, Journal of Seismology, Jan. 2008, v. 12, No. 1, Springer Netherlands, pp. 1-19.

Abstract Only—Wei, Z., et al., Harmonic distortion reduction on seismic vibrators, The Leading Edge, Mar. 2010, v. 29, No. 3, pp. 256-261.

Abstract Only—Winterstein, D. F., et al., Twelve years of vertical birefringence in nine-component VSP data, Geophysics, 2001, v. 66, issue 2, p. 582.

Aki et al., Plane Waves in Homogeneous Media and Their Reflection and Transmission at a Plane Boundary, Quantitative Seismology Theory and Methods, vol. 1, Chapter 5, cover pages and pp. 123-192 (37 pages).

DiSiena, J. P., et al., Three-component vertical seismic profiles—orientation of horizontal components for shear wave analysis, Tech. Paper S5.4, 1981, 51st Annual Meeting of Society of Exploration Geophysicists, pp. 1991-2011.

Guy, Evaluation of Near-Surface Converted-Mode Seismic Reflection Imaging Potential, Electronic Journal of Geotechnical Engineering, vol. 9, 2004, 35 pages.

Hardage et al., Defining P-Wave and S-Wave Stratal Surfaces with Nine-Component VSPs, The Leading Edge, Aug. 2003, 9 pages.

Hardage et al., Multicomponent Seismic Technology, Geophysical References Series 18, 2011.

Hardage, B. A. et al., Defining P-wave and S-wave stratal surfaces with nine-component VSPs, The Leading Edge, Aug. 2003, pp. 720-729.

Hardage, B. A., Vertical Seismic Profiling, Part A, Principles, Geophysical Press, 1983, v. 14A, pp. 307-315 [and cover page].

Hardage, B., Horizontal Wave Testing Helps, AAPG Explorer, 2009, v. 30, No. 12, pp. 26-27.

Hardage, B., Horizontal Wave Testing: Part 2, AAPG Explorer, 2010, v. 31, No. 1, pp. 32-33.

Hardage, B., Professional Summary dated Oct. 12, 2010, pp. 1-26.

Holvik, E., et al., Decomposition of multicomponent sea floor data into primary PP, PS, SP, and SS wave responses, Internet Citation, 1998, XP002234362, retrieved from website address: http://www.seg.org/meetings/past/seg1998/techprog/tecprogw.htm, retrieved on Mar. 7, 2003, figures 1-3.

Julian, Bruce A., et al., Non-Double-Couple Earthquakes, Review of Geophysics, 36, 4 / Nov. 1998, Paper No. 98RG00716, pp. 525-549.

Levin, F. K., Seismic velocities in transversely isotropic media, Geophysics, 1979, v. 44, pp. 918-936.

Levin, F. K., Seismic velocities in transversely isotropic media, II, Geophysics, 1980, v. 45, pp. 3-17.

Li, Y., et al., Imaging through Gas-Filled Sediments with Land 3C Seismic Data, EAGE 69th Conference & Exhibition, London, UK, Jun. 11-14, 2007, 5 pages.

Miller, G. F., et al., The field and radiation impedance of mechanical radiators on the free surface of a semi-infinite isotropic solid, Proc. Royal Society London, 1954, Series A, v. 223, pp. 521-541 [and cover page].

Robertson, J. D., et al., Radiation patterns of a shear-wave vibrator in near-surface shale, Geophysics, Jan. 1983, v. 48, No. 1, pp. 19-26.

(56) References Cited

OTHER PUBLICATIONS

Sena, A., Elastic Wave Propagation in Anisotropic Media: Source Theory, Traveltime Computations and Migration, Ph.D. Thesis, Department of Earth, Atmospheric, and Planetary Sciences, Massachusetts Institute of Technology; May 1992.

Sheriff, Encyclopedic Dictionary of Exploration Geophysics, Third Edition, Society of Exploration Geophysicists, Published 1991, 3 pages.

Tippee, B., Point of View: Multicomponent Seismic Work Seen At Crossroads, Oil and Gas Journal, vol. 109, issue 36, Sep. 5, 2011, 6 pages.

White, J. E., Underground Sound—Applications of Seismic Waves, Methods in Geochemistry and Geophysics, 18, 1983, Elsevier Science Publishers, pp. 208-209 [and cover page].

Yang, L., et al. Pure S-waves in land P-wave source VSP data, Applied Geophysics, Sep. 2007, vol. 4, No. 3, pp. 173-182.

Yang, L., et al. Pure S-waves in land P-wave source VSP data, Applied Geophysics, vol. 4, No. 3, Sep. 2007, pp. 173-182.

Yokoi, Numerical Study on the Generation of Downgoing S-Waves by a Vertical Force Acting Close to a Step-Like Topography, Geophysics, vol. 61, No. 1 (Jan.-Feb. 1996), pp. 192-201, 10 Figs.

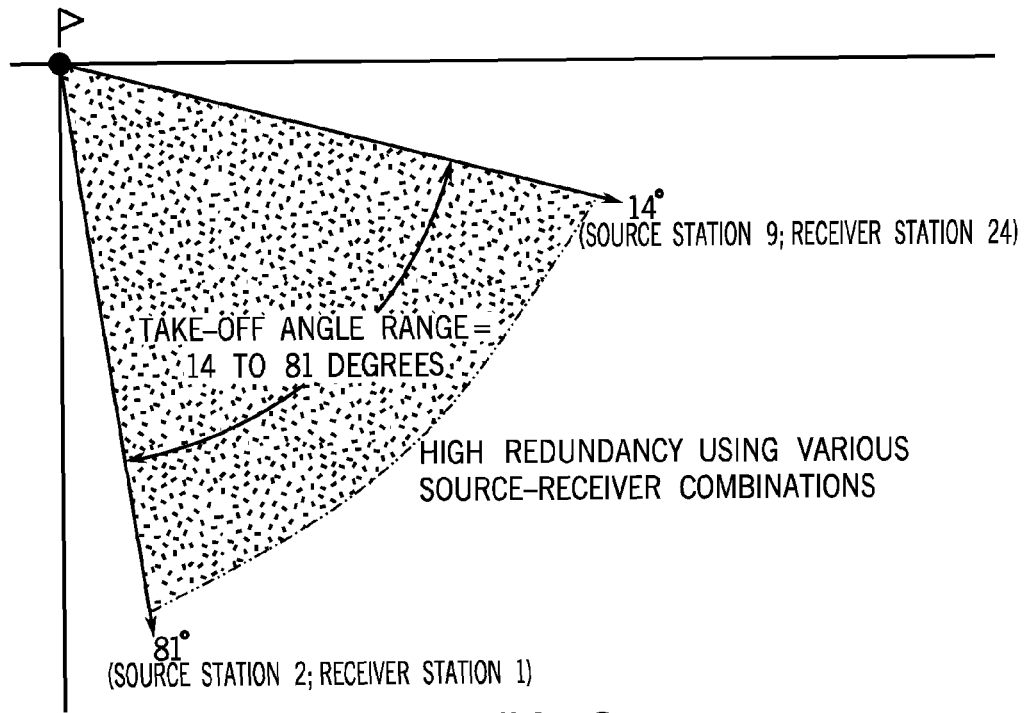
FIG. 9
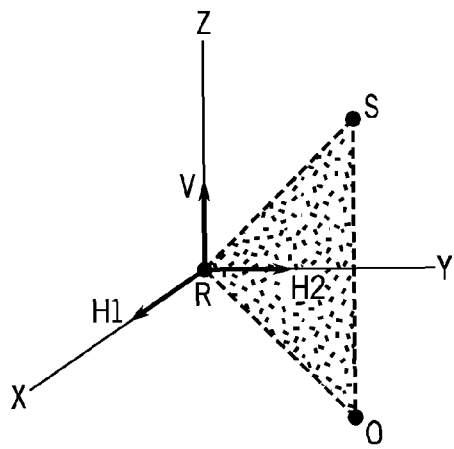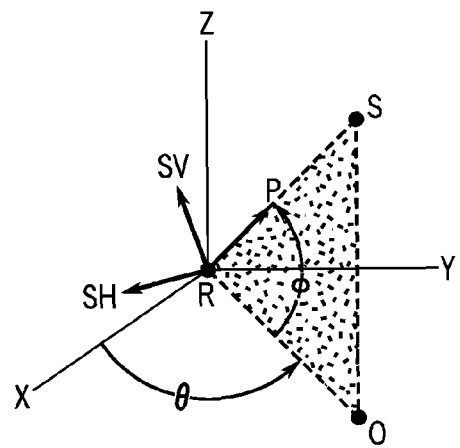
R RECEIVER    ROS VERTICAL PLANE PASSING THROUGH    SH NORMAL TO ROS PLANE
S SOURCE             SOURCE AND RECEIVER                 $\theta$ AZIMUTH ROTATION ANGLE
P POINTS AT S    SV IN VERTICAL ROS PLANE              $\phi$ INCLINATION ROTATION ANGLE
FIG. 10

| SV-P and P-SV Data Principles | | |
|---|---|---|
| | SV-P Data | P-SV Data |
| 1. Source | Vertical force | Vertical force |
| 2. Sensor | Vertical geophones | Horizontal geophones |
| 3. Image coordinate | Closer to source than to receiver | Closer to receiver than to source |
| 4. CCP binning profile | Mirror image of P-SV profile relative to CMP coordinate | Mirror image of SV-P profile relative to CMP coordinate |
| 5. Velocity analysis | Separate analyses for positive offset and negative offset | Separate analyses for positive offset and negative offset |
| 6. Reflection NMO velocity | Equals or appropriates P-SV NMO velocity | Equals or appropriates SV-P NMO velocity |
| 7. Data polarity | Same polarity for opposite-azimuth data | Opposite polarity for opposite-azimuth data |

FIG. 31

H1,H2 = HYDROPHONES  4C1, 4C4 = 4 COMPONENT SENSORS
RP1,RP2 = REFLECTION POINTS

A = SOURCE   B = VIRTUAL SOURCE   C = REFLECTION POINT
D = VIRTUAL RECEIVER OR SEAFLOOR RECEIVER   E = TOWED RECEIVER

| Option | Velocity of D | Velocity of U | Seismic image |
|---|---|---|---|
| 1 | $V_P$ | $V_P$ | P-P |
| $2^{(1)}$ | $V_P$ | $V_{SV}$ | P-SV |
| 3 | $V_{SV}$ | $V_P$ | SV-P |
| $4^{(1)}$ | $V_{SV}$ | $V_{SV}$ | SV-SV |
| $5^{(2)}$ | $V_{SH}$ | $V_{SH}$ | SH-SH |

(1) Requires a high-velocity surface if vertical single-component geophones are used; otherwise requires 3C geophones.
(2) Always requires 3C geophones.

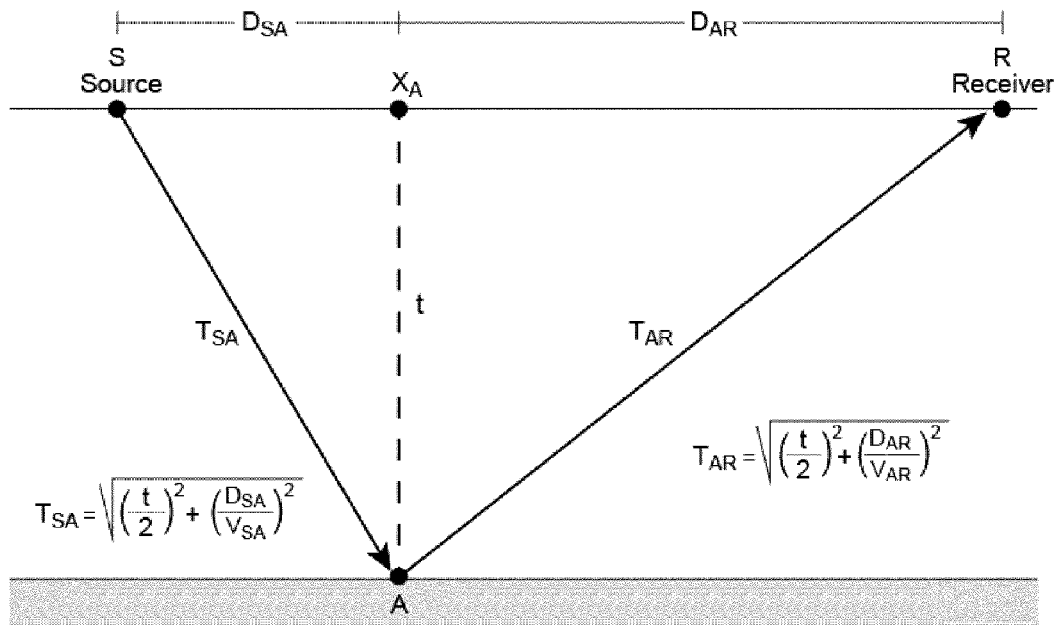

A = Image point
t = Image-trace time coordinate
$X_A$ = Image-trace coordinate
$D_{SA}$ = Horizontal distance from S to A
$D_{AR}$ = Horizontal distance from A to R
$T_{SA}$ = One-way time from S to A
$T_{AR}$ = One-way time from A to R
$V_{SA}$ = RMS velocity for downgoing mode at $(X_A, t)$
$V_{AR}$ = RMS velocity for upgoing mode at $(X_A, t)$
$T = T_{SA} + T_{AR}$ = Time coordinate of data sample placed at image coordinates $(X_A, t)$

FIG. 44

EXTRACTING SV SHEAR DATA FROM P-WAVE MARINE DATA

CROSS REFERENCE TO RELATED APPLICATIONS

This application is a continuation of U.S. application Ser. No. 13/663,081 filed Oct. 29, 2012, which is a continuation of U.S. application Ser. No. 13/413,562 filed Mar. 6, 2012, which is a continuation-in-part application of U.S. application Ser. No. 13/287,746, filed Nov. 2, 2011, which is a continuation-in-part application of U.S. application Ser. No. 13/217,064, filed Aug. 24, 2011 titled "System and Method for Acquisition and Processing of Elastic Wavefield Seismic Data," which is a continuation application of U.S. application Ser. No. 12/870,601, filed Aug. 27, 2010 titled "System and Method for Acquisition and Processing of Elastic Wavefield Seismic Data," both of which are incorporated by reference herein in their entireties.

BACKGROUND

The present application relates generally to systems and methods for seismic exploration, including the acquisition and/or processing of seismic data to estimate properties of the Earth's subsurface.

The principal type of data used to explore for oil and gas resources is seismic reflection data that image subsurface geology. There are three seismic wave modes that can be used for subsurface imaging—a compressional-wave (P) mode and two shear-wave modes (SV and SH). When geophysicists acquire seismic data that have all three of these modes, the data are called full elastic-wavefield data. Full elastic-wavefield data are acquired by deploying three separate orthogonal seismic sources at every source station across a prospect area. One source applies a vertical force vector to the Earth, a second source applies a horizontal force vector in the inline (X) direction, and a third source applies a second horizontal force vector in the crossline (Y) direction.

The wavefields produced by each of these three orthogonal-force sources are recorded by 3-component geophones that have orthogonal (XYZ) sensing elements. The resulting data are called 9-component data because they consist of 3-component data produced by three different sources that occupy the same source station in sequence, not simultaneously. Full descriptions and illustrations of the sources, sensors, and field procedures used to acquire full elastic-wavefield data can be found in Chapter 2, Multicomponent Seismic Technology, Geophysical References Series No. 18, Society of Exploration Geophysicists, authored by B. A. Hardage, M. V. DeAngelo, P. E. Murray, and D. Sava (2011). Vertical, single-component, surface-based geophones are used for the purpose of acquiring P-wave seismic data.

Marine seismic data are generated by an air gun source (e.g., an air gun array) towed a few meters (e.g., 3 to 15 m) below the sea surface. Data are recorded by a long cable (e.g., as long as 10 or 15 km) that has hydrophones spaced at intervals of a few meters (e.g., 10 to 20 m). Several of these hydrophone cables can be towed by the same boat that tows the air guns, or the source and the hydrophone cables can be towed by separate boats. Sometimes there are two cable boats moving along parallel tracks, maybe 6 or 8 km apart, and each towing 10 or more cables as long as 15 km that span a lateral distance of 1 to 2 km. In these modern long-offset, multi-azimuth marine surveys, there are 2 to 4 source boats stationed around the cable boats. The whole procedure involves a small armada moving at a slow speed with each boat performing its assignment with precise GPS positioning and atomic-clock timing. The amount of data recorded across a large survey area can be staggering.

Water has a shear modulus of zero, thus S waves cannot propagate in sea water. Because a marine source and receiver are in a water layer, marine seismic data are considered to be only P-wave data.

SUMMARY

A system and method of processing seismic data obtained using a towed receiver in a marine environment is described, the towed receiver configured to measure compressional P waves. The method comprises retrieving seismic data from a storage device, the seismic data comprising P-P data and shear mode data, wherein the P-P data and shear mode data were both received at the towed receiver configured to measure compressional P waves to generate the seismic data. The method further comprises processing the seismic data to extract SV-P shear mode data and generating shear mode image data based on the extracted shear mode data.

BRIEF DESCRIPTION OF THE DRAWINGS

FIG. 9 is a diagram illustrating takeoff angle apertures, according to an exemplary embodiment.

FIG. 10 is a diagram illustrating transformation of X, Y, Z receivers to P, SV, SH receivers, according to an exemplary embodiment.

FIG. 31 is a tabulation of some similarities and differences between SV-P and P-SV data, according to an exemplary embodiment.

FIG. 44 is an exemplary calculation used in prestack time migration of seismic data, according to an exemplary embodiment.

DETAILED DESCRIPTION OF EXEMPLARY EMBODIMENTS

Figure 1:
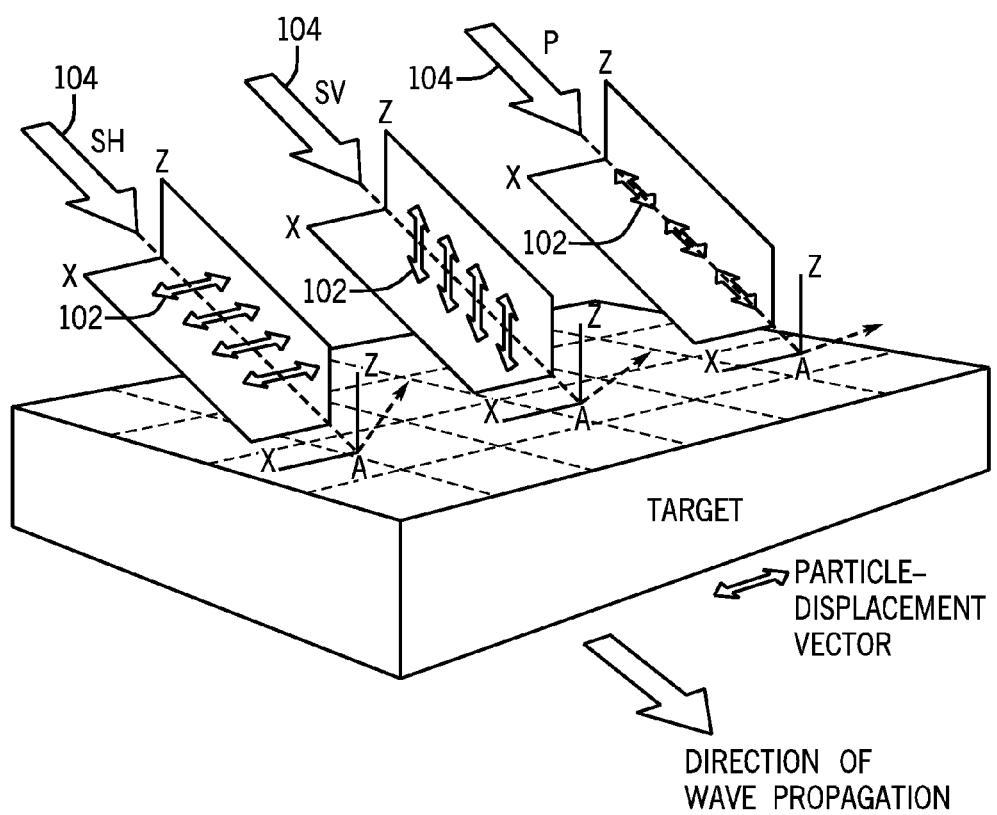
FIG. 1 is a diagram illustrating a full-elastic, multicomponent seismic wavefield propagating in a homogeneous Earth, according to an exemplary embodiment.

One or more embodiments described herein may provide a method by which full elastic-wavefield seismic data (P, SV and SH modes) can be acquired and processed using only one source, a vertical-force source. The embodiments may be simpler and lower-cost than using three orthogonal-force sources. The embodiments may be used in oil and gas exploration and exploitation, or any other activity where seismic reflection data are widely used. The embodiments may remove numerous technical, environmental, and cost barriers that limit applications of full elastic-wavefield seismic data.

One or more embodiments described herein may involve departures from conventional seismic data processing strategy.

One or more embodiments described herein may reduce the cost of acquiring complete elastic-wavefield seismic data. The daily rate for utilizing a single vertical-force source is less than the rates of deploying both a vertical-force source and a horizontal-force source to acquire equivalent data. Further, data may be acquired quicker by deploying a single source at each source station to create full elastic-wavefield data rather than deploying a vertical-force source and a horizontal-force source. The longer a contractor works to acquire data, the greater the cost of the data.

One or more embodiments described herein may provide the ability to acquire elastic-wavefield seismic data across a wider range of surface conditions, such as swamps, marshes, rugged mountain terrain, dense timber, and agricultural regions. Vertical-force sources can operate in a wide variety of surface terrains. For example, shot hole explosives can be used in swamps, marshes, heavy timber, or rugged mountains, all of which are places horizontal sources cannot be deployed at all, or at great cost because of site preparations. Vertical vibrators can be deployed in high-culture and residential areas without causing physical damage to buildings and infra-structure.

One or more embodiments described herein may provide a wider choice of seismic sources. There is a limited choice of horizontal-force seismic sources—such as heavy, horizontal vibrators or inclined-impact sources. The total number of horizontal vibrators across the world is small. The number of inclined-impact sources is less. More of each type of source could be manufactured if demand appears. In contrast, there are hundreds of vertical-force sources. The dominating classes of vertical-force sources are vertical vibrators (hundreds around the world) and shot hole explosives (available anywhere). Vertical-impact sources are few, but they too can be manufactured in mass if a market is created. For vertical seismic profile (VSP) data acquisition in remote areas (for example equatorial jungles), an air gun fired in a mud pit would be a vertical-force source. One or more embodiments described herein may allow geoscientists to select from a large menu of vertical-force sources: vertical vibrators, shot-hole explosives, vertical-impactors, or mud pit air guns.

Wave Components

Referring to FIG. 1, a full-elastic, multicomponent seismic wavefield propagating in a simple homogenous Earth is illustrated. Three independent, vector-based, seismic wave modes propagate in the Earth: a compressional mode, P, and two shear modes, SV and SH (FIG. 1). Each mode travels through the Earth at a different velocity, and each mode distorts the Earth in a different direction as it propagates. Double-headed arrows 102 are particle-displacement vectors indicating the direction in which each mode displaces the Earth. Arrows 104 illustrate a direction of wave propagation. Acquisition of the multicomponent modes results in full elastic-wavefield data. The orientations of the P, SV, and SH displacement vectors relative to the propagation direction of each mode are illustrated in FIG. 1.

The propagation velocities of the SH and SV shear modes may differ by only a few percent, but both shear velocities ($V_S$) are significantly less than the P-wave velocity ($V_P$). The velocity ratio $V_P/V_S$ can vary by an order of magnitude in Earth media, from a value of 50 or more in deep-water, unconsolidated, near-seafloor sediment to a value of 1.5 in a few dense, well-consolidated rocks.

Figure 2:
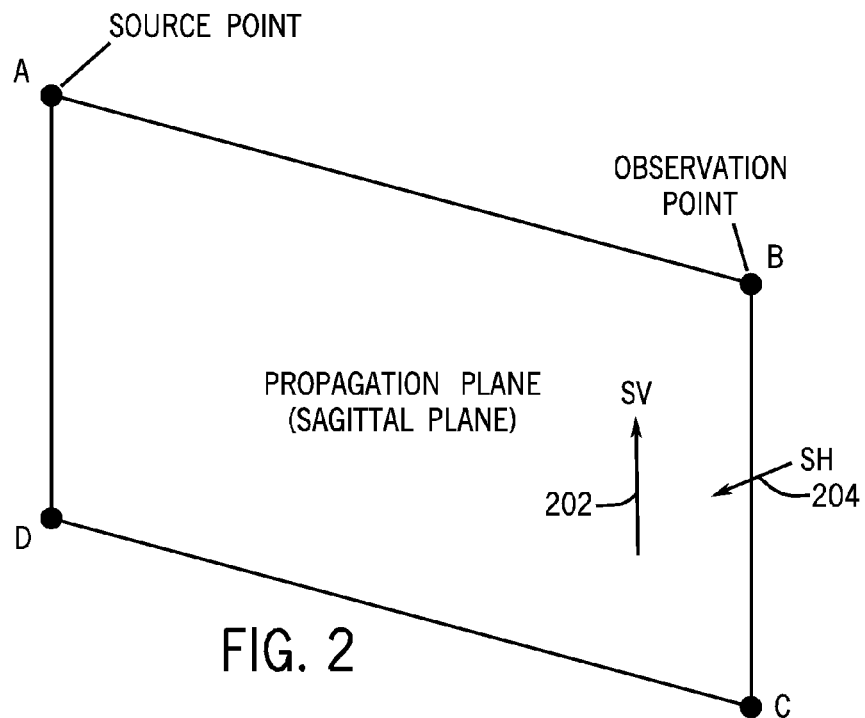
FIG. 2 is a diagram showing SH and SV shear wave displacements, according to an exemplary embodiment.

Referring to FIG. 2, an exemplary distinction between SH and SV shear modes is illustrated. SH and SV shear modes may be distinguished by imagining a vertical plane passing through a source station A and a receiver station B. SV vector displacement occurs in this vertical plane, as indicated at arrow 202; SH vector displacement is normal to the plane, as indicated at arrow 204. This vertical plane passing through the coordinates of a source station A, a receiver station B, and a reflection point C or D produced by that source-receiver pair may be called a sagittal plane or propagation plane.

Horizontal-Force Sources and SH/SV Illumination

Figure 3:
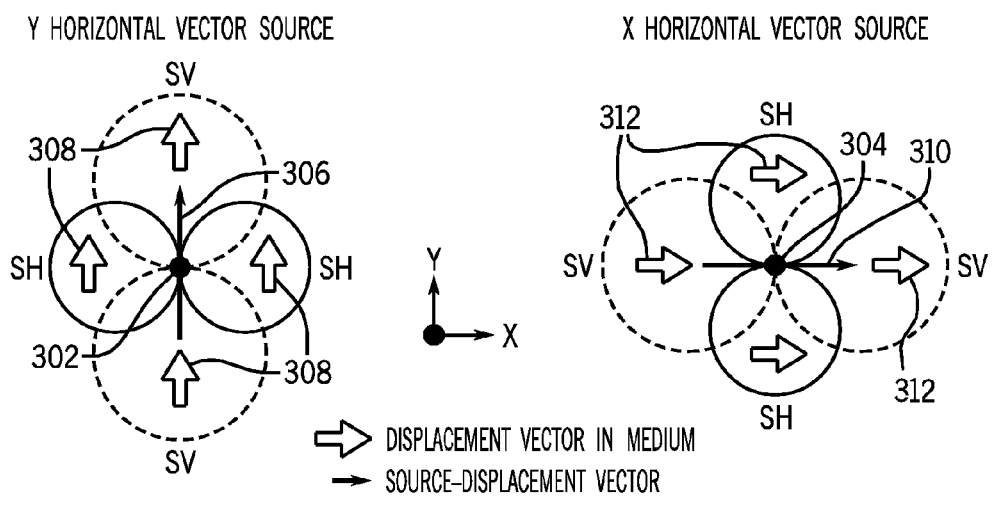
FIG. 3 is a map view of SH and SV illumination patterns for orthogonal (X and Y) horizontal-displacement sources.

Referring to FIG. 3, a map view of theoretical SH and SV radiation patterns produced by orthogonal horizontal-displacement sources 302, 304 will be described. Mathematical expressions that describe the geometrical shape of P, SV, and SH radiation patterns produced by seismic sources in an isotropic Earth are described by White (1983). Viewed from directly above the horizontal-displacement source, SV and SH modes propagate away from the source stations 302, 304 as expanding circles or ellipses. To simplify the graphic description, the patterns will be shown as circles. Because SV radiation from a horizontal-displacement source 302, 304 is usually more energetic than SH radiation, SV radiation circles are drawn larger than SH radiation circles. These circles indicate which parts of the image space each mode affects and the magnitude of the mode illumination that reaches each image coordinate. The relative sizes of these circles are qualitative and are not intended to be accurate in a quantitative sense.

A horizontal source-displacement vector 306 oriented in the Y direction (left side of figure) causes SV modes to radiate in the +Y and −Y directions and SH modes to propagate in the +X and −X directions. A horizontal source-displacement vector 310 oriented in the X direction (right side of figure) causes SV modes to radiate in the +X and −X directions and SH modes to propagate in the +Y and −Y directions. If a line is drawn from the source station 302, 304 to intersect one of these radiation circles, the distance to the intersection point indicates the magnitude of that particular mode displacement in the azimuth direction of that line. The orientation of the particle-displacement vectors 308 and 312 remains constant across the image space, but the magnitude of the SH and SV particle-displacement vectors vary with azimuth as shown by the SH and SV radiation circles on FIG. 3.

Figure 4:
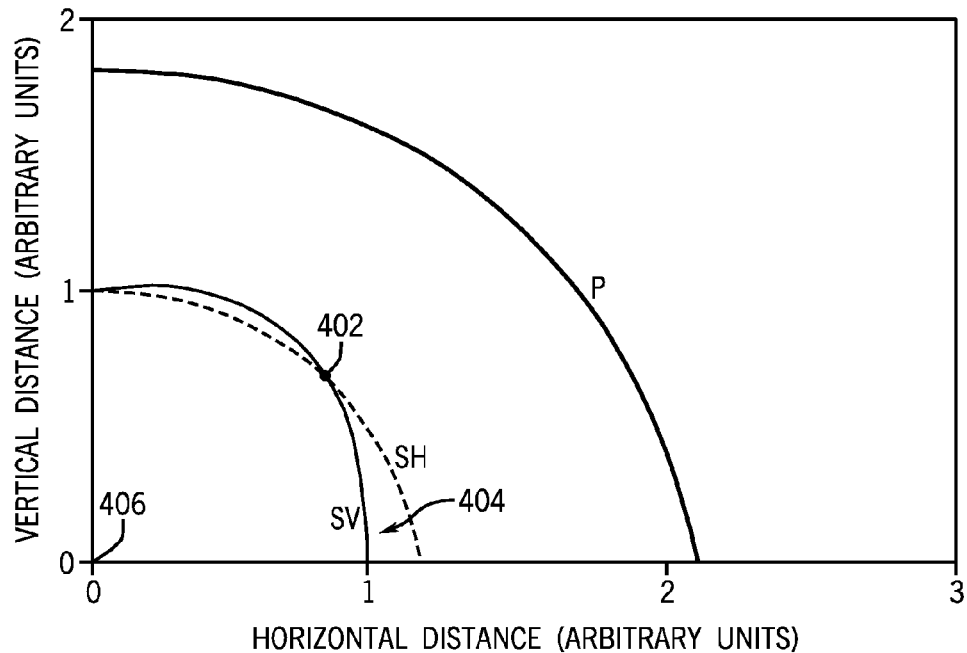
FIG. 4 is a comparison of SH, SV and P velocity behavior for elastic wave propagation in horizontally layered media.

Referring to FIG. 4, velocity behavior of SH and SV modes propagating through a layered Earth have been described by Levin, F., 1979, Seismic velocities in transversely isotropic media I: Geophysics, 44, 918-936 and Levin, F., 1980, Seismic velocities in transversely isotropic media II: Geophysics, 45, 3-17. The layered Earth is horizontally layered, vertical transverse isotropic (VTI) media. Note that at all take-off angles (except angle 402) SV and SH propagate with different velocities, with SH having a significantly faster velocity at shallow take-off angles (such as angle 404) from a source station 406. This wave physics will be useful when examining seismic test data described later.

Vertical-Force Sources and Direct-S Illumination

One type of source used in onshore seismic data acquisition applies a vertical displacement force to the Earth. Among these vertical-force sources are vertical weight droppers and thumpers, explosives in a shot hole, and vertical vibrators. Such sources are traditionally viewed as only P-wave sources, but they also produce robust S wavefields.

Figure 5:
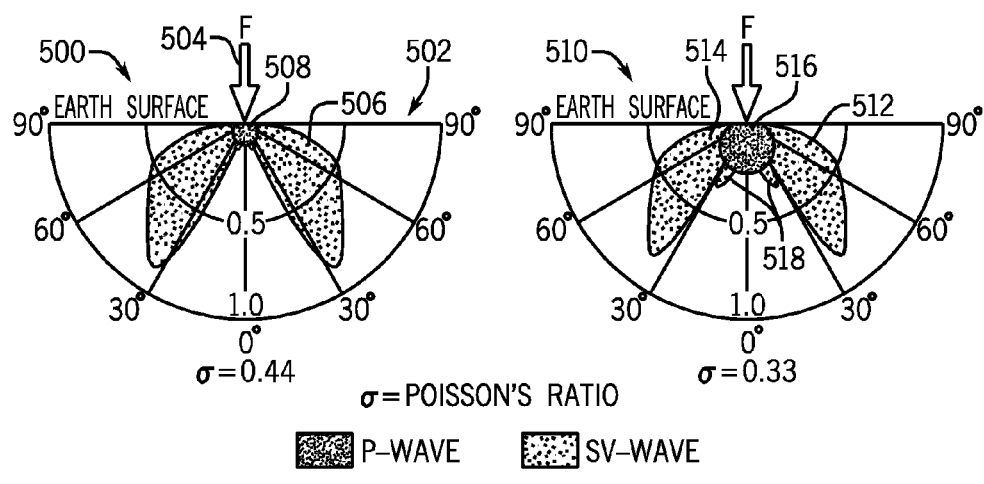
FIG. 5 is a cross-sectional view of a theoretical calculation of P and SV radiation patterns produced when a vertical force F is applied to the surface of the Earth, shown for two different values of the Poisson's ratio of the Earth layer, according to an exemplary embodiment.

Referring to FIG. 5, an illustration of a theoretical calculation, in cross-sectional views, is presented to illustrate how energy is distributed between P-wave and SV-shear mode radiation patterns when a vertical force is applied to an elastic half-space 502 from a vertical force source or vertical displacement source. See Miller, G., and H. Pursey, 1954, The field and radiation impedance of mechanical radiators on the free surface of a semi-infinite isotropic solid: Proc. Royal Soc. London, Series A, v. 223, p. 521-541 and White, J. E., 1983, Underground sound—applications of seismic waves: Elsevier Science Publishers. Calculations are shown for two different values of the Poisson's ratio of the Earth layer, with the first image 500 representing a Poisson's ratio of 0.44 and the second image 502 representing a Poisson's ratio of 0.33. This analysis focuses only on body waves and ignores horizontally traveling energy along the Earth-air interface. The semi-circles indicate the relative strength of the radiation. Radial lines define the take-off angle relative to vertical. In each model, more SV energy is generated than P energy.

The calculation of FIG. 5 shows that a vertical-force source 504 produces more SV energy 506 than P energy 508, and that at take-off angles of 20-degrees and more this direct-SV mode is significantly stronger than the P mode. This particular SV radiation may not result in a robust illumination of geology directly below the source station; whereas, its companion P radiation does. In order to take advantage of the direct-SV mode produced by vertical displacement onshore sources, two features can be implemented in data acquisition systems. First, three component (3C) geophones are used rather than single-component geophones. Second, longer recording times are used to accommodate the slower propagation velocity of the downgoing and upgoing direct-SV mode. For example, P-wave recording times of four seconds to six seconds may be extended to at least eight seconds or at least 12 seconds. Recording times for large offsets between source and receiver may be at least three times or at least four times the vertical travel time to the deepest target of interest. Modern seismic data acquisition systems can accommodate the long data-acquisition times required to image deep targets at far-offset receiver stations. A processing circuit within the data acquisition system may be configured to control the geophones or other receivers or sensors to listen or record received seismic data for at least a minimum recording time.

A definitive way to illustrate the P and direct-SV radiation produced by a vertical-displacement source is to analyze its downgoing wavefield using vertical seismic profile (VSP) data. One example of VSP data acquired in the Delaware Basin of New Mexico with a vertical vibrator used as a source is provided as FIG. 7A. The downgoing mode labeled SV is not a tube wave because it propagates with a velocity of approximately 2400 m/s (8000 ft/s), which is almost twice the velocity of a fluid-borne tube wave. The downgoing P and SV illuminating wavelets produced immediately at the point where this vibrator applies a vertical force to the Earth surface are labeled and extended back to the surface source station 700 to illustrate that an SV mode is produced directly at the source. The absence of data coverage across the shallowest 3000 ft of strata leaves some doubt as to where downgoing event SV is created, so a second example of VSP data produced by a vertical vibrator in a South Texas well is illustrated on FIG. 7B. Again this vertical-displacement source creates a robust direct-SV wavefield in addition to the customary P wavefield. In this example, the downgoing SV mode can be extended back to the source station at the Earth surface with confidence. In the case of FIG. 7B, the source was offset only 100 ft from the VSP well. The top diagram shows a vertical geophone response. The bottom diagram shows the response of a horizontal geophone.

Figure 7A:
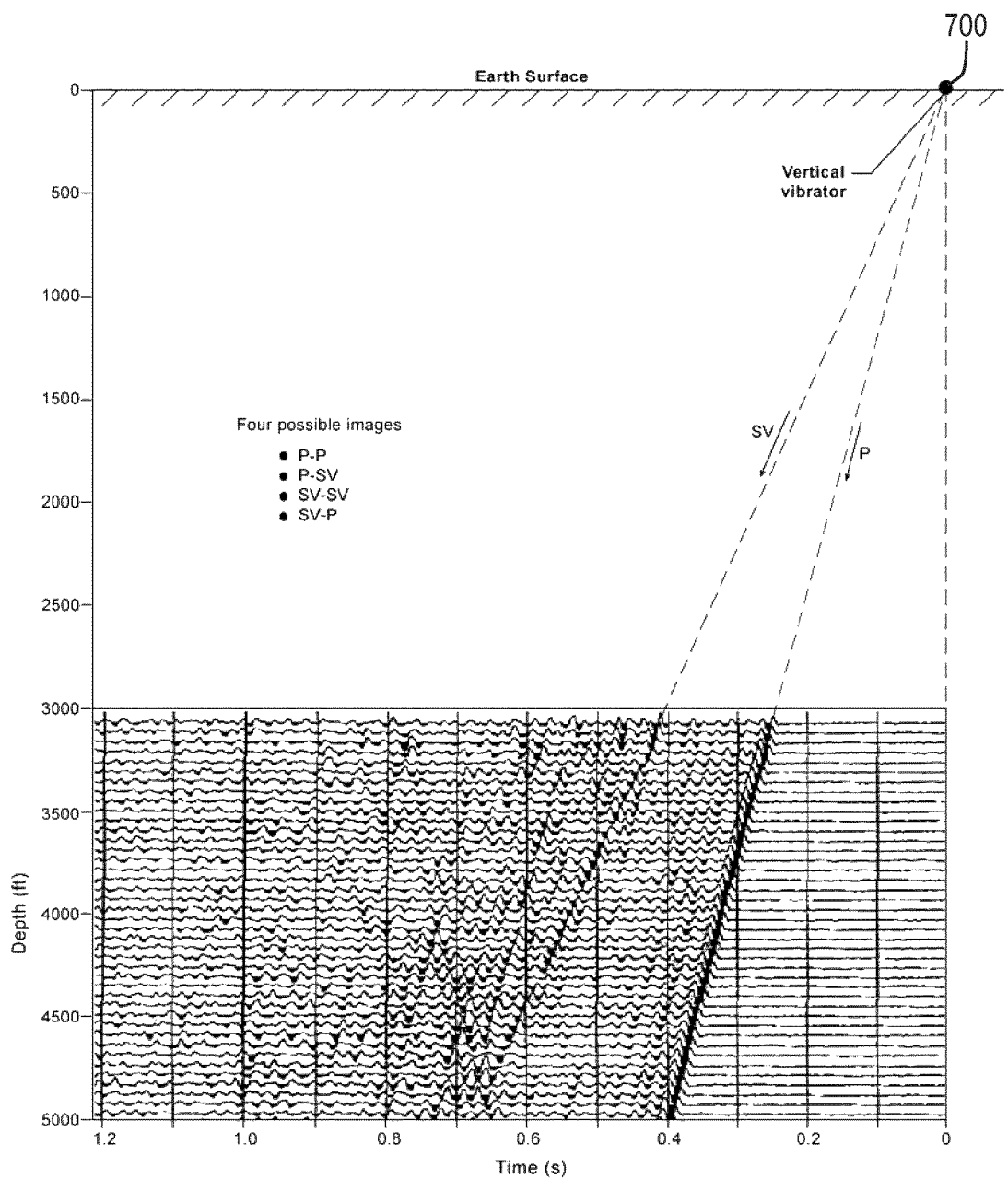
FIG. 7A is a chart of VSP data acquired using a vertical-displacement source, according to an exemplary embodiment.
Figure 7B:
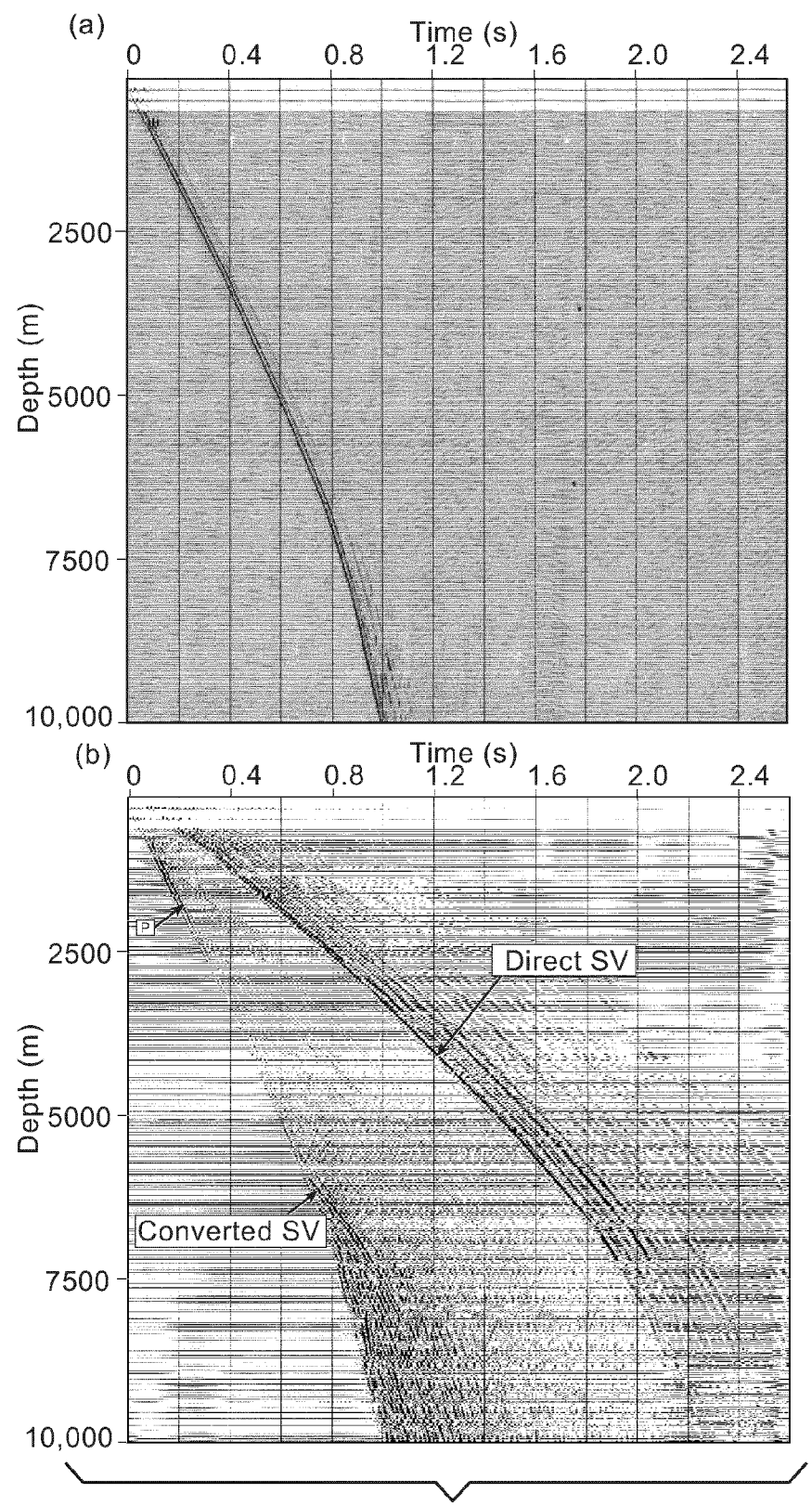
FIG. 7B is a chart of VSP data acquired using a vertical-displacement source, according to an exemplary embodiment.

The VSP data examples of FIGS. 7A and 7B show that a vertical vibrator is an efficient producer of direct-SV radiation and creates an SV-SV mode that can be utilized. An explosive shot also applies a vertical-displacement force to the Earth and generates a direct-SV mode.

The SV mode exhibited by the data in FIGS. 7A and 7B is produced at the same Earth coordinate as the P mode and is a source-generated direct-SV wave. The propagation medium at this location has unusually low $V_P$ and $V_S$ velocities. The SV mode produces a large population of upgoing SV reflections that are observable in these raw, unprocessed data.

The term "SV" is used above to describe the S-wave radiation. However, as will be seen below, the term "SV" should be replaced with the broader term "S", meaning the radiated S-wave energy is both SV and SH when the radiation is considered in a 3D context rather than as a single vertical profile.

Figure 6A:
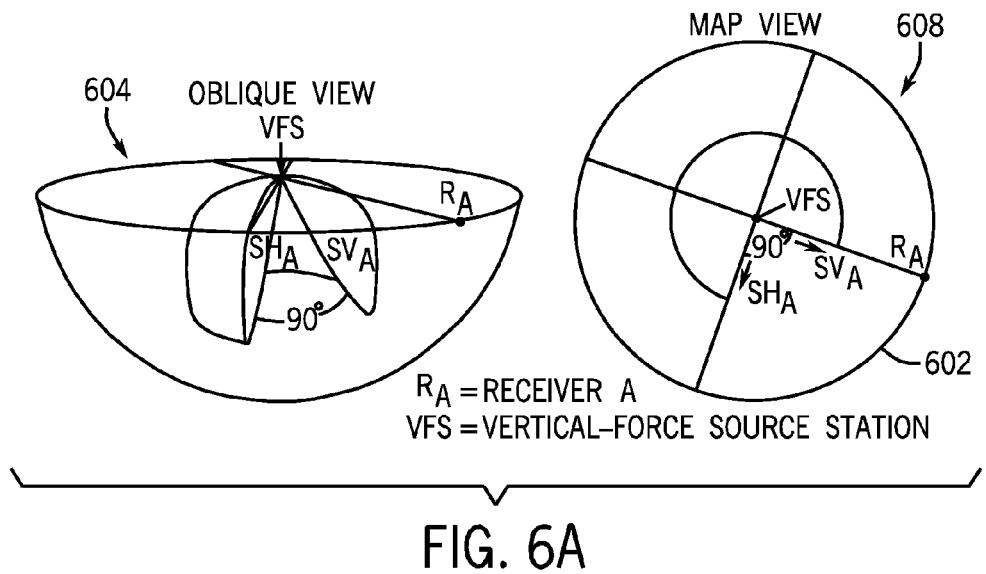
FIGS. 6A and 6B show an S-wave radiation pattern from FIG. 5 displayed as a 3D object, according to an exemplary embodiment.
Figure 6B:
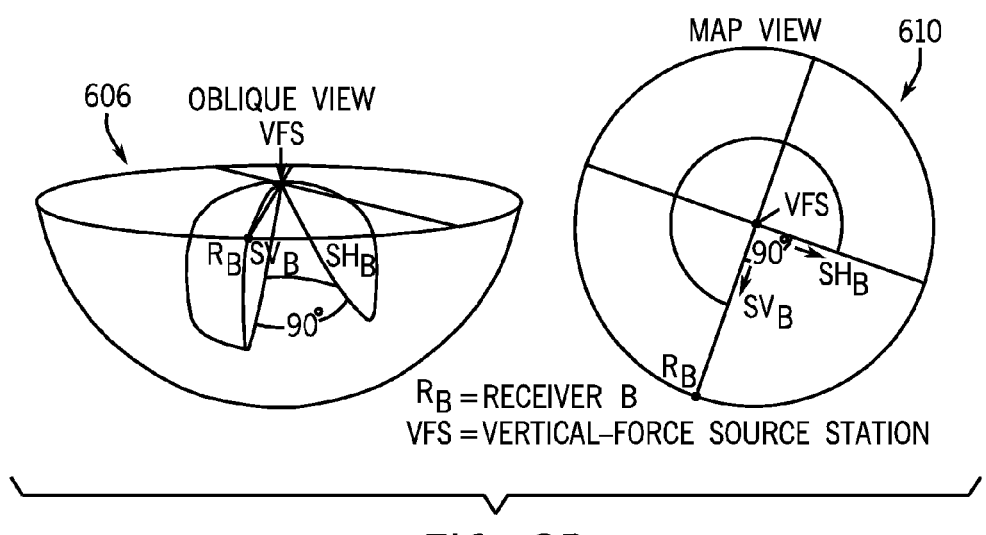

To illustrate the principle that S-wave radiation produced by a vertical-force source consists of both SV and SH modes, the pattern displayed on the right of FIG. 5 is converted to a 3D object and displayed as FIGS. 6A and 6B. For ease of understanding, the 3D radiation pattern is simplified to contain only the major S lobe 512, 514 shown in FIG. 5. Both the P-wave component 516 and the smaller secondary S lobe 518 seen on FIG. 5 are omitted. The solid is further altered by removing a 90-degree section 602 to allow better viewing of the 3D geometry by which S energy spreads away from the vertical-force source station VFS.

In FIG. 6A, SV and SH planes and displacement vectors are shown relative to a receiver station $R_A$. In FIG. 6B, SV and SH planes and displacement vectors are drawn relative to a receiver station $R_B$. These two arbitrary receiver stations $R_A$ and $R_B$, separated by an azimuth of 90 degrees, are positioned on the Earth surface around a station VFS where a vertical-force source is deployed. Oblique views and map views are shown of a vertical plane passing through the source station and each receiver station. As discussed for FIG. 2, this source-receiver plane is the SV plane for each receiver station. For each receiver, an SH plane is also shown perpendicular to each SV plane. The SH plane for receiver $R_A$ is the SV plane for receiver $R_B$, and inversely, the SH plane for receiver $R_B$ is the SV plane for receiver $R_A$. Regardless of where a receiver station is positioned in azimuth space away from a vertical-force station, both SV and SH modes will propagate to that station. SH shear information is available as is SV shear information when vertical-force source data are acquired.

Field Test

The Exploration Geophysics Laboratory (EGL) at the Bureau of Economic Geology initiated a field-test program to quantify the geometrical shapes and relative strengths of compressional (P)-wave and shear (S)-wave modes produced by a variety of seismic sources. The first test program was done at the Devine Test Site owned by The University of Texas at Austin and managed by EGL researchers. Sources deployed for this initial test were: 1-kg package of explosive positioned at a depth of 20 ft, a horizontal vibrator, a vertical vibrator, and an accelerated-weight that impacted the Earth vertically and at inclined angles.

Source-Receiver Geometry

Figure 8:
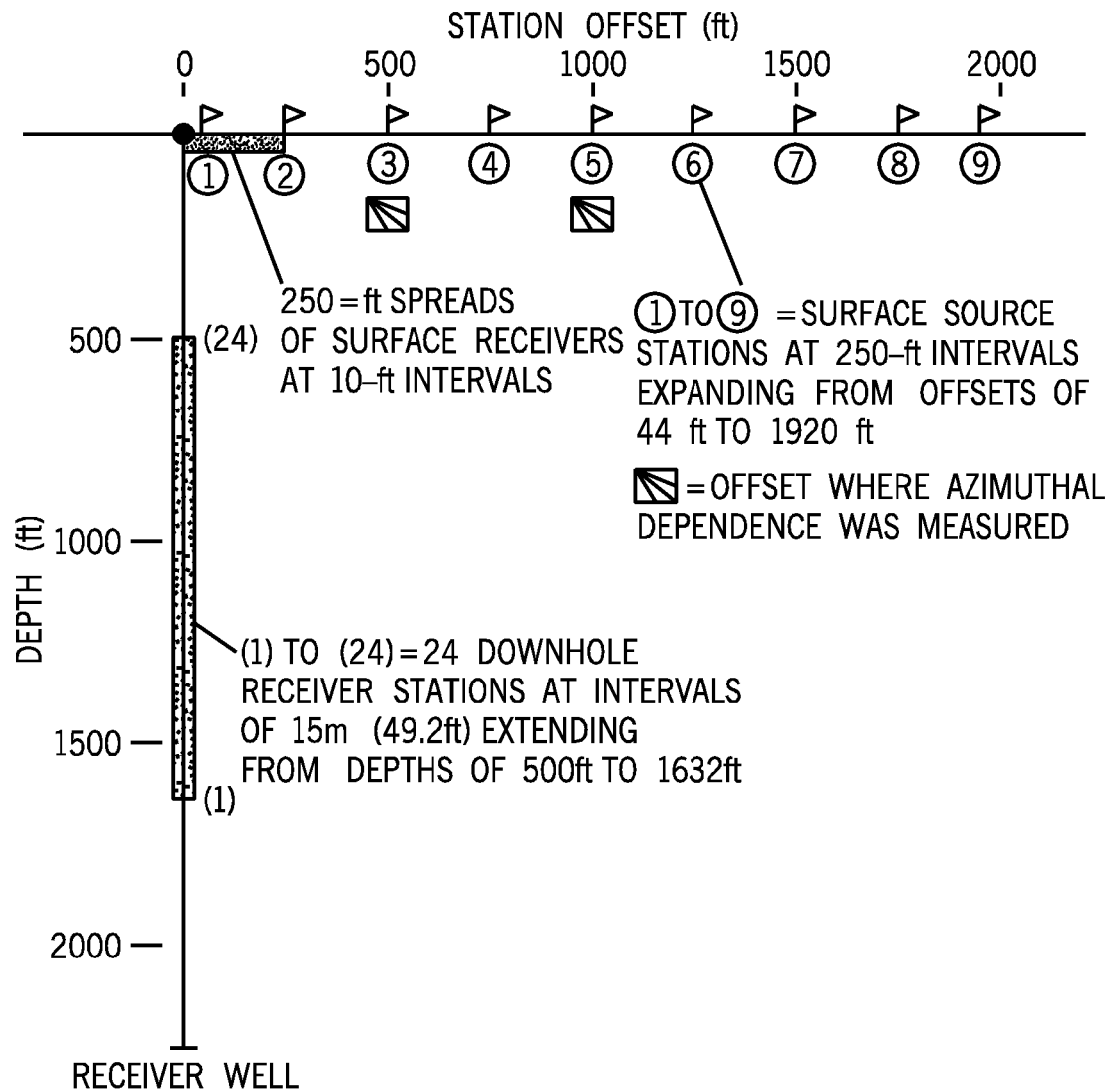
FIG. 8 is a diagram showing a source-receiver geometry used to analyze P and S radiation patterns emitted by seismic sources, according to an exemplary embodiment.

Referring to FIG. 8, an illustration of the source-receiver geometry is shown. The source-receiver geometry used to evaluate P and S source radiation patterns combined the concepts of horizontal wave testing (involving only a horizontal receiver array) and vertical wave testing (involving only a vertical receiver array) as described by Hardage, B. A., 2009, Horizontal wave testing: AAPG Explorer, v. 30, no. 12, p. 26-27 and Hardage, B. A. 2010, Vertical wave testing: AAPG Explorer, v. 31, no. 1, p. 32-33. A 24-station vertical array of three-component geophones was deployed in a selected test well, with receiver stations spanning a depth interval extending from 500 to 1632 ft (FIG. 8). Three-component (3C) geophones are configured to acquire all three dimensions of a full elastic wave. Several 25-station horizontal arrays of 3C sensors spaced 10 ft apart spanned the offset range 0 to 250 ft immediately next to the receiver well. Source stations were offset from the well at intervals of 250 ft, the linear dimension of the horizontal surface-receiver arrays.

Vertical Aperture

Referring to FIG. 9, an approximation of the aperture range created by the source-receiver geometry is shown. Downgoing P and S modes were recorded over a wide aperture of vertical takeoff angles (14 degrees to 81 degrees in this example) from the surface source stations to define the geometrical shape of P and S radiation patterns in section view. The shallowest takeoff angle involved data generated at source station 9 (offset 1920 ft) and recorded at downhole receiver station 24 (depth of 500 ft). The steepest takeoff angle involved source station 2 (offset 250 ft) and downhole receiver station 1 (depth of 1632 ft). A first approximation of the aperture range created by the source-receiver geometry can be created by assuming straight raypaths from source to downhole receiver, which yields the result shown in FIG. 9. In actual wave propagation, raypaths are curved as dictated by refractions at interfaces between velocity layers. Raypaths refract (bend) when they advance from an Earth layer having velocity V1 into a layer having velocity V2. Raypath curvature can be calculated if velocity layering is known. Straight raypath assumptions are used to explain the principles described with reference to FIG. 9.

Transforming VSP Data to Wave-Mode Data

In a vertical well, azimuth orientations of X,Y horizontal geophones deployed by twisted-wire cable differ at each downhole station because of receiver-module spin. As a result, phase shifts and amplitude variations introduced into data by station-to-station variations in receiver orientation do not allow individual events or distinct wave modes to be recognized, particularly S-wave events that tend to dominate horizontal-sensor responses. In this case, receivers are mathematically oriented to specific azimuths and inclinations to define downgoing and upgoing P and S modes.

Referring to FIG. 10, a graphical description of the transformation of receivers from X, Y, Z data space to P, SV, SH data space is shown. Transformations of borehole receivers from in situ X, Y, Z orientations to a data space where receivers are oriented to emphasize P, SV, and SH events have been practiced in vertical seismic profiling (VSP) technology. DiSiena, J. P., Gaiser, J. E., and Corrigan, D., 1981, Three-component vertical seismic profiles—orientation of horizontal components for shear wave analysis: Tech. Paper S5.4, p. 1990-2011, 51$^{st}$ Annual Meeting of Society of Exploration Geophysicists. Hardage, B. A., 1983, Vertical seismic profiling, Part A, principles: Geophysical Press, 450 pages (The VSP Polarization Method for Locating Reflectors, pages 307-315). Examples of this receiver orientation procedure applied to vertical-impact, shot-hole explosive, and vertical-vibrator sources at selected source stations are illustrated on FIGS. 11, 12, and 13, respectively. Data windows spanning 100 ms immediately following the onset of interpreted P-wave direct arrivals were used to determine azimuth and inclination angles $\theta$ and $\Phi$ (FIG. 10) at each receiver station.

FIG. 10 illustrates a 2-step rotation of coordinate axes to determine directional angles from a subsurface receiver to a surface-positioned seismic source. When a 3-component sensor is lowered several hundreds of feet down a well, the azimuth orientations of horizontal sensors are not known because the receiver package rotates on the twisted wire cable used for deployment. As a consequence, P, SH, and SV modes are intermingled on each sensor response because sensors are not oriented in the directions of P, SV, and SH particle displacements. Therefore, each subsurface receiver is mathematically oriented so that one sensor points directly along the raypath of the downward traveling P wave from a surface source. Once such rotation is done, the sensor pointing at the source is dominated by P data, the second sensor in the same vertical plane as the P sensor (this vertical plane passes through the source and receiver stations) is dominated by SV, and the third sensor (perpendicular to this vertical plane) is dominated by SH. Two angles—a horizontal rotation angle $\theta$ and a vertical rotation angle $\Phi$—have to be determined to achieve this sensor orientation.

To determine horizontal azimuth angle $\theta$ (FIG. 10), data are analyzed in a short time window spanning only the downgoing P-wave first arrival from the source. Only responses of the two horizontal sensors X and Y are analyzed in this first rotation step. Data acquired by sensors X and Y are mathematically transformed to responses that would be observed if these two orthogonal sensors were rotated to new coordinate axes that are successively incremented by one-degree of azimuth. This rotation is done 180 times to create sensor responses that allow the sensor axes to point over an azimuth range of 180 degrees from the unknown azimuth in which the sensors actually point. When sensor X is positioned in the vertical plane passing through the receiver and the source, the response of the X sensor will be a maximum, and the response of the Y sensor will be a minimum. When this maximum-X and minimum-Y response is found, the angle between the in situ sensor axes and the desired rotated axes that isolate P, SV, and SH wave modes is $\theta$.

To determine inclination angle $\Phi$ (FIG. 10), the sensor responses after transforming the data to coordinate axes oriented in azimuth $\theta$ are then analyzed in the short data window spanning only the downgoing P-wave first arrival, as defined in this new data-coordinate space. Data from only sensor Z (vertical) and from the new X sensor that has been rotated into the vertical source-receiver plane are used in this second rotation. In this second axis rotation, these two sensor responses are mathematically transformed to responses that would be observed if these two sensors were tilted in successive inclinations of one degree of tilt over a tilt range of 90 degrees. When the Z receiver is pointing in the direction of the incoming P-wave first arrival, its response will be a maximum, and the companion sensor in the same vertical plane (the new rotated and tilted X sensor) response will be a minimum. When this condition is found, angle $\Phi$ has been defined.

Data transformed to this second coordinate system defined by an azimuth rotation of $\theta$ and an inclination angle of $\Phi$ have optimal separation of P, SV, and SH modes, with P, SV, and SH being the dominant data on the rotated and tilted Z, X, and Y sensors, respectively.

Figure 11:
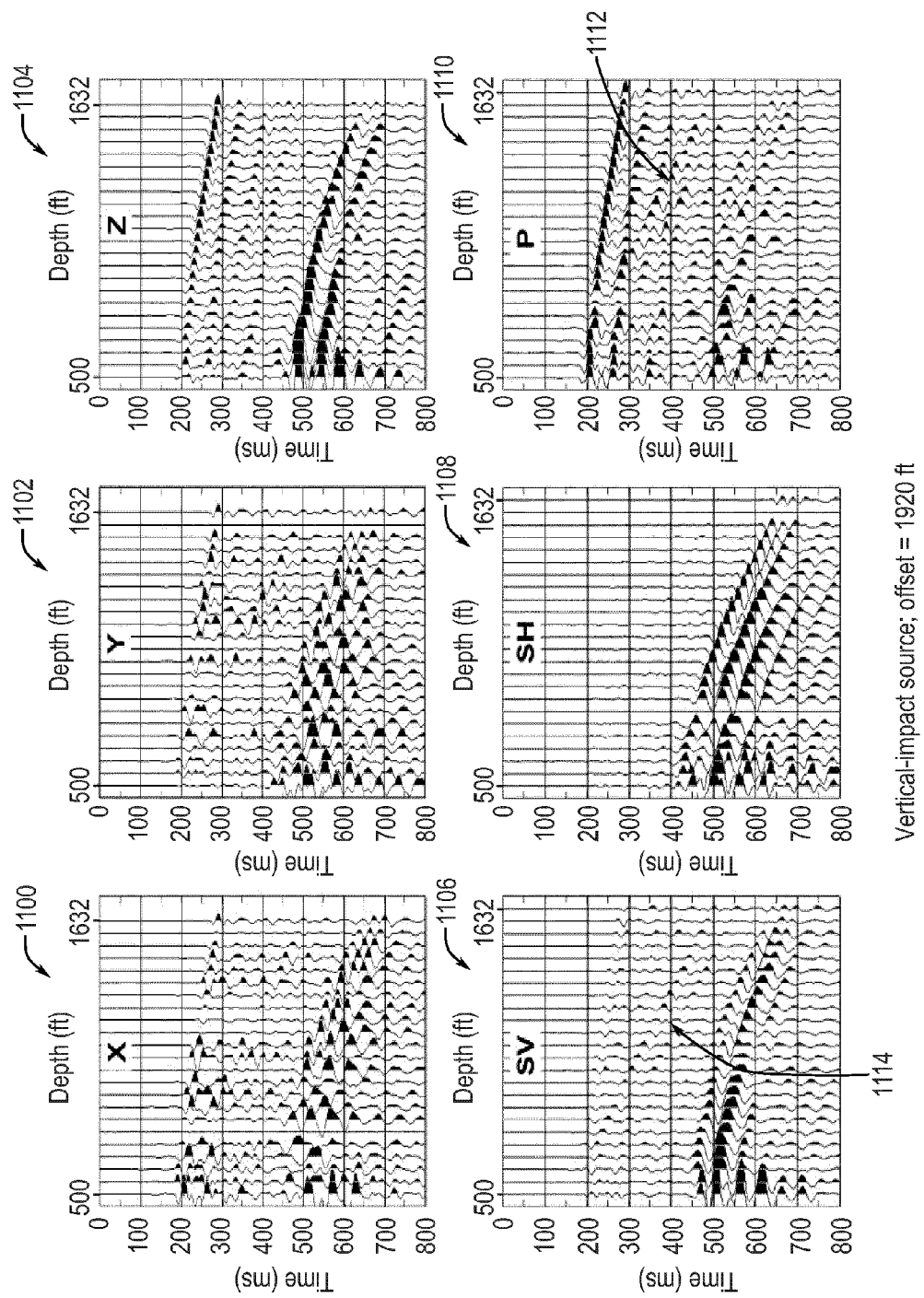
FIG. 11 is a set of charts showing example X, Y, Z data acquired with a vertical array from a vertical-impact source, and corresponding data rotated to P, SV and SH data space, according to an exemplary embodiment.

Referring to FIG. 11, charts 1100, 1102 and 1104 illustrate X, Y, Z data acquired at the Devine Test Site with the vertical receiver array when a vertical-impact source was positioned at source station 9, offset 1920 ft from the receiver array. Charts 1106, 1108 and 1110 illustrate the same data rotated to P, SV, SH data space. No P or SV events appear on the SH data panel. Because SH displacement is orthogonal to both P and SV displacements, the absence of P and SV events defines SH data. SV events appearing on the P data panel such as the event shown at 1112 are downgoing P-to-SV conversions. Downgoing P-to-SV conversions are caused only by non-normal incidence of a P wave on an impedance contrast interface. P and SV modes exchange energy freely when reflecting and refracting at interfaces because the displacement vectors of these two modes are in the same vertical plane. Neither P nor SV can convert energy to SH, and conversely SH can not convert into P or SV, because SH displacement is orthogonal to the vertical plane in which P and SV propagate. To confirm that a data panel is an SH mode, we search for evidence of P and SV events embedded in the data panel. If no P or SV events can be identified, the mode is pure SH, by definition. Note at shallow take-off angles (top 4 or 5 receiver stations), SH waves travel faster than SV waves as predicted by Levin (1979, 1980), supra, and measured by Robertson, J. D. and D. Corrigan, 1983, Radiation patterns of a shear-wave vibrator in near-surface shale: Geophysics, 48, 19-26.

SV waves produced directly at the source means SV waves are generated exactly at the point where a vertical force is applied to the Earth. There does not have to be an impedance-contrast interface close to the source to cause SV to come into existence. SV will propagate away from a vertical-force source even in a thick, homogeneous medium in which there are no interfaces.

In contrast, P-to-SV conversions occur only at interfaces where there is an impedance contrast. Any time a P-wave arrives at an interface at any incident angle other than 0 degrees (normal to the interface), some of the illuminating P energy converts into reflected and refracted P, and some converts into reflected and refracted SV. Thus P-to-SV conversion occurs at interface coordinates remote from a source, not directly at the source point. A converted SV mode requires two conditions be present: 1) an interface across which there is a contrast in acoustic impedance, and 2) a P-wave raypath arriving at that interface at an angle that is not normal to the interface. When the incident angle is 0 degrees (raypath perpendicular to the interface), the P-to-SV reflection coefficient is zero. At other incident angles, the P-SV reflection coefficient is non-zero.

Figure 12:
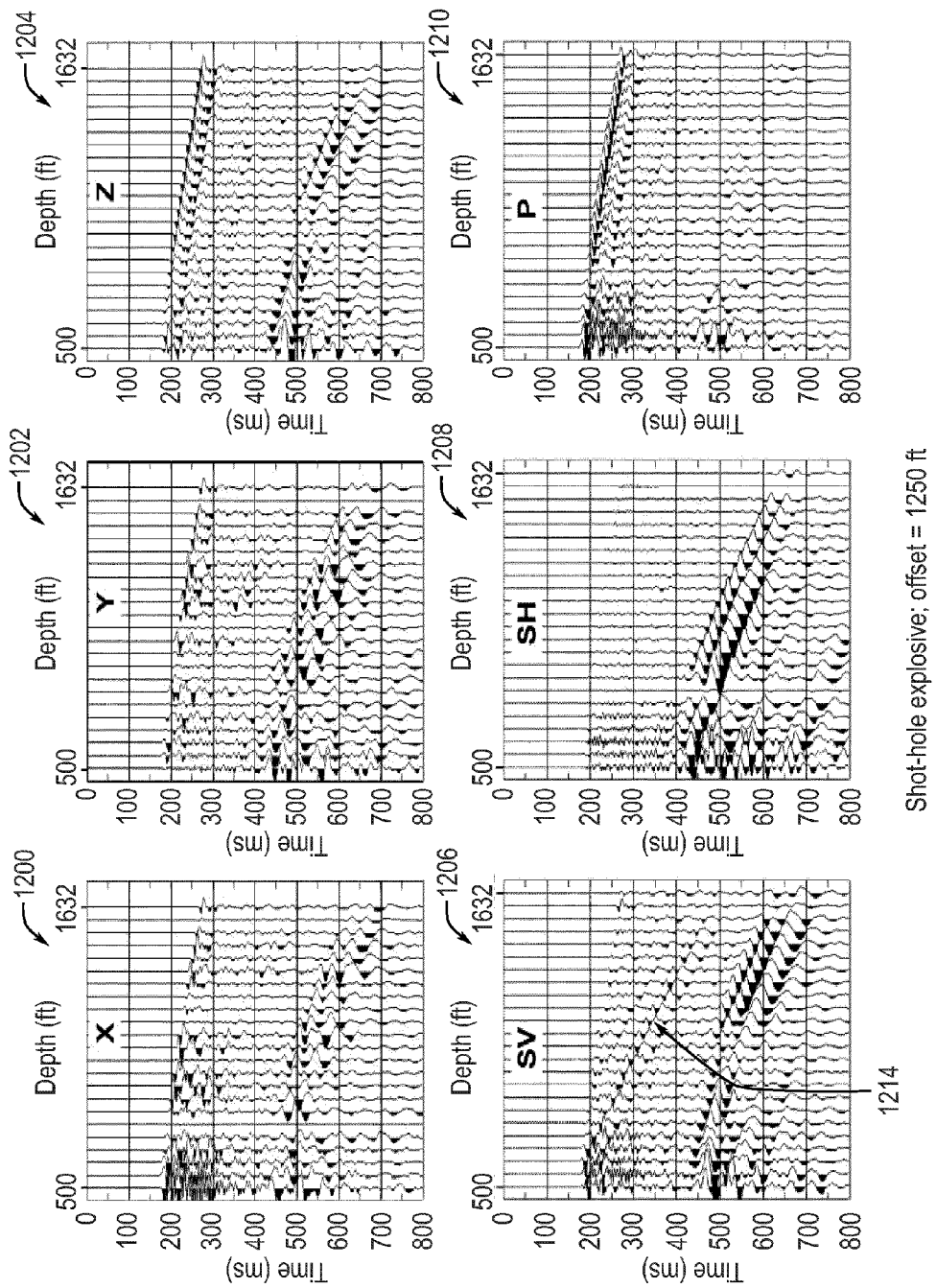
FIG. 12 is a set of charts showing example X, Y, Z data acquired with a vertical array from a shot hole explosive source, and corresponding data rotated to P, SV and SH data space, according to an exemplary embodiment.

Referring to FIG. 12, charts 1200, 1202 and 1204 illustrate actual X, Y, Z data acquired at the Devine Test Site with the vertical receiver array when a shot-hole explosive source was positioned at source station 5, offset 1250 ft from the array. Charts 1206, 1208 and 1210 illustrate the same data rotated to P, SV, SH data space. No P or SV events appear on the SH data panel. SV events appearing on the P data panel are weaker than is the case for a vertical-impact source, perhaps due to more accurate receiver rotations. Note at shallow take-off angles (top 4 or 5 receiver stations), SH waves travel faster than SV waves as predicted by Levin (1979, 1980), supra, and measured by Roberson and Corrigan (1983), supra.

Figure 13:
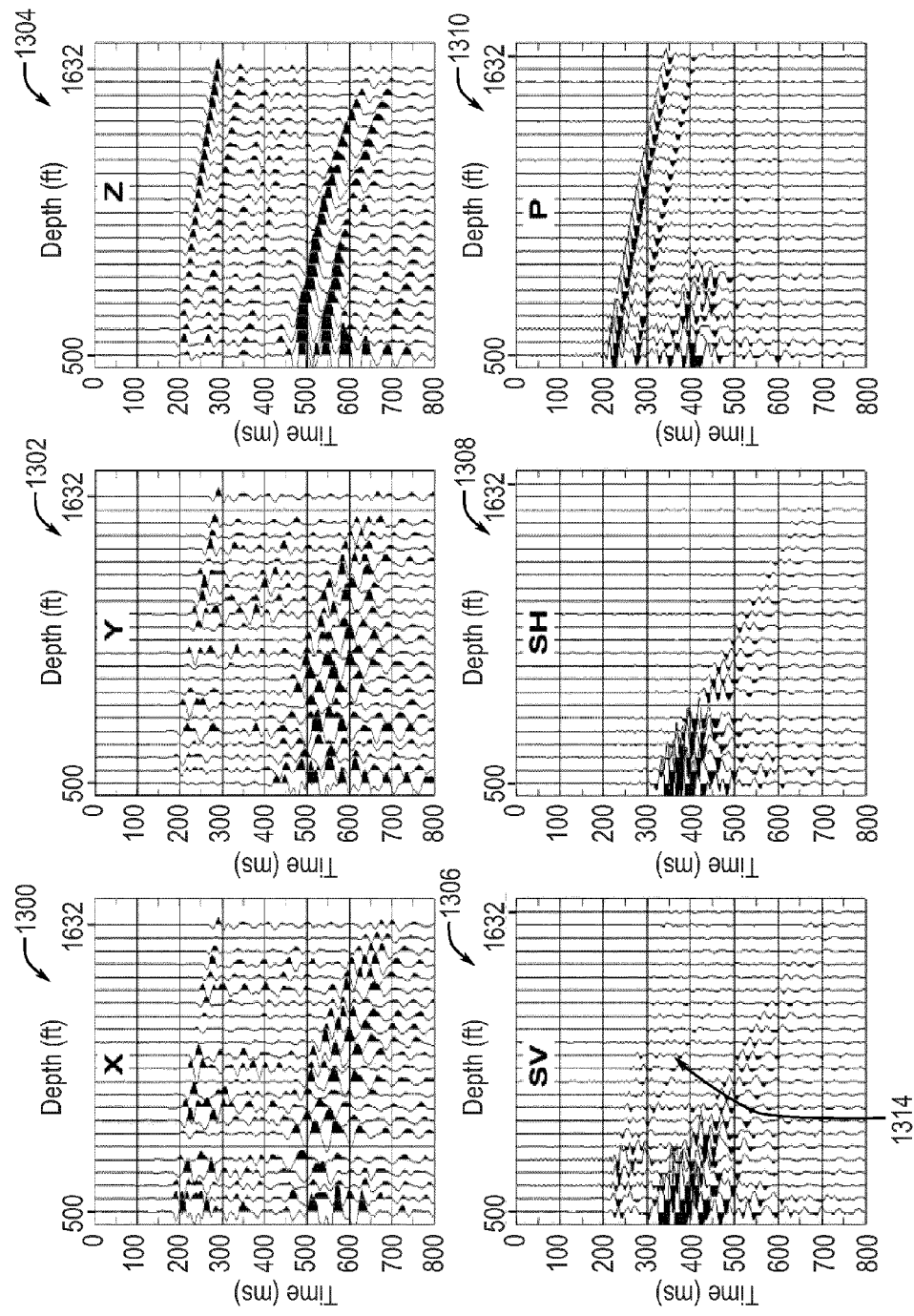
FIG. 13 is a set of charts showing example X, Y, Z data acquired with a vertical array from a vertical vibrator source, and corresponding data rotated to P, SV and SH data space, according to an exemplary embodiment.

Referring to FIG. 13, charts 1300, 1302 and 1304 illustrate actual X, Y, Z data acquired at the Devine Test Site with the vertical receiver array when a vertical-vibrator source was positioned at source station 6, offset 1500 ft from the array. Charts 1206, 1208 and 1210 illustrate the same data rotated to P, SV, SH data space. No P or SV events appear on the SH data panel. Measurements made at shallow take-off angles have larger amplitudes than measurements made with vertical-impact and explosive sources (FIGS. 11 and 12).

A constant plot gain is applied to each data panel on each of FIGS. 11-13. Thus, within individual figures, P, SV, and SH amplitudes can be compared visually to judge relative energy levels of P and S modes. Such comparisons confirm SV and SH modes radiating away from a vertical-force source have amplitudes greater than the associated P mode. Data-display gains differ for each source, so P and S amplitudes produced by explosives should not be visually compared with P and S amplitudes produced by vertical-impact or vertical-vibrator sources.

According to theory, SH data do not convert to either P or SV modes as an elastic wavefield propagates through a layered Earth, and conversely, P and SV modes do not convert to SH modes. No SH data panel contains P or SV events, which indicate the wavefield separations displayed on FIGS. 11 through 13 are properly done. Theory also establishes energy is freely exchanged between P and SV modes as they propagate through layered media. All SV data panels on FIGS. 11-13 show P-to-SV conversion events 1114, 1214, and 1314, which again indicate correct wave physics. Although minor amounts of SV energy remain on the P data panels, we consider our wave-mode separation to be sufficiently accurate to establish the fundamental principle that both SH and SV shear modes are produced by a vertical-force source in addition to the expected P-wave mode.

Another piece of evidence confirming the two S modes shown on FIGS. 11 to 13 are SV and SH is the fact the wavefront labeled SH travels faster at shallow (near horizontal) takeoff angles than does the wavefront labeled SV. This distinction in SH and SV velocity behavior is emphasized by the theory documented by Levin (FIG. 4). The differences in SH and SV velocities is best seen by comparing the arrival times of S wavefronts on FIGS. 11 and 12 at shallow receivers positioned over the depth interval 500 to 700 ft.

Data Processing

There is a difference between S-wave source displacement vectors produced by vertical-force sources and conventional horizontal-force sources. The S-wave displacement applied to the Earth by a horizontal-force source is shown on FIG. 3. That displacement is oriented in a fixed azimuth direction (e.g., indicated by arrow 306), and Earth displacements around the point of application all point in the same direction (e.g., as indicated by arrows 308) as the direction of the applied force. In contrast, the S displacement created by a vertical-force source points in every azimuth direction around its point of application, and the corresponding Earth displacement vectors likewise point in all azimuth directions away from the source station (see FIG. 6). The effect seen in seismic reflection data is that S-wave data produced by a dipole source (FIG. 3) have the same polarity in every azimuth quadrant surrounding a source station, but S-wave data produced by a vertical-force source have different polarities when viewed in azimuth directions that differ by 180 degrees.

S-wave data-processing strategies across the seismic industry are based on the assumption that data polarities are constant across the entirety of seismic image space. Thus the polarities of S-wave data acquired with a vertical-force source can be adjusted to look like constant-polarity data produced by a dipole source via a data-polarity adjustment.

Figure 14:
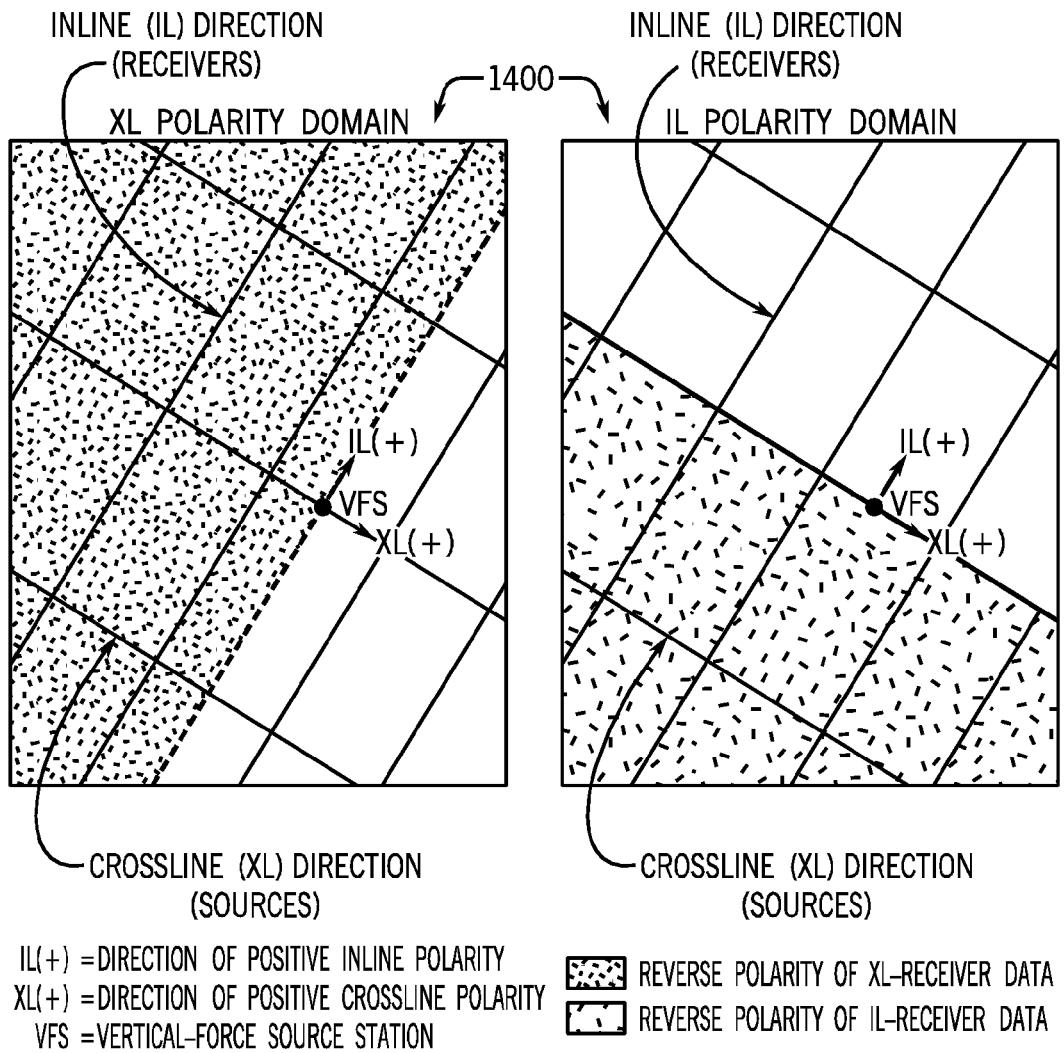
FIG. 14 is an illustration of the principle of data-polarity reversals applied to vertical-force source data to create constant-polarity S-wave data across seismic image space, according to an exemplary embodiment.

Referring to FIG. 14, a process of data-polarity adjustment will be described. FIG. 14 shows a map view of a vertical-force source station VFS positioned in a 3D seismic data-acquisition grid 1400. In seismic parlance, the direction receiver lines are deployed is called "inline," and the direction source lines are oriented is called "crossline." In most 3D seismic data-acquisition designs, inline and crossline directions are perpendicular to each other.

The azimuth direction of positive polarity in crossline and inline directions is arbitrary. However, once a data processor selects certain inline and crossline directions as being positive polarities, he/she has automatically divided inline and crossline seismic image space around a vertical-force source station into two polarity domains—a positive-polarity domain and a negative-polarity domain. FIG. 14 illustrates the principle of data-polarity reversals applied to vertical-force source data to create constant-polarity S-wave data across seismic image space. An exemplary 3D seismic data-acquisition geometry called orthogonal geometry is shown in which source line and receiver lines are orthogonal to each other. VFS is a vertical-force station on one source line. A positive-polarity direction is selected (arbitrarily) for both the crossline (source line) direction and the inline (receiver line) direction. This decision divides seismic image space into two domains—a positive-polarity domain and a negative-polarity domain.

Figure 15:
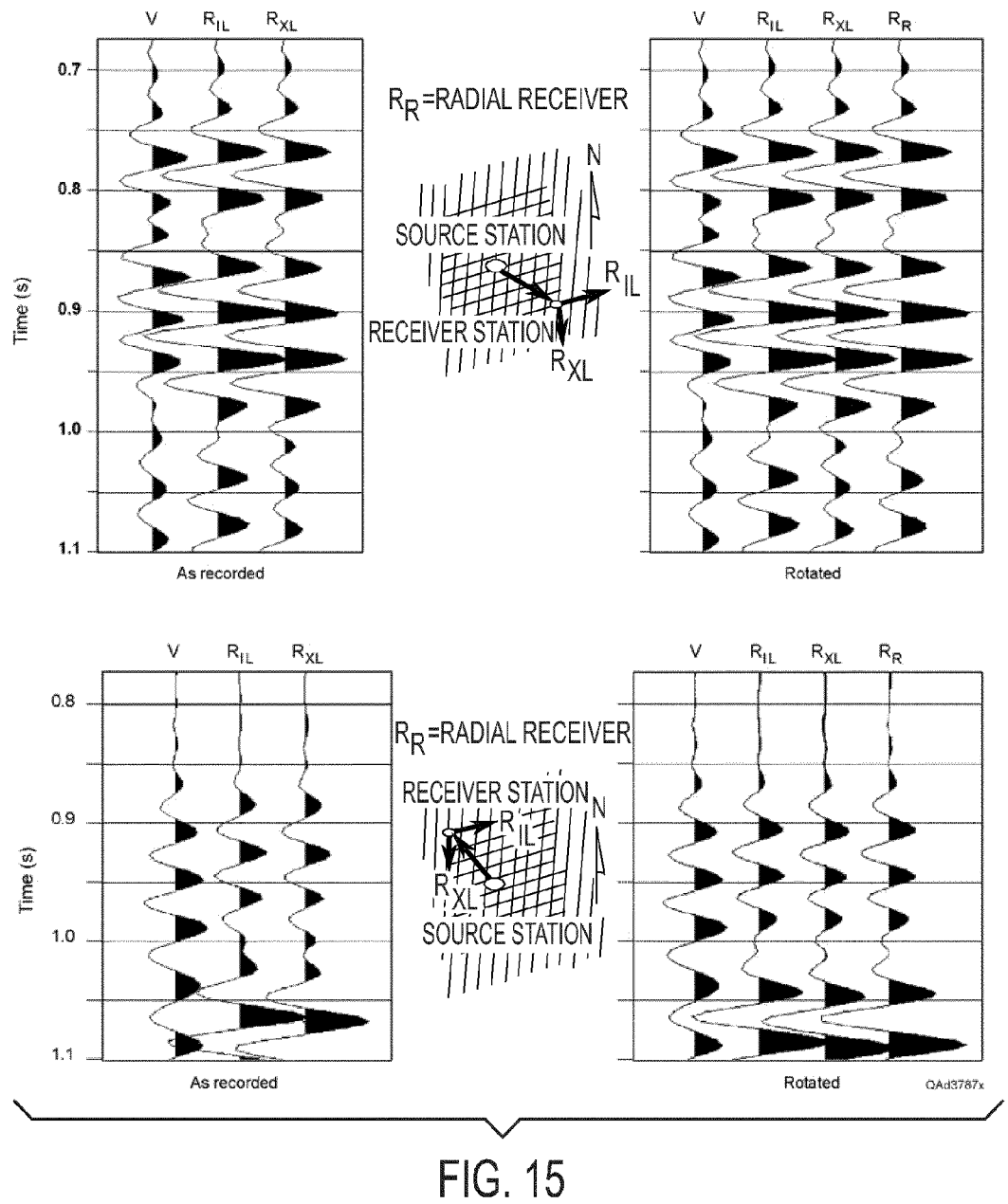
FIG. 15 illustrates a first example of polarities of vertical-force seismic data and the result of reversing polarities in the negative-polarity domain to convert vertical-force source data to constant-polarity dipole-source data, according to an exemplary embodiment.
Figure 16:
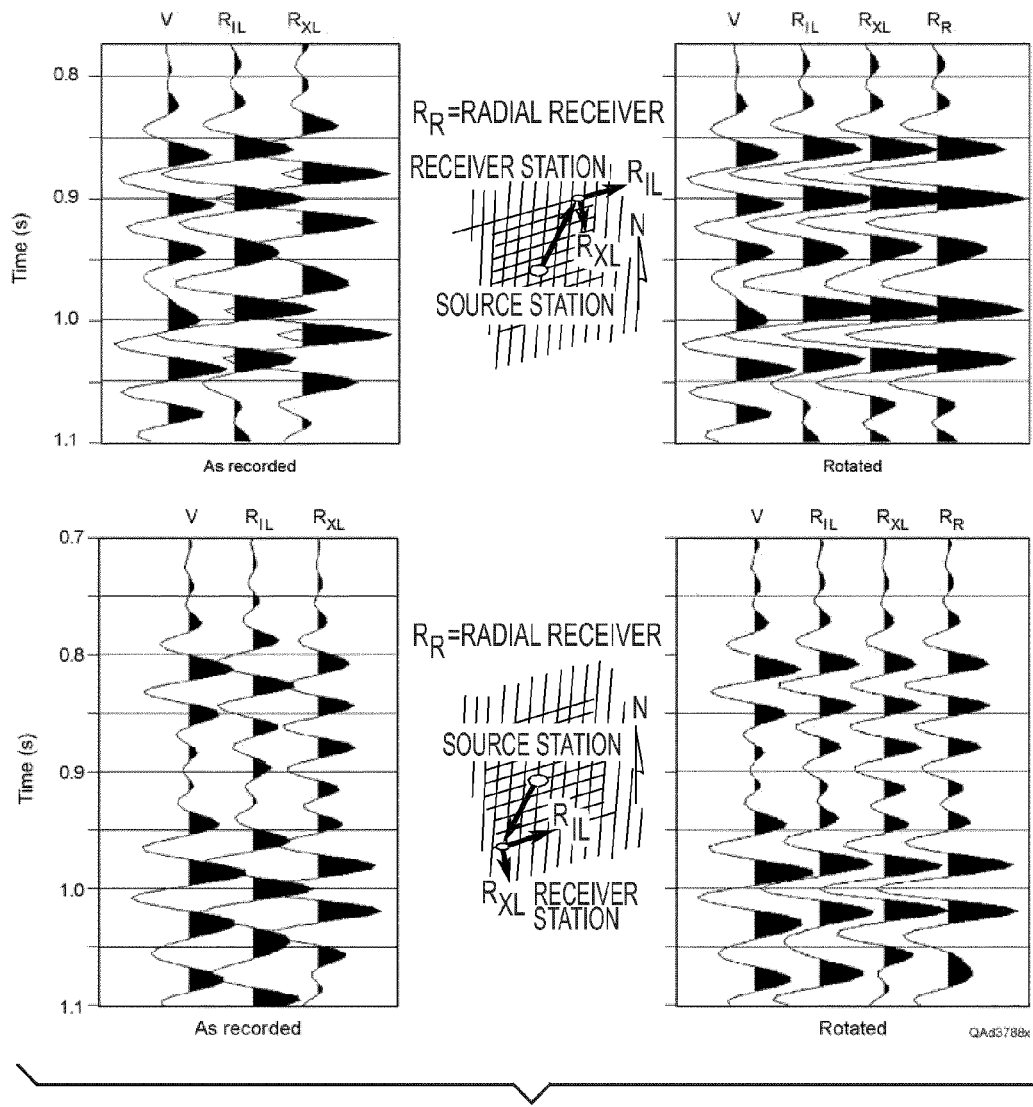
FIG. 16 illustrates a second example of polarities of vertical-force seismic data and the result of reversing polarities in the negative-polarity domain to convert vertical-force source data to constant-polarity dipole-source data, according to an exemplary embodiment.

A real-data example of this data-polarity principle is illustrated in FIGS. 15 and 16. These 3D seismic data were acquired using a vertical vibrator. The data-acquisition grid is shown between each pair of data panels to define the position of a fixed source station and various receiver stations where data produced by this vertical-force source were recorded. The positive inline (IL) and crossline (XL) directions assigned to the grid are indicated at each receiver station. The wiggle trace displays on the left show the polarities of the recorded data. Wiggle trace displays on the right show the data after polarity reversals have been applied as described in FIG. 14. After these polarity flips, all data have consistent polarity across the entirety of seismic image space and can be processed by standard seismic software.

The data processing for SV and SH wave modes produced directly at the point of application of a vertical-force source differs from that of processing converted-SV data. With direct-source data, data polarities are reversed in the negative-offset domain, and once this data-polarity correction is done, data in the two offset domains are processed as a single data set, not as two separate data sets. Direct-source S-wave data can be processed with common-midpoint (CMP) strategies; whereas, P-SV data are processed with common-conversion-point (CCP) strategies. Velocity analyses of data are done differently in these two data-processing domains—common midpoint versus common conversion point.

FIG. 15 illustrates a first example of polarities of vertical-force seismic data recorded in azimuth directions that differ by 180 degrees away from a source station (left). On the right, FIG. 15 illustrates the result of reversing polarities in the negative-polarity domain to convert vertical-force source data to constant-polarity dipole-source data.

FIG. 16 illustrates a second example of polarities of vertical-force seismic data recorded in azimuth directions that differ by 180 degrees away from a source station (left). On the right, FIG. 16 illustrates the result of reversing polarities in the negative-polarity domain to convert vertical-force source data to constant-polarity dipole-source data.

Although vertical-force source data do not produce the same S-wave data polarities as conventional horizontal-force sources, data polarity reversals, corrections, inversions or adjustments in appropriate portions of seismic image space transform vertical-force polarities to horizontal-force polarities. After these polarity adjustments, vertical-force source data can be processed just as horizontal-force source data are, using known algorithms.

Findings

The EGL test data show that vertical-force sources, commonly perceived as P-wave sources, generate more S energy directly at the force application point than they do P energy. In one embodiment, the S energy is generated directly at the force application point of the source, rather than through applications of P-to-SV mode conversions at sub-surface interfaces.

In addition, field tests show vertical-force sources produce a high-energy, high-quality SH mode directly at the source station in addition to an SV mode. This statement is confirmed by:

The mode claimed to be SH produces an Earth displacement normal to the SV mode, and Has a velocity greater than the SV mode at shallow takeoff angles.

Thus, the EGL source test program evidences that full-elastic-wavefield data (P, SV, SH) can be acquired using vertical-force sources.

The existence of SV mode data directly at the source station can be contrasted with SV data which is converted at impedance-contrast interfaces in the Earth from P to SV mode by some layers of media below the Earth's surface, which can be referred to as "near the source." There are only two ways to generate an SV shear mode: 1) use a source that produces an SV displacement directly at the source station, or 2) use a source that generates a robust P wave and utilize the converted SV modes that P wave produces when it illuminates an interface at any incident angle other than 0 degrees.

As explained above, SH data are observed in data produced by the three general types of vertical-force sources (vertical vibrator, vertical impact, shot hole explosive), which means an SH displacement occurs directly at the point where a vertical-force source applies its force vector to the Earth.

Data Acquisition and Processing

Figure 17:
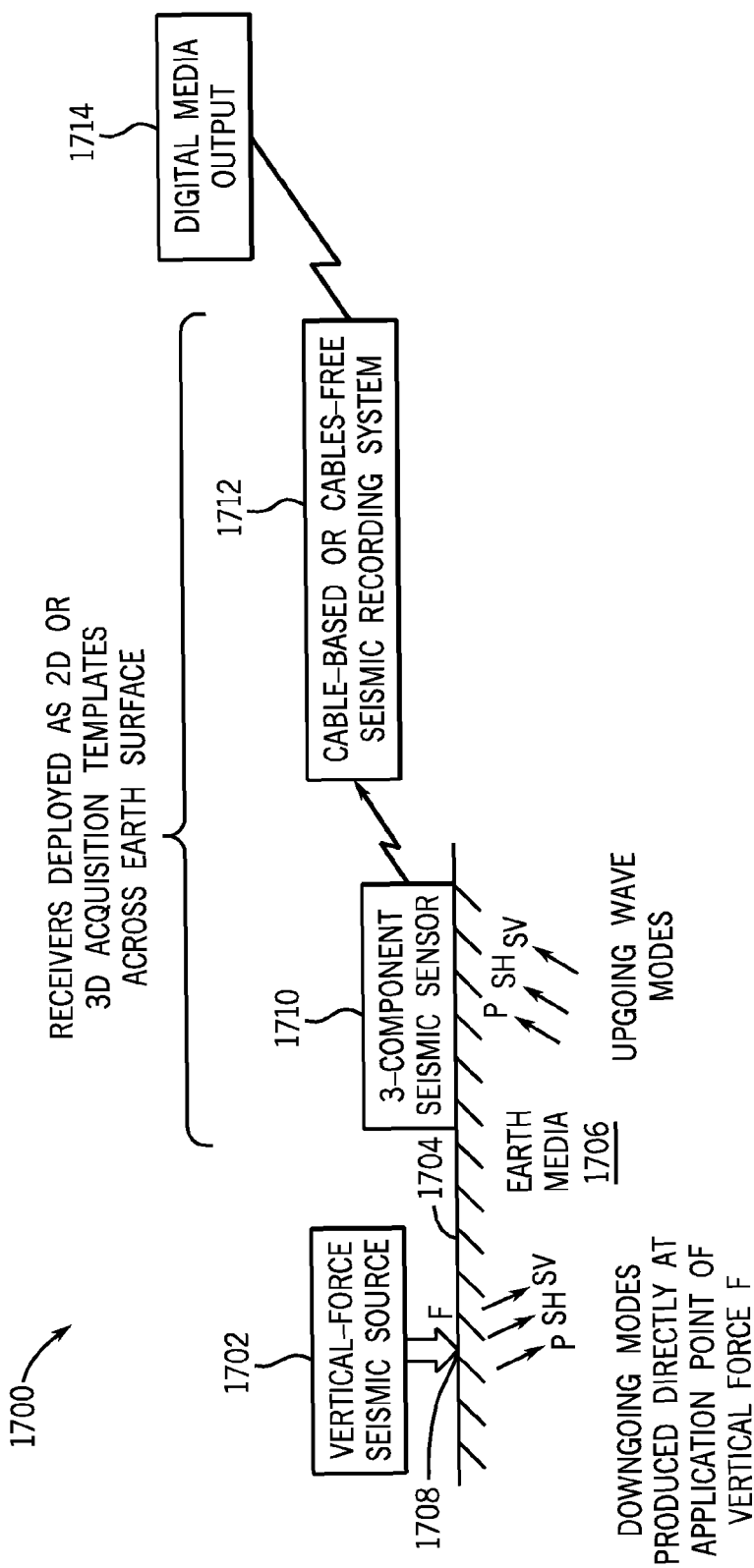
FIG. 17 is a block diagram of a data acquisition and processing system and method for acquiring and processing full elastic waveform data from a vertical-force source using surface-based sensors, according to an exemplary embodiment.

Referring now to FIG. 17, a diagram of a data acquisition and processing system 1700 and method for acquiring and processing full elastic waveform data from a vertical-force source using surface-based sensors will be described. A vertical-force seismic source 1702 is disposed on, near, or within a shallow recess of the Earth's surface 1704. Source 1702 is configured to impart a vertical-force to surface 1704 to provide seismic waves into Earth media 1706. Source 1702 may comprise a vertical vibrator, shot-hole explosive, vertical-impactor, air gun, vertical weight-dropper or thumper, and/or other vertical-force sources. In this example, vertical-force source 1702 produces compressional P mode and both fundamental shear modes (SH and SV) in Earth 1706 directly at a point of application 1708 of the vertical-force source. In this embodiment, at least some of the SH and SV shear waves are generated at source 1702 and not by subsurface conversion caused by portions of Earth media 1706. The frequency waves may be provided in a frequency sweep or a single broadband impulse. A vertical-force source may be used without any horizontal-force sources.

A seismic sensor 1710 is along the Earth's surface, which may include being disposed on, near, or within a recess of the Earth's surface 1704. For example, in one embodiment, shallow holes may be drilled and sensors 1710 deployed in the holes to avoid wind noise, noise produced by rain showers, etc. Sensor 1710 is configured to detect or sense upgoing wave modes, reflected from subsurface sectors, formations, targets of interest, etc. In this embodiment, sensor 1710 comprises a multi-component geophone, for example a three-component geophone configured to sense compressional P mode and both fundamental shear modes (SH and SV). As described in FIGS. 1-14, various arrays and configurations of sources 1702 and sensors 1710 may be implemented in different embodiments. For example, two-dimensional or three-dimensional acquisition templates may be deployed across Earth's surface 1704. As another example, a plurality of sources 1702 (e.g., at least two, at least five, at least ten, etc.) may be disposed along a line and be configured to transmit seismic waves together or simultaneously. Vertical seismic profiling may be used in one embodiment. In an alternative embodiment, a reverse vertical seismic profiling arrangement may be used, in which one or more sources is disposed in a hole or well and one or more 3-component sensors or receivers are disposed along the Earth's surface. In another alternative embodiment, an interwell arrangement may be used, in which sources are disposed in one well or hole and 3-component receivers or sensors are disposed in another well or hole. An in-hole source may be a wall-locked mechanical vibrator in an air-filled or fluid-filled well, or an air gun, water gun, or high-energy piezo-ceramic transducer freely suspended in a fluid column, or other source.

A seismic recording system 1712 is configured to receive seismic data sensed by sensor(s) 1710 via a wired or wireless communication link and to store the data in a database. System 1712 may comprise any type of computing device. System 1712 may be configured to acquire and/or process the received data. For example, processing may comprise polarity-reversal as previously described, the processing steps of FIG. 18 below, or other seismic data processing algorithms.

A digital media output device 1714 may be coupled to system 1712, or data may be transferred to device 1714 from system 1712 using any of a variety of technologies, such as a wired or wireless network, memory device, etc. Device 1714 may comprise one or more of a display device, a printer, a speaker, and/or other output devices.

According to one embodiment, system 1712 can be configured to acquire or capture SH-SH mode data with surface-based sensors. According to another embodiment, system 1712 can be configured to acquire both SV and SH mode data with surface-based sensors.

Figure 18:
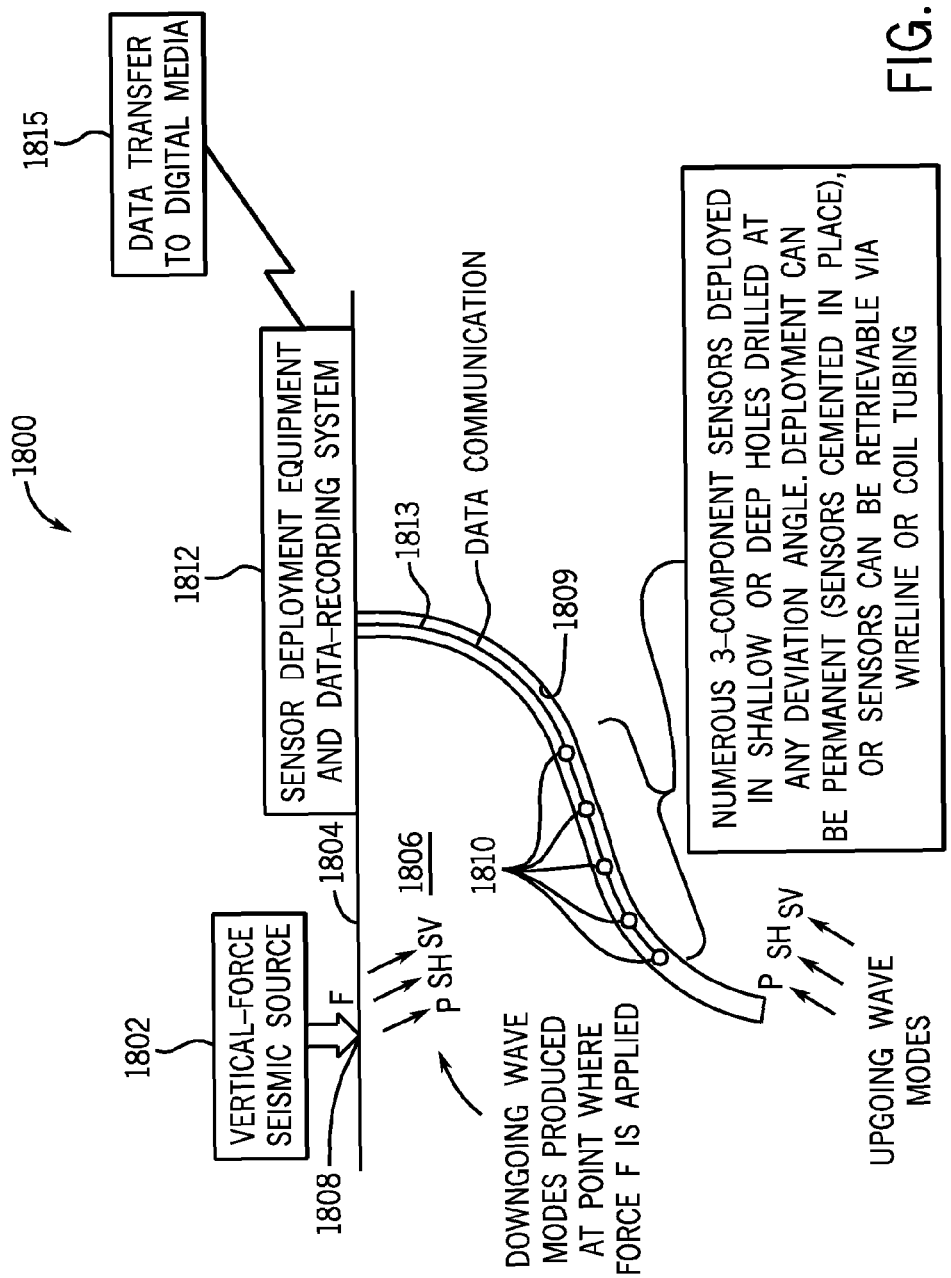
FIG. 18 is a block diagram of a data acquisition and processing system and method for acquiring and processing full elastic waveform data from a vertical-force source using sub-surface sensors, according to an exemplary embodiment.

Referring now to FIG. 18, a diagram of a data acquisition and processing system 1800 and method for acquiring and processing full elastic waveform data from a vertical-force source using sub-surface sensors will be described. A vertical-force seismic source 1802 is disposed on, near, or within a shallow recess of the Earth's surface 1804. Source 1802 is configured to impart a vertical-force to surface 1804 to provide seismic waves into Earth media 1806. In this example, vertical-force source 1802 produces compressional P mode and both fundamental shear modes (SH and SV) in Earth 1806 directly at a point of application 1808 of the vertical-force source. In this embodiment, at least some of the SH and SV shear waves are generated at source 1802 and not by subsurface conversion caused by portions of Earth media 1806. Contamination of S data produced directly at a source station by converted-SV data produced at interfaces remote from the source station may occur. A data processing system may be configured to resolve, remove, reduce or identify this converted-SV data (and/or other noise modes, such as P events, P and S multiples, reverberating surface waves, wind noise, etc.) and to emphasize, amplify, or identify the target signal.

A plurality of seismic sensors 1810 are disposed at a plurality of locations within each of one or more shallow or deep holes drilled at any deviation angle. Sensors 1810 may be deployed permanently (e.g., by cementing or otherwise securing them in place) or they may be retrievable via wireline or coil tubing. Sensors 1810 are configured to detect or sense upgoing wave modes, reflected from subsurface sectors, formations, targets of interest, etc. In this embodiment, sensors 1810 each comprise at least one multi-component geophone, for example a three-component geophone configured to sense compressional P mode and both fundamental shear modes (SH and SV). As described in FIGS. 1-14, various arrays and configurations of sources 1802 and sensors 1812 may be implemented in different embodiments.

Sensor deployment equipment and seismic recording system 1812 may be configured to position sensors 1810 within hole 1809, provide power to sensors 1810, and provide other functions needed to deploy sensors 1810. System 1812 comprises a computing system configured to receive seismic data sensed by sensors 1810 via a wired or wireless communication link 1813 and to store the data in a database. System 1812 may be configured to acquire and/or process the received data. For example, processing may comprise polarity-reversal as previously described, the processing steps of FIG. 18 below, or other seismic data processing algorithms.

A digital media 1815 may be coupled to system 1812 using any of a variety of technologies, such as a wired or wireless network, etc. Media 1815 may be configured to store and transfer the sensed and/or processed to data to other computing devices.

Figure 19:
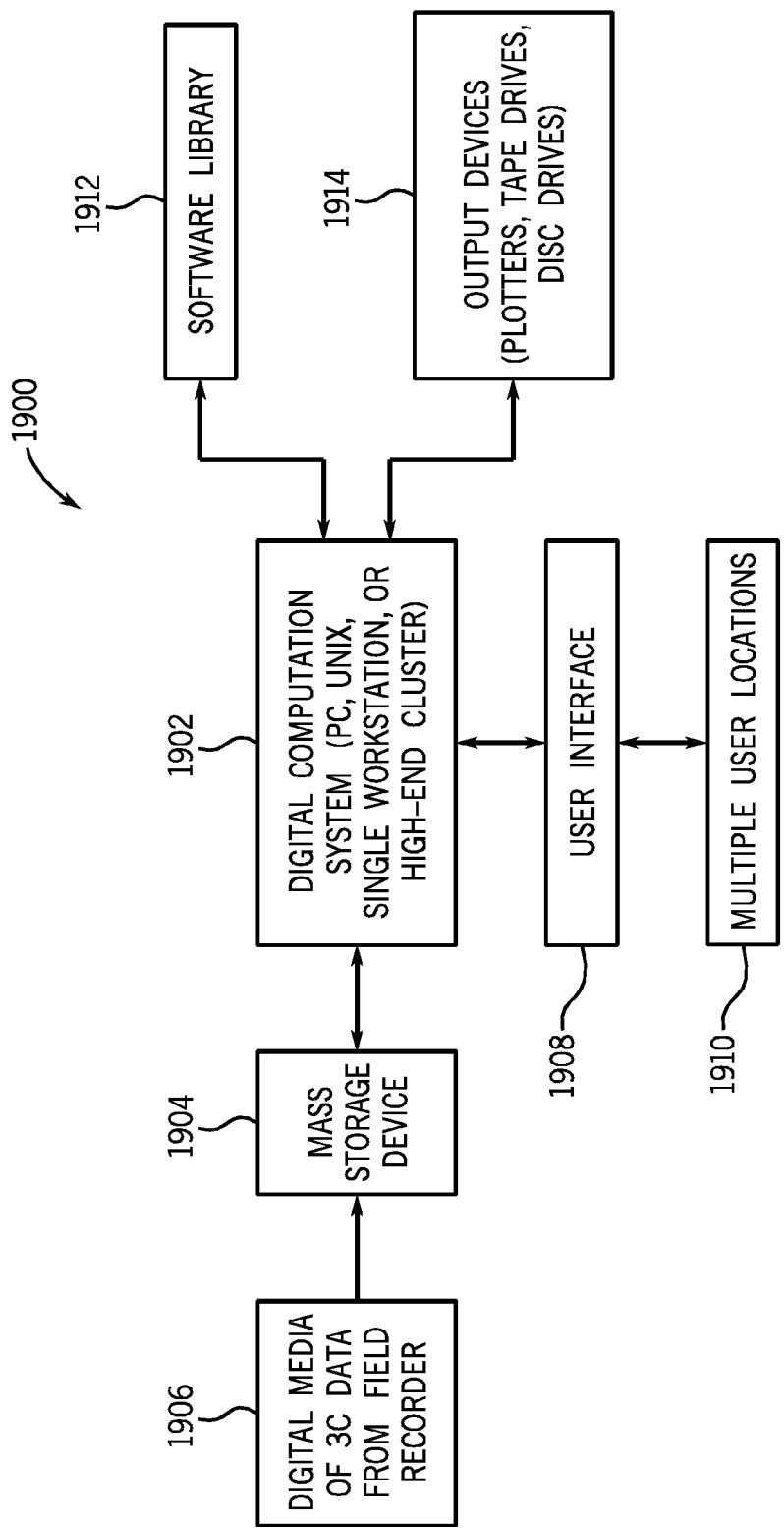
FIG. 19 is a block diagram of a data processing system for processing full elastic wavefield data, according to an exemplary embodiment.

Referring now to FIG. 19, a data processing system for processing full elastic wavefield data will be described. System 1900 comprises a digital computation system 1902, such as a personal computer, UNIX server, single workstation, high-end cluster of workstations, or other computing system or systems. System 1902 comprises sufficient processing power to process large quantities of complex seismic data. A mass storage device 1904 or other memory is coupled to digital computation system 1902, which is configured to receive data from the field recorders or sensors stored on a digital media 1906, such as a memory card, hard drive, or other memory device. Mass storage device 1904 is configured to download or receive the multi-component seismic data from digital media 1906 and to store the data in a database.

A user interface 1908, such as a keyboard, display, touch screen display, speaker, microphone, and/or other user interface devices may be coupled to system 1902 for two-way communication between system 1902 and a user. According to one exemplary embodiment, multiple user terminals 1910 may access data processing system 1902 through a user interface using a network of computers, terminals, or other input/output devices (e.g., a wide-area network such as the Internet).

A software library 1912 is coupled to data processing system 1902 and comprises one or more non-transitory computer-readable media programmed to perform one or more processing algorithms. The processing algorithms may comprise any of a number of known seismic data processing algorithms or algorithms described herein or which may be developed in the future. The algorithms can comprise algorithms in two categories: (1) algorithms required to process data acquired by surface-based 3-component sensors, and (2) algorithms required to process data acquired with 3-component sensors positioned in deep wells.

Surface-Based Sensors

For surface-based sensors, data computation system 1902 may be programmed with existing code, both proprietary code and public commercial code. System 1902 may be programmed with new code to optimize data handling and image construction. System 1902 may be programmed to extract P, SH, and SV modes from recorded data, as described herein with reference to FIGS. 1-14.

Deep Well Sensors

When data are acquired with sensors in deep wells, the procedure is called vertical seismic profiling (VSP). VSP data-processing systems are not as widely distributed as are systems for processing surface-sensor data. VSP data may be processed using data-processing systems made or used by VSP contractors, such as Schlumberger, Halliburton, Baker Atlas, READ, and/or other companies. The data processing systems may be configured to extract P, SH, and SV modes from recorded data, by looking for SV and SH radiating directly from a surface source station.

System 1900 may further comprise one or more output devices 1914 coupled to digital computation system 1902. Output devices 1914 may comprise plotters, tape drives, disc drives, etc. configured to receive, store, display and/or present processed data in a useful format.

Figure 20:
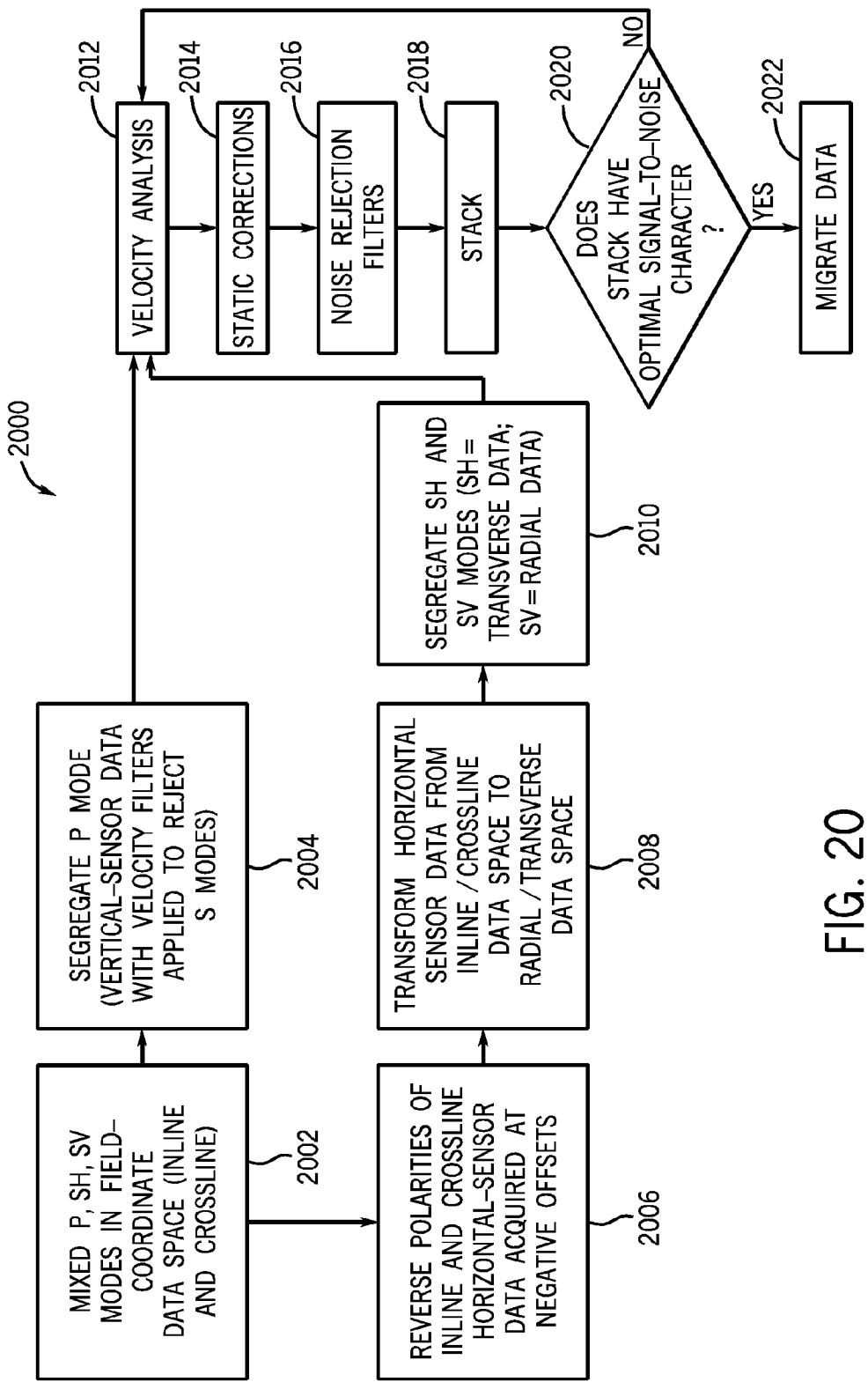
FIG. 20 is a flow diagram illustrating a method of processing full elastic wave data, according to an exemplary embodiment.

Referring now to FIG. 20, a flow diagram illustrating a method 2000 of processing full elastic wave data will be described. The method may be operable on one or more processing circuits, such as digital computation system 2002. At a block 2002, a processing circuit is provided with mixed P, SH and SV modes in field-coordinate data space (inline and crossline) from acquisition steps described previously. At block 2004, the processing circuit is configured to or programmed to segregate, separate or otherwise remove P mode data by applying velocity filters to reject or filter out SH and SV modes.

A velocity filter is any numerical procedure applied to seismic data that emphasizes events that propagate with a certain targeted velocity behavior and attenuates events that propagate with velocities different from this targeted velocity. There are numerous algorithms available to seismic data processors that perform velocity filtering. Some of these filters operate in the frequency-wavenumber (f-k) domain, some in the time-slowness (tau,p) domain, some are median filters in the time-depth domain, etc. Velocity filters allow primary P reflections to be segregated from P multiples, and S events to be isolated from P events.

Converted SV events have a faster velocity than do direct-S events because a converted SV involves a downgoing P wave; whereas, the downgoing raypath for a direct-S event is S (much slower than P). Velocity filters can be designed that pass the slow velocities associated with an S-S event (downgoing S and upgoing S) and reject the faster velocities of P-SV events (downgoing P and upgoing SV).

At a block 2006, the processing circuit is configured to reverse polarities of inline and crossline horizontal-sensor data acquired at negative offsets, as described above with reference to FIGS. 10-14. At a block 2008, the processing circuit is configured to transform horizontal sensor data from inline/crossline data space to radial/transverse data space, as described above with reference to FIGS. 10-14. As a result, the SH and SV modes (SH=transverse data; SV=radial data) are segregated and processed separately. The order of blocks of method 2000 may be rearranged in various embodiments; for example, the order of blocks 2006 and 2008 can be exchanged.

At a block 2010, radial sensor data are set aside as an SV data base, and transverse sensor data are set aside as an SH data base. This segregation of SV and SH modes allows the modes to be individually introduced (e.g., as separate data sets) into the data-processing stream starting at block 2012.

At a block 2012, any one of numerous velocity analysis procedures available in the seismic data-processing industry may be applied to each wave mode, P, SV, and SH, separately. Popular velocity-analysis options are semblance stacking, frequency-wavenumber analysis, and time-slowness analysis. This step identifies an optimal velocity function for each wave mode that will emphasize primary reflection events for that wave mode and attenuate noise, interbed multiples, and spurious events from competing wave modes.

At a block 2014, static corrections are applied to improve reflector alignment. These corrections involve time shifts of data acquired at each source and receiver station. Because these time shifts are applied to an entire data trace, they are termed static corrections to differentiate them from dynamic time adjustments done by other processes. One static correction removes timing differences caused by variations in station elevations by adjusting time-zero on each data trace to mathematically move all source and receiver stations to a common datum plane. A second static correction removes timing differences cause by different velocities being local to different source and receiver stations. The end result of these static corrections is an improvement in reflection continuity.

At a block 2016, any one of many noise rejection procedures may be applied to the data to improve the signal-to-noise ratio. Some noise rejection options may be simple frequency filters. Others may be more sophisticated tau-p, f-k, or deconvolution procedures.

At a block 2018, the data are stacked (or summed) to create an initial image. Embedded in this step is a dynamic time adjustment of reflection events called a moveout correction that is applied to flatten reflection events to the same time coordinate at all source-receiver offsets. A data-acquisition geometry may cause many source-receiver pairs to produce reflection events at the same subsurface coordinate. In stacking, the flattened reflections from all source-receiver pairs that image the same subsurface coordinate are summed to make a single image trace at that image-space coordinate. When this stacking process is extended across the entire seismic image space, a single image trace with high signal-to-noise character is produced at each image point in the image space. It is at this step that a data processor gets his/her first look at the quality of the velocity analysis and static corrections that have been applied to the data (e.g., by displaying the data on an electronic display, printing the data using a printer, etc.).

At a block 2020, the data processor has to decide if the image is satisfactory or if the data processing should be repeated to improve the accuracy of the velocity analyses that perform the dynamic moveout corrections of reflection events and to improve the accuracies of the static corrections that time shift reflection events at each source and receiver station. If the decision is to repeat the imaging process, the procedure returns to block 2012 and proceeds to block 2020 again. If the Earth consists of flat horizontal layers, these stacked data are a good image of the subsurface geology. If Earth layers are dipping or faulted, these stacked data are not a true image of the geology, but they still indicate the quality of the true image that will be created when the data are migrated (Block 2022).

At a block 2022, the data are migrated. Migration is a procedure that utilizes a seismic-derived velocity model of the Earth to move reflection events from their coordinate positions in offset-vs-time image space to their correct subsurface positions in the Earth. Numerous migration algorithms are available in the seismic data-processing industry. Some algorithms are proprietary to data-processing companies; others are available as commercially leased software or as shared freeware.

The position of the data migration step on FIG. 20 is a post-stack migration procedure. The migration step can be moved to be positioned between blocks 2016 and 2018 to do pre-stack migration. Pre-stack migration is often more desirable than post-stack migration but is more computer intensive. Pre-stack time migration and depth migration allow the vertical coordinate axis of the image to be either depth or time, depending on the data processor preference. The possibility of imaging using reverse time migration techniques can be utilized at this point if desired.

The teachings herein may be implemented by seismic contractors, oil and gas companies, and others. The teachings herein may be used in other industries as well, such as geothermal energy, CO2 sequestration, etc.

Extant Data

The systems and methods described herein may be applied to processing of extant or pre-existing or legacy sets of seismic data. According to one example, a memory comprises seismic data which may be raw, unprocessed or partially processed. The seismic data may have been generated months or years prior to the processing of the data. A processing circuit may be configured to process the seismic data to generate, provide, or achieve full elastic waveform data. For example, the processing circuit may be configured to reverse polarities of horizontal sensor data acquired at negative offsets as described herein to generate S mode data, such as SH mode and SV mode data. The processing circuit may further be configured to extract P, SH, and SV modes from the previously recorded data. In one embodiment, the seismic sensors will have been receiving data for a sufficient period of time, such as at least ten seconds or at least twelve seconds, in order to receive all of the slower-moving SH and SV modes in addition to the P mode data.

According to one embodiment, sources other than explosive sources (i.e. non-explosive sources, such as vertical vibrators and vertical-impact sources) may be used to construct S-mode images, such as SV and SH images. The advantages of non-explosive sources include that they are acceptable sources in environments where explosive sources are prohibited or impractical. Exemplary advantages include:

Explosives cannot be used in urban environments. In contrast, vibrators can operate down streets, alleys, and in close proximity to buildings.

Explosives cannot be used along road right-of-ways. County roads and public highways are popular profile locations for vibrators.

In areas contaminated by mechanical noise (road traffic, gas-line pumping stations, oil well pump jacks, active drilling rigs, etc.), the compact impulsive wavelet (typically spanning only 100 to 200 ms) produced by an explosive shot can be overwhelmed by short noise bursts from noise sources local to one or more receiver stations. In contrast, a vibrator creates a wavelet by inserting a long (10 to 12 seconds) chirp into the Earth in which frequencies vary with a known time dependence. Unless mechanical noise has exactly the same frequency variation over a 10-second or 12-second time duration as does a vibrator chirp signal, the cross correlation procedure used to identify vibroseis reflection events suppresses the noise. Explosive sources are less practical than vibrators in high-noise environments.

Vertical impact sources have appeal because they are lower cost than explosive sources (and usually lower cost than vibrators). Operators often choose the lowest cost source even if the source has some technical shortcomings.

While non-explosive sources are used in some embodiments described herein, explosive sources may be used in other embodiments described herein.

S data can be acquired in the widest possible range of environments when vertical-force sources are utilized. Explosive sources can be used in swamps, mountains, etc. where non-explosive sources are not feasible or practical, and vibrators and vertical impact sources can be used in high-culture areas (cities, roads, etc) where explosives are prohibited, and when budget constraints limit source options.

The systems and methods described with reference to FIGS. 17-20 may implement any of the features or principles described with reference to FIGS. 1-16.

Extracting SV Shear Data from P-Wave Seismic Data

Referring now to FIGS. 21-35, system and methods for extracting SV shear-wave data from P-wave seismic data will be described.

Systems and methods are described for extracting SV shear-wave data from P-wave seismic data acquired with a vertical-force source and vertical geophones. The P-wave seismic data may comprise legacy P-wave data (e.g., P-wave data acquired at some time days, months, or years, such as at least one year, in the past), P-wave data acquired in the present day, two dimensional data, three dimensional data, single-component sensor data, and/or three-component sensor data acquired across a wide variety of Earth surface conditions.

These systems and methods are based on the use and application of the SV-P mode produced by a vertical-force seismic source. The SV component of this seismic mode provides valuable rock and fluid information that cannot be extracted from P-wave seismic data. The systems and methods may produce an S-wave image from seismic data acquired with surface-based vertical geophones.

According to some embodiments, vertical, single-component or one-component, surface-based seismic sensors are used to acquire SV shear data. In some embodiments, only a vertical, single-component receiver may be present (or have been present in the case of legacy data) at each receiver station.

Systems and methods are described for extracting SV-SV data from P-wave seismic data acquired with a vertical-force source and vertical geophones in situations where P-wave data are acquired across areas of exposed high-velocity rocks.

Systems and methods are described for extracting P-SV data from P-wave seismic data acquired with a vertical-force source and vertical geophones in situations where P-wave data are acquired across areas of exposed high-velocity rocks.

In some embodiments, there is no requirement of any specific positioning of receiver relative to source. In some embodiments, the systems and methods described herein may apply whether source and receiver are both on the Earth surface, at the same elevation, or at distinctly different elevations.

In some embodiments, upgoing SV events are not used in imaging; instead, only the upgoing P part of SV-P data are used in imaging.

In some embodiments, the sources may have known or predetermined locations relative to surface-based receivers and the direction of travel of energy that reaches the receivers at their receiver stations may be known before processing of the received data.

The principal seismic reflection data that are acquired to evaluate geological conditions across onshore areas are compressional-wave (P-wave) data. From a historical perspective, numerous large libraries of legacy seismic data exist, with the ages of these data extending back into the 1950's and 1960's. Most legacy seismic data are P-wave data.

The term "land-based" seismic data refers to any seismic data acquired in non-marine environments, which would include data acquired across swamps, marshes, and shallow coastal water, as well as data acquired across exposed land surfaces. Land-based P-wave data are generated using vertical-force sources. This term "vertical-force source" includes any seismic source that applies a vertical force to the Earth. Included in the broad range of vertical-force seismic sources are vertical vibrators, vertical impacts, and shot-hole explosives.

P-wave land-based seismic data are recorded using vertical geophones or other vertically oriented seismic sensors. When acquiring P-wave seismic data, the sensor deployed at each receiver station can be either single-component or three-component as long as sensor elements in each receiver package measure vertical movement of the Earth.

One or more embodiments described herein may allow SV shear-wave data to be extracted from P-wave data acquired with vertical-force sources and vertical sensors. One or more embodiments may apply whether a sensor package is single-component or three-component. One or more embodiments may apply to legacy P-wave seismic data as well as to P-wave data acquired in the present day.

One or more embodiments described herein may allow SV shear-wave data to be extracted from either 2D or 3D P-wave data.

SV-to-P Seismic Mode

The embodiments that are configured to extract SV shear-wave data from P-wave data use the SV-to-P converted seismic mode. The notation SV-P will be used to designate this wave mode. In this notation, the first term identifies the downgoing seismic wave (SV) that illuminates geologic targets, and the second term designates the upgoing reflected wave (P) from those targets. To maintain consistent notation, standard P-wave data will be labeled as P-P data, meaning the downgoing illuminating wavefield is a P-wave, and the upgoing reflected wavefield is also a P-wave.

Figure 21:
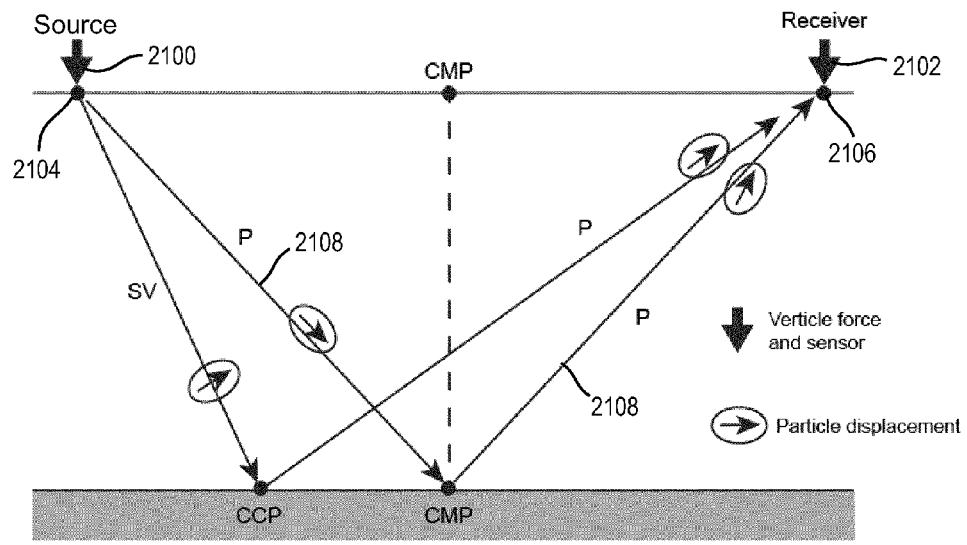
FIG. 21 is a raypath diagram illustrating a comparison of P-P and SV-P imaging of subsurface geology, according to an exemplary embodiment.
Figure 22:
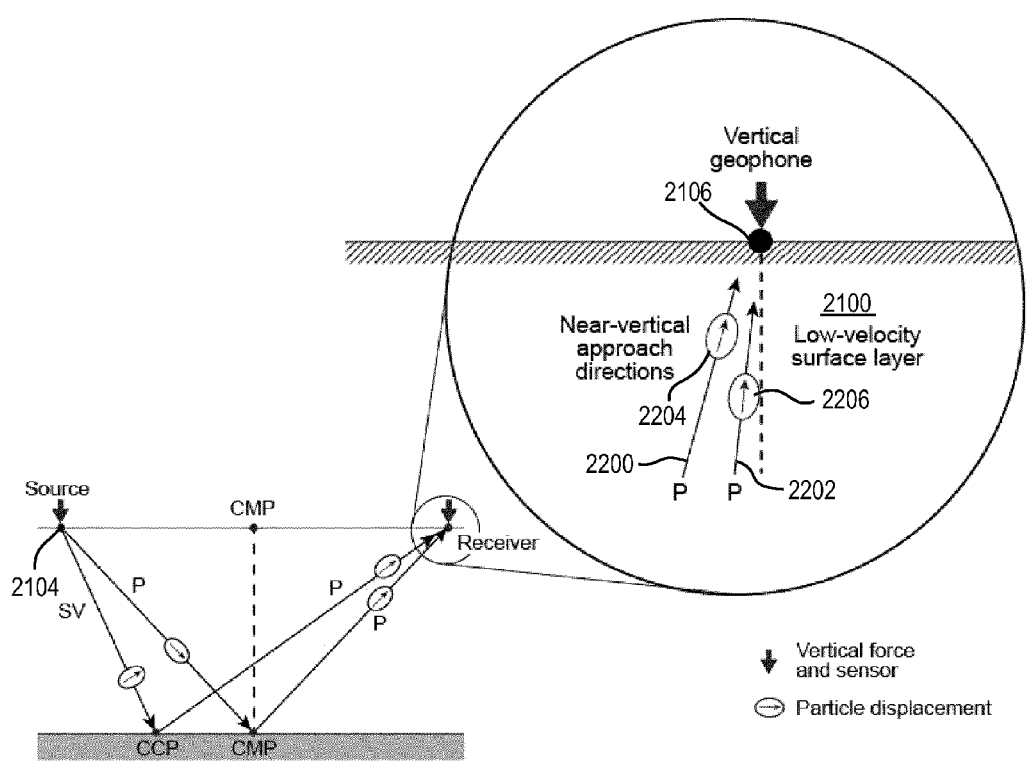
FIG. 22 is a raypath diagram illustrating an approach direction of upgoing P-P and SV-P raypaths at a receiver station when the top Earth layer is low-velocity unconsolidated sediment, according to exemplary embodiment.

Raypath diagrams comparing SV-P imaging of subsurface geology and conventional P-P imaging are illustrated on FIG. 21. The bold arrows 2100, 2102 drawn at the source station 2104 and receiver station 2106 are vertical to illustrate: (1) the seismic source applies a vertical force vector to the Earth, and (2) each sensing geophone is oriented vertically or otherwise configured to sense or measure vertical movement of the Earth. Receiver 2102 may be a vertical geophone, a vertical component of a multi-component geophone, or another single- or multi-component geophone configured to sense, measure or detect vertical movement of the Earth (e.g., a "54 degree" geometry geophone or Gal'perin geophone). As described hereinabove, a vertical-force seismic source produces not only P waves but also SV and SH shear waves. Consequently, both downgoing P and downgoing SV raypaths are shown propagating away from the vertical-force source station 2104 on FIG. 21. Segments of downgoing and upgoing raypaths are labeled either P or SV to indicate the specific wave mode that travels along each segment of each raypath. Circled arrows on each raypath segment identify the direction in which the wave mode acting on that raypath segment displaces the Earth. The data polarities indicated by these particle displacement vectors agree with the polarity conventions defined by Aki and Richards (1980).

"Common-midpoint" imaging may be used to produce P-P stacked images of the Earth's subsurface. In a flat-layered Earth, when the velocity of the downgoing wavefield that illuminates a geologic target is the same as the velocity of the upgoing reflected wavefield from that target, as it is for P-P data, the reflection point (image point) is half way between the source and the receiver. Therefore, the terms "common midpoint" or "CMP" are used to describe this imaging concept.

When seismic images are made using a downgoing illuminating wavefield that has a velocity that differs from the velocity of the upgoing reflected wavefield, a different concept called "common-conversion-point" imaging is used to construct stacked images of geologic targets. The abbreviation "CCP" is used to indicate this seismic imaging strategy. CCP imaging techniques are used to construct stacked images from SV-P data because the downgoing SV mode has a velocity that differs from the velocity of the upgoing P mode (FIG. 21).

As shown on FIG. 21, the upgoing events that arrive at a receiver station are P-wave events for both P-P and SV-P modes. A concept not illustrated in this simplified, straight-raypath model is that a P raypath curves to become almost true-vertical when it enters an unconsolidated, low-velocity layer 2100 that covers most of the Earth's surface. This principle is illustrated on FIG. 22. When upgoing P raypaths 2200, 2202 bend to almost true-vertical as they approach a receiver station 2106, their particle displacement vectors 2204, 2206 align with vertically oriented geophones at receiver station receiver station 2106 and induce a strong response in a vertical geophone. Because both legacy P-wave seismic data and present-day P-wave data are recorded with vertical geophones, these P-wave data contain not only P-P modes, but also SV-P modes, such as raypath 2200 illustrated in FIG. 22.

Figure 36:
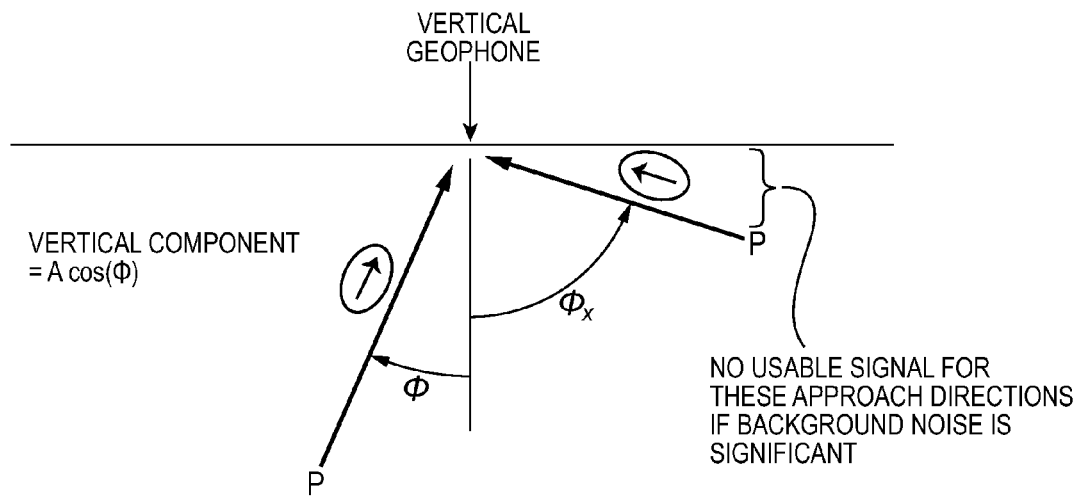
FIG. 36 is a diagram of approach angles of P waves to a vertical geophone, according to an exemplary embodiment.

As illustrated in FIG. 36, if a P-wave is traveling in a true horizontal direction when it arrives at a vertical geophone, the P-wave will not generate any response in the geophone. If a P-wave is traveling in a true vertical direction when it arrives at a vertical geophone, the P-wave will induce a maximum geophone response (A). At any intermediate angle of approach, the geophone response produced by an arriving P-wave will be A cos(Φ), where Φ is the approach angle measured relative to true vertical, and A is the maximum response the P-wave produces when it travels in a true vertical direction. At some non-vertical approach angle $\Phi_x$, a P-wave will still have a small vertical component that will produce a small response in a vertical geophone, but not a "usable" signal. The exact value of cutoff angle $\Phi_x$ varies from location to location, and varies day to day at any given location, depending on the level of background noise that is present. Background noise includes wind-generated shaking of local vegetation, mechanical vibrations from nearby machinery or vehicular traffic, water drops falling from the sky or dripping from close-by trees and bushes, and other factors that induce disturbances close to a geophone station.

Figure 23:
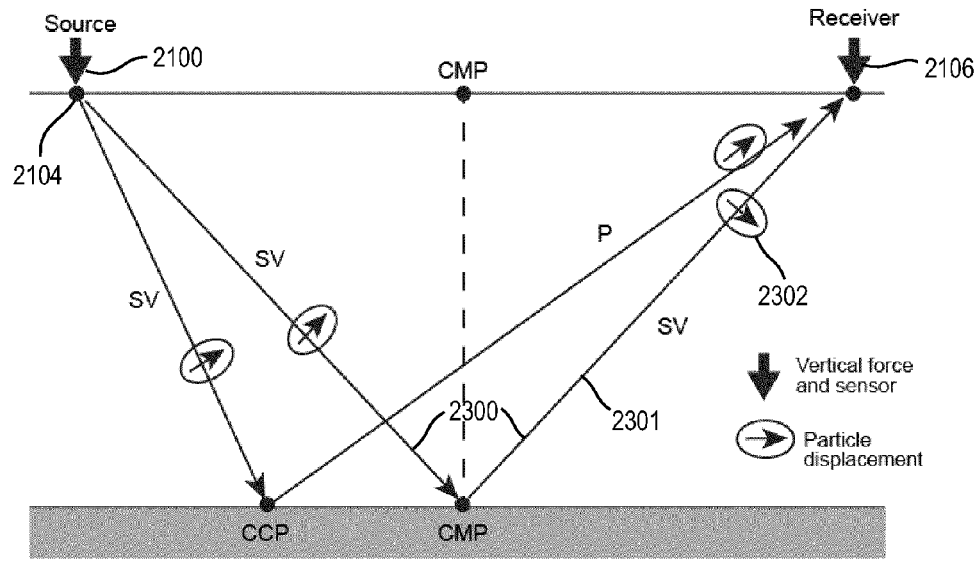
FIG. 23 is a raypath diagram showing principles of SV-SV and SV-P imaging, according to an exemplary embodiment.

An additional imaging option is illustrated on FIG. 23. In this scenario, the raypath labeling acknowledges a vertical-force source 2104 causes an SV-SV mode 2300 which arrives at a receiver station receiver station 2106 just as does a P-P mode 2108 (FIG. 21). However, when the principle is applied that, in most Earth surface conditions, raypaths approach a surface receiver in an almost or substantially vertical direction, the orientation of the particle displacement vector 2302 associated with an upgoing SV raypath 2301 does not activate a vertical geophone (as the upgoing P waves do in FIG. 22). Thus for some P-wave data acquired with vertical geophones, it may not be possible to extract SV-SV reflection events (or P-SV reflection events) from the response of vertical-geophone data.

Figure 24:
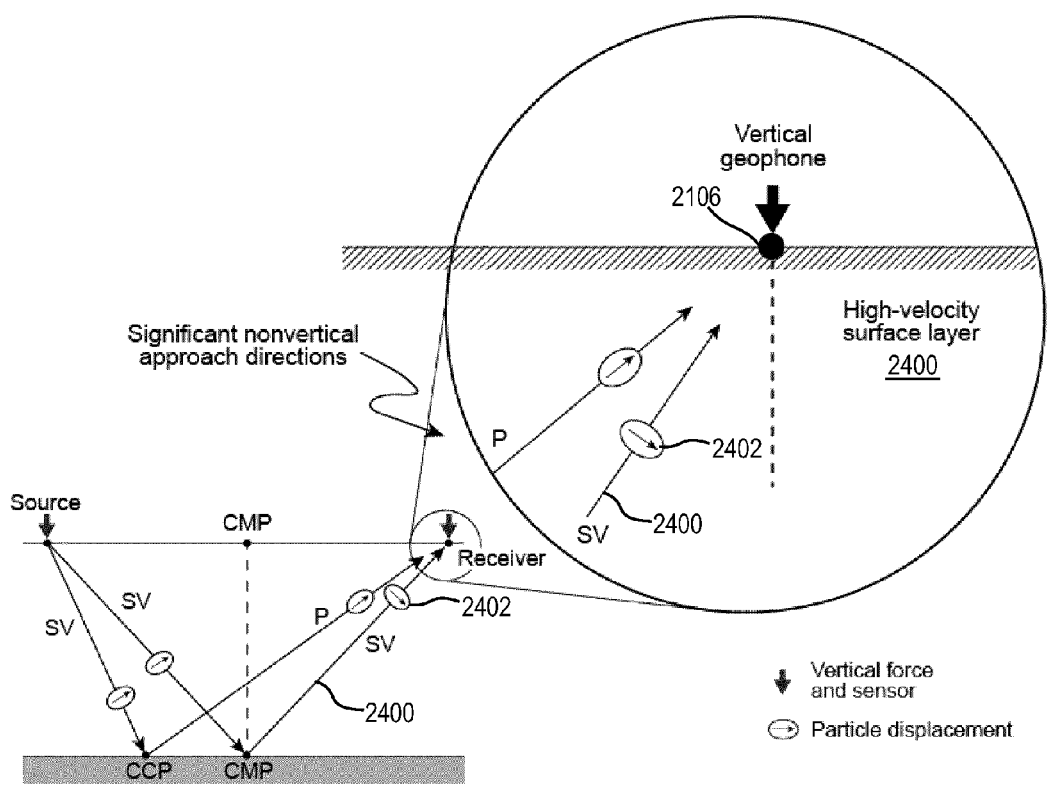
FIG. 24 is a raypath diagram showing approach direction of upgoing P and SV raypaths at a receiver stations when the top Earth layer is high-velocity rock, according to an exemplary embodiment.

An exception to the principle described on FIG. 23 occurs when vertical geophones are deployed across an Earth surface where the top Earth layer is a hard, high-velocity material, as in layer 2400 in FIG. 24. In this type of surface condition, an SV raypath 2400 will arrive at a receiver station receiver station 2106 along a substantially nonvertical trajectory, and the vertical component of an SV particle displacement vector 2402 will activate a vertical geophone 2106 (FIG. 24). Thus, when P-wave data are acquired across high-velocity surfaces with vertical geophones, data having an upgoing SV mode are recorded by vertical geophones in addition to SV-P data. As a result, both P-SV and SV-SV data, which both have upgoing SV modes, are recorded by vertical geophones in situations where geophones are deployed across a high-velocity surface layer. Both upgoing P and SV raypaths in FIG. 24 approach receiver station receiver station 2106 from a direction that differs significantly from near-vertical.

Figure 37:
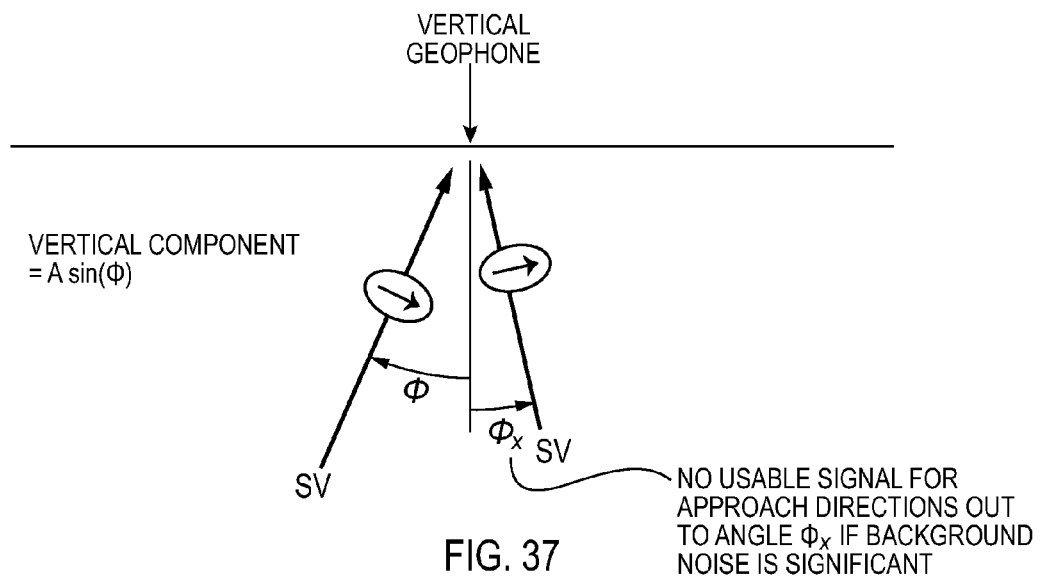
FIG. 37 is a diagram of approach angles of SV waves to a vertical geophone, according to an exemplary embodiment.

As illustrated in FIG. 37, where the upgoing mode is SV, the response that an SV arrival induces in a vertical geophone is $A\sin(\Phi)$, rather than $A\cos(\Phi)$ as it is for an upgoing P mode. The larger $\Phi$ is, the stronger the SV response is. As S velocity increases in the top-most Earth layer, $\Phi$ increases. How big $\Phi$ should be, and how large S velocity should be to ensure there is an appreciable value of $\Phi$, depend again on the magnitude of the background noise at the receiver station.

One or more embodiments described herein may acquire P-SV data without the use of three-component geophones and without extracting the upgoing SV mode from horizontal-geophone responses. One or more embodiments described herein allows P-SV data to be acquired with single-component vertical geophones, for example in situations where the top Earth layer is high-velocity rock. One or more embodiments described herein may acquire P-SV data without the use of a receiver configured to sense, detect or measure horizontal movement of the Earth.

Figure 25:
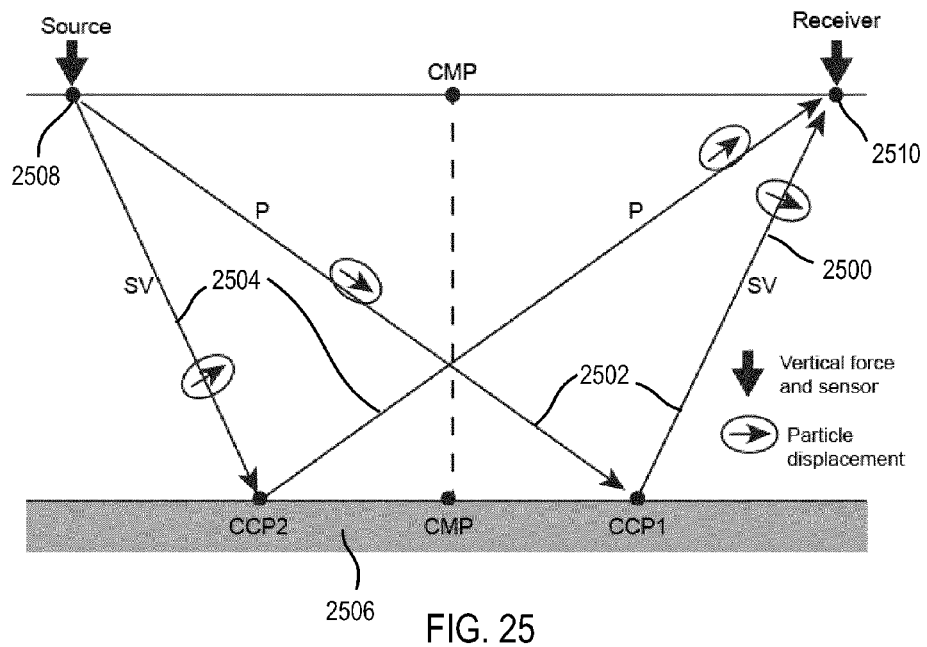
FIG. 25 is a raypath diagram illustrating a comparison of P-SV and SV-P raypaths, according to an exemplary embodiment.

P-SV and SV-P raypaths are compared on FIG. 25. Because upgoing raypaths become near-vertical in a low-velocity surface layer (FIG. 22), the orientation of particle displacement associated with the upgoing SV segment 2500 of a P-SV mode 2502 fails to activate a vertical geophone in many Earth surface environments. Thus, in some vertical-geophone P-wave data, there will be no usable P-SV data. However, P-SV data will be recorded by a vertical geophone in cases where the top Earth layer has high velocity (FIG. 24).

SV-P Image Space

The imaging principles of P-SV and SV-P modes 2502, 2504 illustrated on FIG. 25 emphasize an SV-P mode images geology 2506 closer to a source station 2508 than to a receiver station 2510. When P-wave data are acquired with a source-receiver geometry in which receivers occupy an area that differs significantly from the area occupied by sources, it is useful to understand how the image space spanned by SV-P data differs from the image space spanned by the P-SV mode.

Figures 26A, 26B:
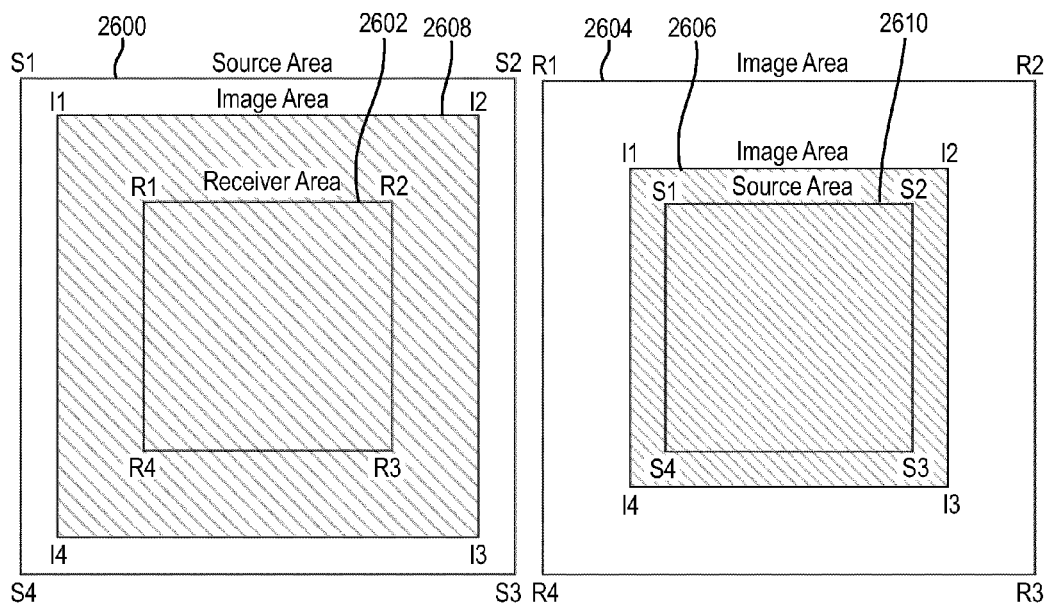
FIGS. 26A and 26B are exemplary diagrams illustrating size and position of SV-P image space for a 3D P-wave data-acquisition geometries.

FIGS. 26A and 26B show two options in which P-wave data are acquired across the same image space using vertical-force sources and vertical geophones. The figures illustrate source-receiver geometries from an aerial view looking downward, showing the size and position of SV-P image space (I1, I2, I3, I4) for two three-dimensional P-wave data-acquisition geometries. With the source-receiver geometry shown on FIG. 26A, the area spanned by source stations 2600 is larger than the area spanned by receiver stations 2602. In the option shown as FIG. 26B, the reverse is true, and receivers span an area 2604 larger than the area spanned by sources 2610. The CMP P-wave image space will be the same for both geometries because the same number of source-receiver pairs is involved, and these station pairs occupy the same Earth coordinates in both geometries. To avoid graphic clutter, the boundaries of P-P image space are not shown on the drawings, but if drawn, the boundaries of P-P image space would be half-way between the boundaries of receiver area R1-to-R4 and the boundaries of source area S1-to-S4 in both FIGS. 26A and 26B, reflecting the midpoint aspect of the CMP method.

The size and position of SV-P image space resulting from these two distinct data-acquisition geometries of FIGS. 26A and 26B differ. SV-P image space covers a large area 2608 when the geometry option of FIG. 26A is used and a relatively smaller area 2606 when the geometry option of FIG. 26B is used. For both geometries, SV-P image points are positioned closer to source stations than to receiver stations. Because of the reciprocal relationships between the image coordinates of SV-P and P-SV modes (FIG. 25), the image space spanned by P-SV data when the geometry of FIG. 26A is used would be the image space spanned by SV-P data in FIG. 26B. If the geometry of FIG. 26B is used, then P-SV data would span the SV-P image space drawn on FIG. 26A. Because the same number of source-receiver pairs is involved in each data-acquisition geometry in this exemplary embodiment, SV-P stacking fold across the larger area (FIG. 26A) will be lower than SV-P stacking fold across the smaller area (FIG. 26B). Each geometry offers advantages for the SV-P mode, depending on the signal-to-noise ratio of SV-P data. If the SV-P signal-to-noise ratio is rather high, then the option of FIG. 26A extends good-quality SV information over a larger area than what is imaged by P-SV data. If the SV-P signal-to-noise ratio is low, then increasing SV-P fold over a smaller area as in FIG. 26B should create better quality SV information than what is provided by P-SV data that extend over a larger area with reduced fold.

SV-P Data Processing—Data Polarity

As explained with reference to the embodiments of FIGS. 1-20, to extract SV-SV and SH-SH modes from data generated by a vertical-force source, the processing reverses the polarity of data acquired by horizontal geophones stationed in the negative-offset direction relative to the polarity of data acquired by horizontal geophones deployed in the positive-offset direction. That data polarity adjustment does not apply to SV-P data in this embodiment because the SV-P wave mode is recorded by vertical geophones, not by horizontal geophones.

Figure 27:
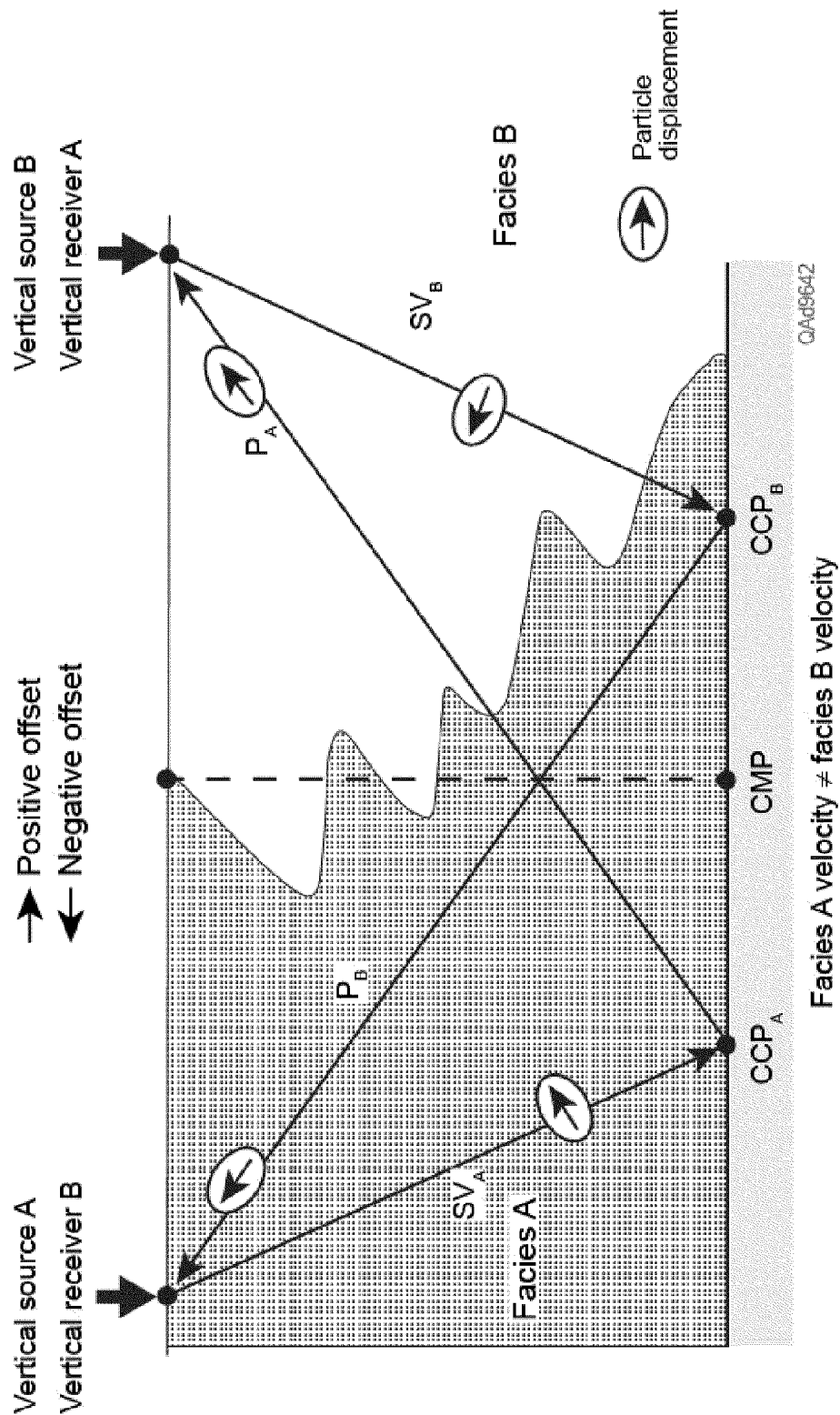
FIG. 27 is a diagram of a subsurface geology illustrating positive-offset and negative-offset domains for SV-P data and Facies A and B causing different velocities, according to an exemplary embodiment.

Raypaths involved in positive-offset and negative-offset SV-P imaging are illustrated on FIG. 27. In this diagram, SV-P data generated at vertical source A and recorded at vertical receiver A are labeled $SV_A$ for the downgoing SV mode and $P_A$ for the upgoing P mode. The offset direction from vertical source A to vertical receiver A is arbitrarily defined as positive offset. When the positions of source and receiver are exchanged, creating vertical source B and vertical receiver B, the offset direction reverses and is defined as negative offset. The raypath for negative-offset SV-P data is labeled $SV_B$ for the downgoing SV mode and $P_B$ for the upgoing P mode. The polarities shown for the downgoing SV particle-displacement vector conform to the polarity convention established by Aki and Richards (1980) and documented by Hardage et al. (2011). Note that for both positive-offset data and negative-offset data, the vertical component of the particle-displacement vectors for the upgoing P modes are in the same direction (pointing up), hence there is no change in SV-P data polarity between positive-offset data and negative-offset data.

If the SV-SV mode is extracted from P-wave data in situations where a high-velocity Earth surface allows the upward traveling SV mode to energize a vertical geophone (FIG. 24), it likewise is not necessary to adjust the polarity of the vertical-geophone data in either offset-direction domain. Adjusting the polarity of upward traveling SV modes in the negative-offset domain to agree with the polarity in the positive-offset domain is used when the SV mode is recorded by horizontal geophones, not when they are acquired by vertical geophones.

SV-P Data Processing—Velocity Analysis

The embodiments described herein may be configured to perform a velocity analysis as a data-processing step when constructing seismic images. When CMP data are processed, it is not necessary to be concerned about which offset domain (positive or negative) data reside in when performing velocity analyses. If the velocities of downgoing and upgoing wave modes are the same (CMP data processing), the same velocity behavior occurs in both offset directions. However, when converted modes are involved, the method may comprise two velocity analyses—one analysis for positive-offset data and a second analysis for negative-offset data.

The reason for this dual-domain velocity analysis is illustrated on FIG. 27, which shows two distinct rock facies between two surface-based source and receiver stations. Laterally varying rock conditions such as shown on this diagram can be found in many areas. For purposes of illustration, assume the P and S velocities in Facies A are significantly different from the P and S velocities in Facies B. The travel time required for a positive-offset SV-P event to travel raypath $SV_A$-$P_A$ is not the same as the travel time for a negative-offset SV-P event to travel raypath $SV_B$-$P_B$. This difference in travel time occurs because the $SV_A$ mode is totally in Facies A, but the $SV_B$ mode is almost entirely in Facies B. Likewise, all of mode $P_B$ is in Facies A, but mode $P_A$ has significant travel paths inside Facies A and Facies B. Because travel times differ in positive-offset and negative-offset directions, one velocity analysis is done on positive-offset data, and a separate velocity analysis is done for negative-offset data.

Figure 28A:
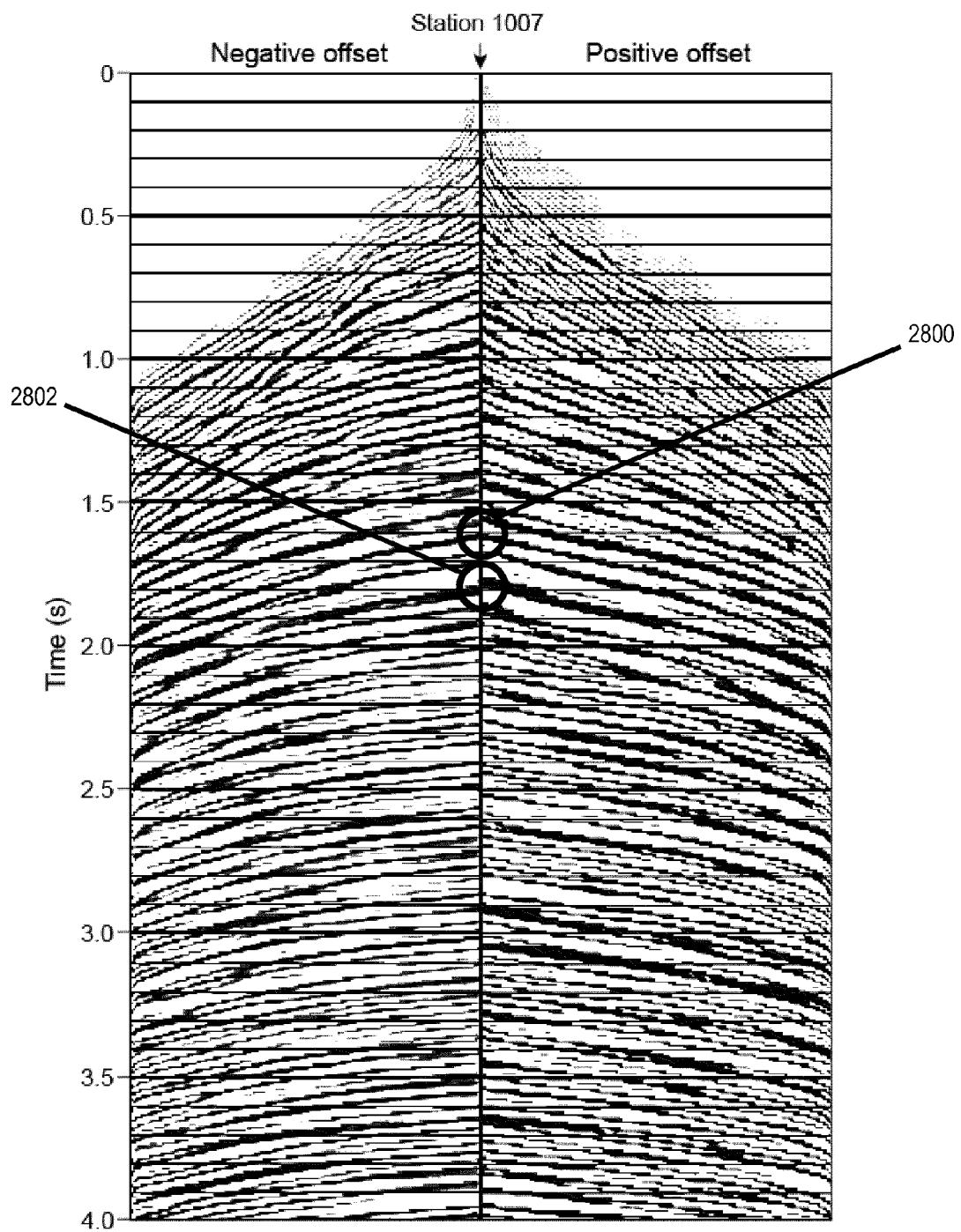
FIGS. 28A and 28B are examples of SV-P primary and multiple reflections extracted from vertical-geophone P-wave seismic data, according to an exemplary embodiment.
Figure 28B:
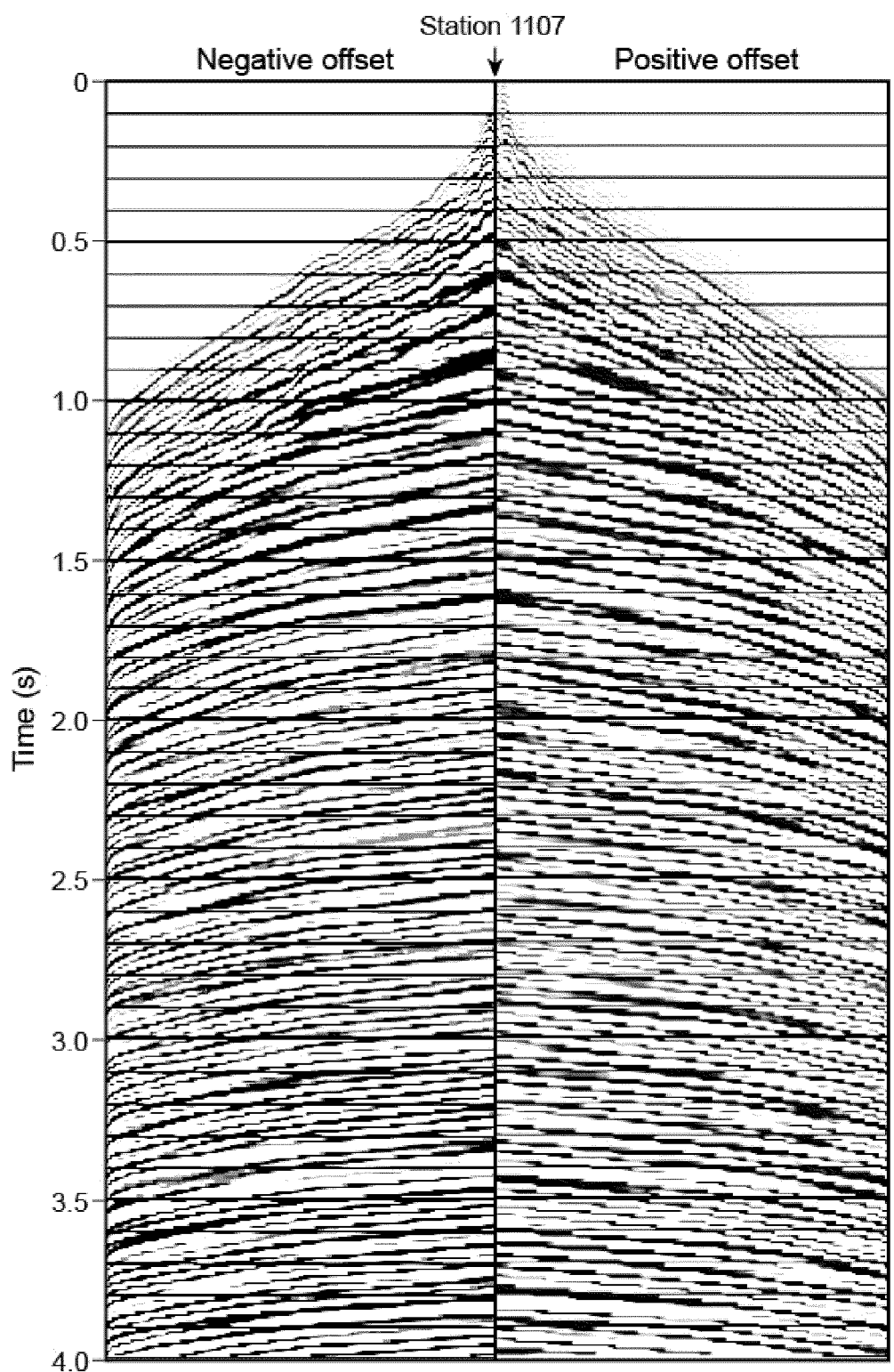

Examples of SV-P reflection events extracted from P-wave data by velocity analysis are displayed as FIGS. 28A and 28B. FIGS. 28A and 28B illustrate SV-P reflections extracted from vertical-geophone P-wave seismic data. The seismic source was a shot-hole explosive (a vertical-force source). Two shot signal gathers or acquisitions generated at source stations 1007 and 1107 are displayed after velocity filtering. For each shot gather, velocity analyses were done separately for positive-offset data and negative-offset data. In these examples, there is not a large difference between positive-offset and negative-offset velocities. As a result, the curvatures of negative-offset SV-P reflections are approximately the same as the curvatures of positive-offset SV-P reflections.

Only reflection events having curvatures coinciding with downgoing $V_S$ velocities and upgoing $V_P$ velocities appropriate for the rock sequence where these data were acquired are accepted. Other velocities are rejected. These examples come from a seismic survey for which the energy sources were vertical-force sources, and the analyzed data were recorded by vertical geophones. Analyses for two common-shot trace gathers are shown. For each shot gather, positive-offset data were subjected to velocity analysis separately from negative-offset data. Each velocity analysis rejected reflection events having velocities that differed by more than 20-percent from the velocities used to create high-quality P-SV images across the same image space. The result is that high-quality SV-P reflections are extracted from vertical geophone data for both positive-offset P-wave data and negative-offset P-wave data. The principal difference in P-SV and SV-P velocity analyses in this exemplary embodiment is that P-SV velocity analyses are done on data recorded by horizontal geophones; whereas, SV-P velocity analyses are done on data recorded by vertical geophones.

To make seismic images from the reflection events shown in FIGS. 28A and 28B, reflection events for a number of source stations in the survey (e.g., at least 10, at least 100, at least 1000, etc.) would be generated. The reflection event data then would be binned, stacked and migrated. For example, the reflection event data may be binned using CCP or ACP binning strategies to define those coordinates. The reflection event data may then be stacked and then migrated after stack to generate an image. Migration physically moves reflections from where they are in reflection time to where they should be in image time.

The reflection events shown in FIGS. 28A and 28B comprise primary reflection events and multiple reflection events. Multiple reflection events result from multiple reflections of seismic waves caused by reverberations between interfaces of layers of the Earth. Multiple reflection events can cause an image to not be positioned correctly in travel time space. Multiple reflections may be filtered out of the reflection events in subsequent processing.

The reflection events shown in FIGS. 28A and 28B comprise an interpreted primary reflection at a point where reflection events in negative offset and positive offset domains meet, such as point 2800. The reflection events comprise an interpreted multiple reflection at a point where reflection events in negative offset and positive offset domains do not meet, such as point 2802.

SV-P Data Processing: Constructing SV-P Images

The processing of SV-P data for generating images can be done in a number of ways, such as: (1) by CCP binning and stacking of SV-P reflections, followed by post-stack migration of the stacked data, or (2) by implementing prestack time migration, depth migration or reverse-time migration of SV-P reflections. Each method has its own benefits. For example, method 2 (prestack migration) is a more rigorous approach; method 1 (CCP binning/stacking and post-stack migration) is lower cost. To perform CCP binning and migration of SV-P data, CCP coordinates of SV-P image points are mirror images of CCP image points associated with P-SV data, as illustrated on FIG. 29. The SV-P data-processing strategy may be based on this mirror-image symmetry of CCP image-point profiles for P-SV and SV-P modes.

Because positive-offset and negative-offset SV-P data have different velocity behaviors, two separate CCP binning/ stacking steps are done to create an SV-P stacked image. In a first step, positive-offset data are binned and stacked into an image using velocities determined from positive-offset data, and in a second step, negative-offset data are binned and stacked into a second image using velocities determined from negative-offset data. The final SV-P image is the sum of these two images. This same dual-image strategy may be implemented when binning and stacking P-SV data. The three stacked images (negative-offset image, positive-offset image, and summed image) can be migrated and used in geological applications. As documented by Hardage et al. (2011) relative to P-SV imaging, some geologic features are sometimes better seen in one of these three images than in its two companion images. Thus all three stacked and migrated images may be used in geological interpretations.

SV-P Data Processing: Method 1—CCP Binning, Stacking, and Post-Stack Migration

Figure 29:
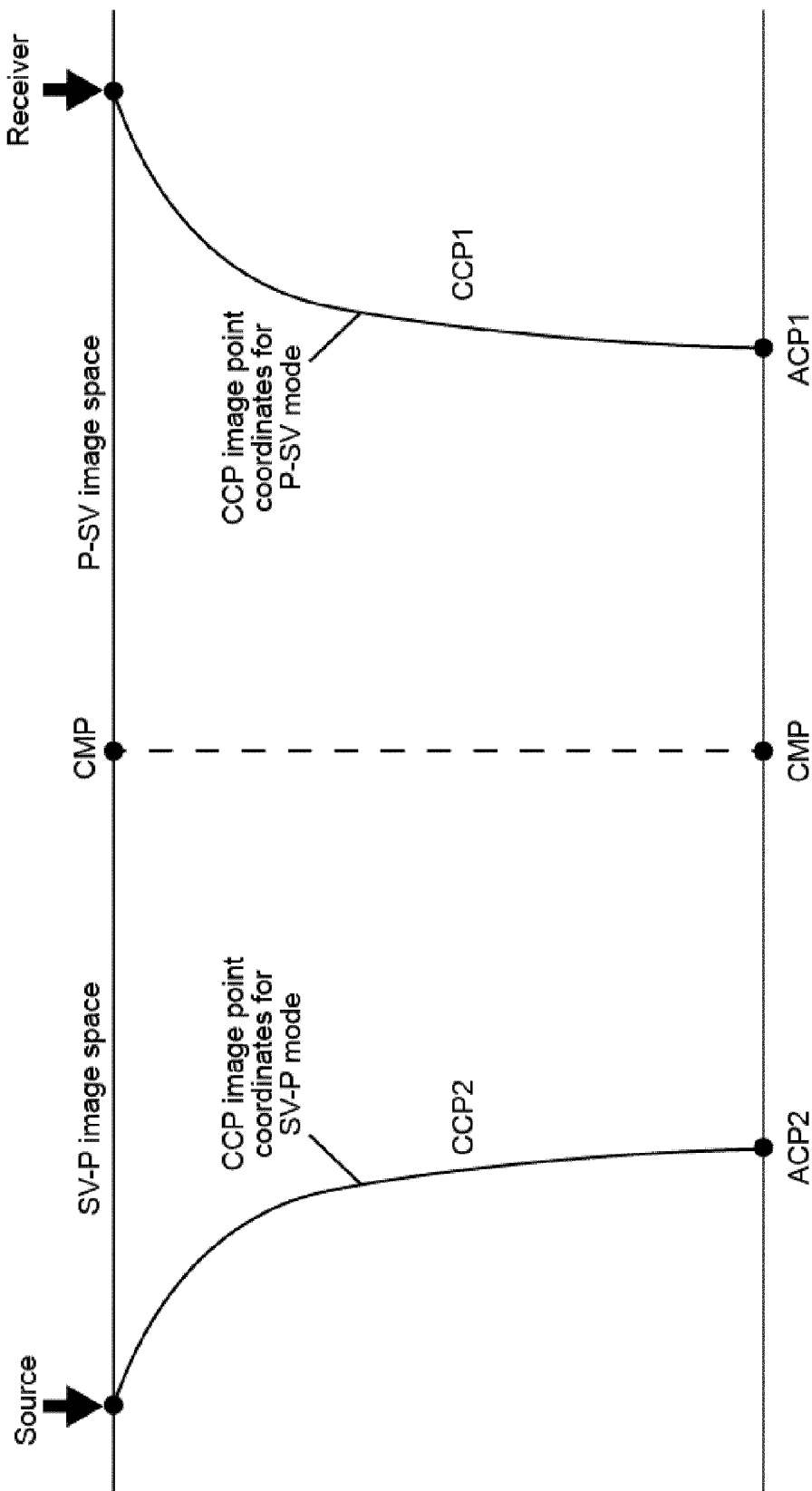
FIG. 29 is a diagram illustrating SV-P and P-SV CCP imaging principles, according to an exemplary embodiment.

Some commercial seismic data-processing software that can be purchased or leased by the geophysical community can calculate converted-mode image coordinates called asymptotic conversion points, which are abbreviated as ACP. Two examples are Vista seismic data processing software, sold by Geophysical Exploration & Development Corporation, Alberta, Canada and ProMAX seismic data processing software, sold by Halliburton Company, Houston, Tex. An ACP is an image coordinate where the trend of correct CCP image points for a specific source-receiver pair becomes quasi-vertical (FIG. 29). Deep geology is correctly imaged using P-SV data binned using ACP coordinates, and would also be correctly imaged by SV-P data binned using ACP concepts that are adjusted for SV-P data. However, shallow geology is not correctly imaged for either P-SV data or SV-P data when ACP binning methods are used. True CCP binning can produce correct stacked images of both shallow and deep geology for converted modes appropriate for post-stack migration. On FIG. 29, the asymptotic conversion point for the P-SV mode is labeled ACP1, and the asymptotic conversion point for the SV-P mode is labeled ACP2. Neither image point is correct except where their associated CCP binning profile is quasi-vertical (i.e., for deep targets). As emphasized above, these two image points are mirror images of each other relative to the common midpoint (point CMP on FIG. 29) for any source-receiver pair involved in a seismic survey.

One exemplary method of producing SV-P CCP/ACP binning comprises adjusting software that performs CCP binning for P-SV data so that the coordinates of sources and receivers are exchanged when determining image-point coordinates. Referring to the source-receiver pair drawn on FIG. 29, an exchange of station coordinates has the effect of moving the receiver station to the source station and the source station to the receiver station. Software used to process P-SV data will then calculate the image point trend labeled CCP2 rather than the trend labeled CCP1. Using coordinates specified by profile CCP2 to bin SV-P reflections extracted from vertical-geophone data can produce SV-P images. The SV-P images should be equal in quality to what is now achieved with P-SV data.

Curve CCP1 shows the trend of common-conversion points for P-SV data. Curve CCP2 shows the trend of common-conversion points for SV-P data. ACP1 and ACP2 are asymptotic conversion points for trends CCP1 and CCP2, respectively. CCP1 and CCP2 are mirror images of each other relative to the common midpoint CMP for this source-receiver pair.

SV-P Data Processing: Method 2—Prestack Migration

Figure 30:
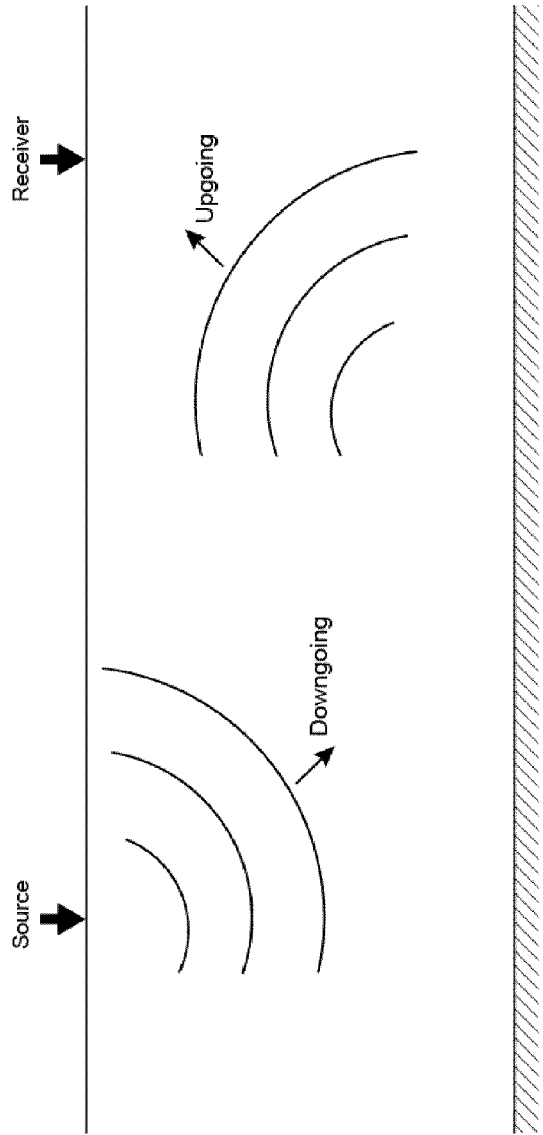
FIG. 30 is a diagram and table illustrating prestack migration, according to an exemplary embodiment.

According to an alternative embodiment, prestack migration can be done so as to create a time-based seismic image or a depth-based seismic image. Referring to FIG. 30, prestack migration may be done by numerically propagating a specific seismic wavefield downward from each source station to illuminate geologic targets, and then numerically propagating a specific seismic wavefield upward from reflecting interfaces to each receiver station.

The specific wavefields used in prestack time migration, depth migration, or reverse-time migration may be created by applying velocity filters to data recorded by vertical geophones so that reflection events having only a predetermined velocity behavior remain after velocity filtering. The predetermined velocity behaviors of interest are those associated with the following seismic modes: P-P, P-SV, SV-SV, and SV-P. If 3C geophones are used in combination with a vertical-force source, a fifth velocity filtering option is to extract SH-SH reflection events. However, for this latter option, the filtering action is applied to data recorded by transverse horizontal geophones. The result is an image of geologic interfaces seen by each specific seismic mode. For simplicity, only one source station and only one receiver station are shown on FIG. 30.

The table on FIG. 30 considers only wave modes produced by a vertical-force source as described hereinabove with reference to FIGS. 1-20 (P, SV, SH) and the responses of only vertical geophones. For an Earth with isotropic velocity layers, there are five possible combinations of downgoing (D) and upgoing (U) modes. These possibilities are labeled Option 1 through Option 5 in the figure table.

As indicated by the table on FIG. 30, prestack migration software can create an SV-P image if the velocity of the downgoing wavefield is that for a propagating SV wavefield and the velocity of the upgoing wavefield is that for a P wavefield. Examples of SV-P data that would be used for pre-stack migration Option 3 listed on FIG. 30 (SV-P imaging) are exhibited on FIG. 28. For a 3D P-wave seismic survey, velocity filtering similar to that done to produce these two example shot-gathers would be done for all shot gathers across a survey area. If a survey involves 1000 source stations, then 1000 velocity-filtered shot-gathers similar to those on FIG. 28 would be created. All 1000 sets of SV-P reflections would be pre-stack migrated downward through an Earth model having layers of SV velocities and then migrated upward through an Earth model having layers of P-wave velocities.

In FIG. 30, a time-space distribution of velocities for a specific seismic mode is defined so that a specific downgoing wavefield (D) can be propagated through this Earth velocity model from every source station to illuminate targets. A second time-space distribution of velocities for a second specific seismic mode is then imposed to propagate that specific reflected upgoing wavefield (U) to every receiver station. The combinations of downgoing and upgoing velocities that can be implemented for a vertical-force source and vertical geophones are listed in the table of FIG. 30.

SV-P Data Processing—Determining S-Wave Velocity

To calculate either of the CCP binning profiles shown on FIG. 29, the processing system is configured to determine the S-wave velocity within the geology that is being imaged. If the alternate option of creating converted-mode images with prestack migration techniques is used (FIG. 30), the processing system is configured to generate reliable estimates of S-wave velocities within the rocks that are illuminated by the seismic data. Determining the S-wave velocity for calculating SV-P image points can be done in the same way that S-wave imaging velocities are determined for P-SV data. Methods for determining S-wave velocity for calculating converted-mode image points comprise:

1. Use 3-component vertical seismic profile (VSP) data acquired local to the seismic image area to calculate interval values of $V_P$ and $V_S$ velocities.
2. Use dipole sonic log data acquired local to the seismic image space to determine $V_P$ and $V_S$ velocities.
3. Combine laboratory measurements of $V_P/V_S$ velocity ratios for rock types like those being imaged with seismic-based estimates of P-wave velocities to calculate S-wave velocities.
4. Calculate CCP binning profiles for a variety of $V_P/V_S$ velocity ratios, make separate stacks of converted-mode data for each CCP trend, and examine the series of stacked data to determine which CCP profile produces the best quality image.

Any of these methods will provide reliable S-wave velocities to use for binning SV-P data. Alternate methods may be used.

Comparison of SV-P Data to P-SV Data

This application shows there are several similarities between SV-P data and P-SV data, according to some exemplary embodiments. There are also differences between the two wave modes, according to some exemplary embodiments. Some of these similarities and differences are listed in the table shown as FIG. 31. Similarities between SV-P and P-SV data include items 1, 5, and 6 (same energy source, same velocity analysis strategy, and same normal moveout (NMO) velocity behavior). Differences include items 2, 3, 4, and 7 (different receivers, different image coordinates, different CCP profiles, and different polarity behavior).

SV-P Data Processing Apparatus

Figure 32:
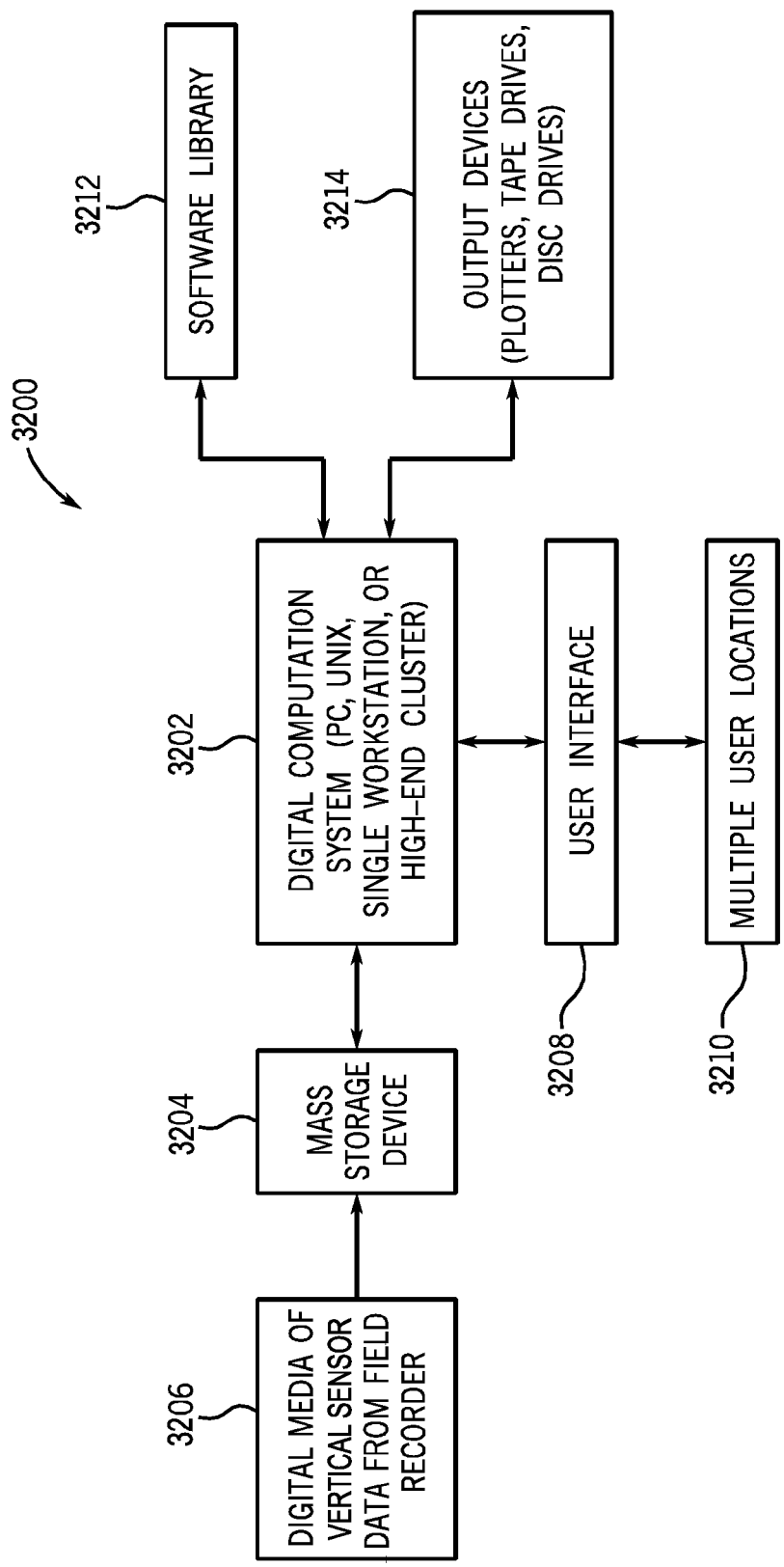
FIG. 32 is a block diagram of a data processing system for processing shear wave data from a vertical sensor, according to an exemplary embodiment.

Referring now to FIG. 32, a data processing system for processing SV-P data will be described. System 3200 is configured to extract SV shear data from vertical-sensor responses. System 3200 comprises a digital computation system 3202, such as a personal computer, UNIX server, single workstation, high-end cluster of workstations, or other computing system or systems. System 3202 comprises sufficient processing power to process large quantities of complex seismic data. A mass storage device 3204 or other memory is coupled to digital computation system 3202, which is configured to receive data from the field recorders or sensors stored on a digital media 3202, such as a memory card, hard drive, or other memory device. Mass storage device 3204 is configured to download or receive the multi-component seismic data from digital media 3206 and to store the data in a database.

In this embodiment, digital media 3206 comprises data received from a vertical sensor using a field recorder or receiver. The data on digital media 3206 may have been acquired recently or days, months, or years in the past. The data may have been recorded using a vertical force sensor having a sufficient listening time, for example of at least 5 seconds, at least 8 seconds, at least 10 seconds, or other periods of time. The data may have been acquired without the expectation of recovering SV-P data by the entity handling the acquisition of data and without knowledge of the presence of SV-P data in the data acquired from seismic reflections.

The remaining elements in FIG. 32 may comprise any of the embodiments described hereinabove with reference to FIG. 19, or other components. Software library 3212 may comprise processing algorithms configured to process the data according to any of the principles described hereinabove, for example with reference to FIGS. 21-31, and FIGS. 34 and 35 below.

SV-P Data Acquisition

Figure 33:
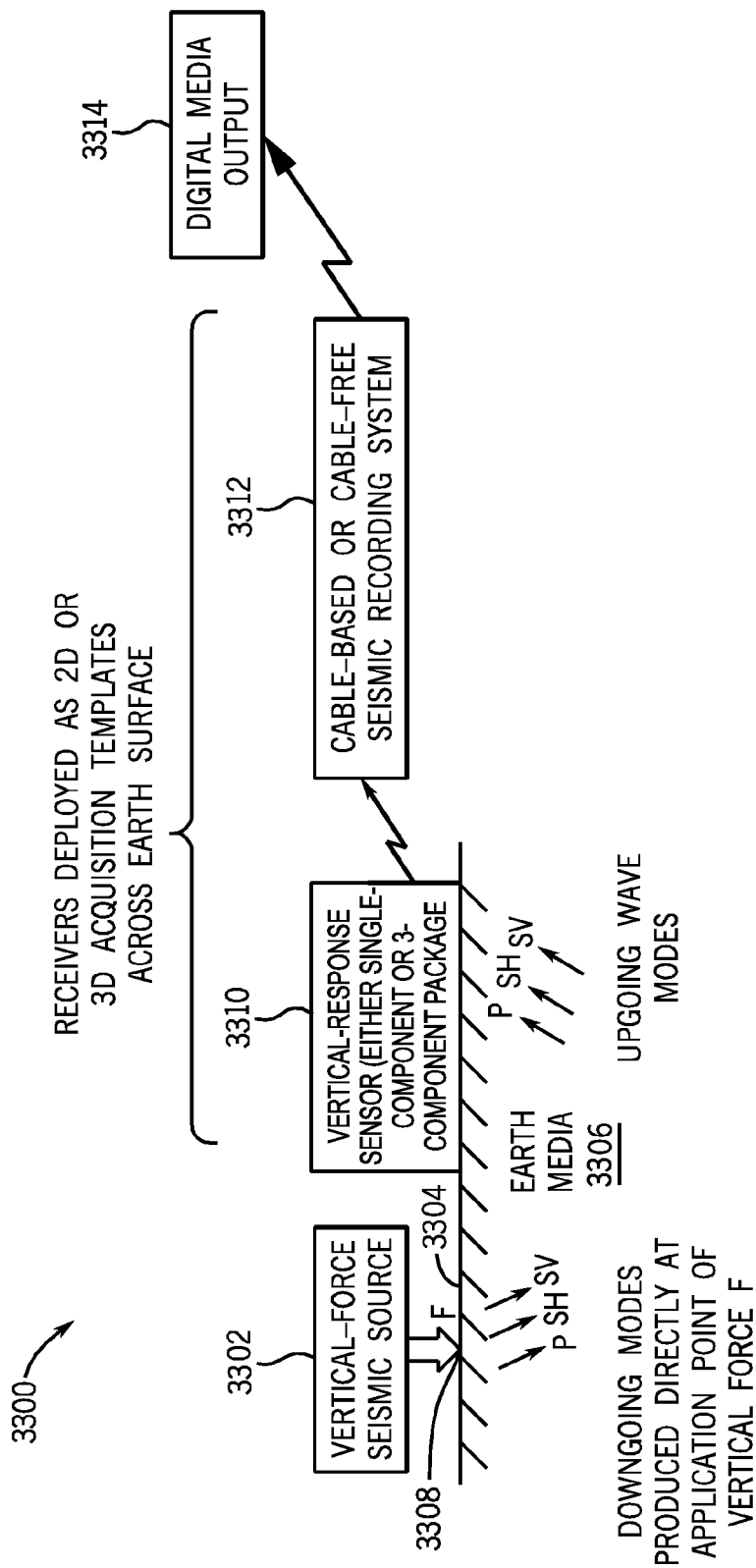
FIG. 33 is a block diagram of a data acquisition and processing system and method for acquiring and processing shear wave data from a vertical-force source using surface-based sensors, according to an exemplary embodiment.

Referring now to FIG. 33, a diagram of a data acquisition system 3300 and method for acquiring SV-P data from a vertical-force source using surface-based sensors will be described. A vertical-force seismic source 3302 is disposed on, near, or within a shallow recess of the Earth's surface 3304, which may comprise relatively high-velocity layers or portions or relatively low-velocity layers or portions. Source 3302 is configured to impart a vertical-force to surface 3304 to provide seismic waves into Earth media 3306. Source 3302 may comprise a vertical vibrator, shot-hole explosive, vertical-impactor, air gun, vertical weight-dropper or thumper, and/or other vertical-force sources. In this example, vertical-force source 3302 produces compressional P mode and both fundamental shear modes (SH and SV) in Earth 3306 directly at a point of application 3308 of the vertical-force source. In this embodiment, at least some of the SH and SV shear waves are generated at source 3302 and not by subsurface conversion caused by portions of Earth media 3306. The frequency waves may be provided in a frequency sweep or a single broadband impulse. A vertical-force source may be used without any horizontal-force sources.

A seismic sensor 3310 is along the Earth's surface, which may include being disposed on, near, or within a recess of the Earth's surface 3304. For example, in one embodiment, shallow holes may be drilled and sensors 3310 deployed in the holes to avoid wind noise, noise produced by rain showers, etc. Sensor 3310 is configured to detect or sense upgoing wave modes, reflected from subsurface sectors, formations, targets of interest, etc. In this embodiment, sensor 3310 may comprise a vertical-response sensor (either single-component or 3-component package) configured to sense compressional P modes and, as described herein, other modes such as SV-P (e.g., direct SV-P). In one embodiment, sensor 3310 may comprise a vertical-response sensor without horizontal-response sensors, for example only a single, vertical-response sensor. Various arrays and configurations of sources 3302 and sensors 3310 may be implemented in different embodiments.

The remaining elements in FIG. 32 may comprise any of the embodiments described hereinabove with reference to FIG. 17, or other components.

Data Processing in Low-Velocity Earth Surface

Figure 34:
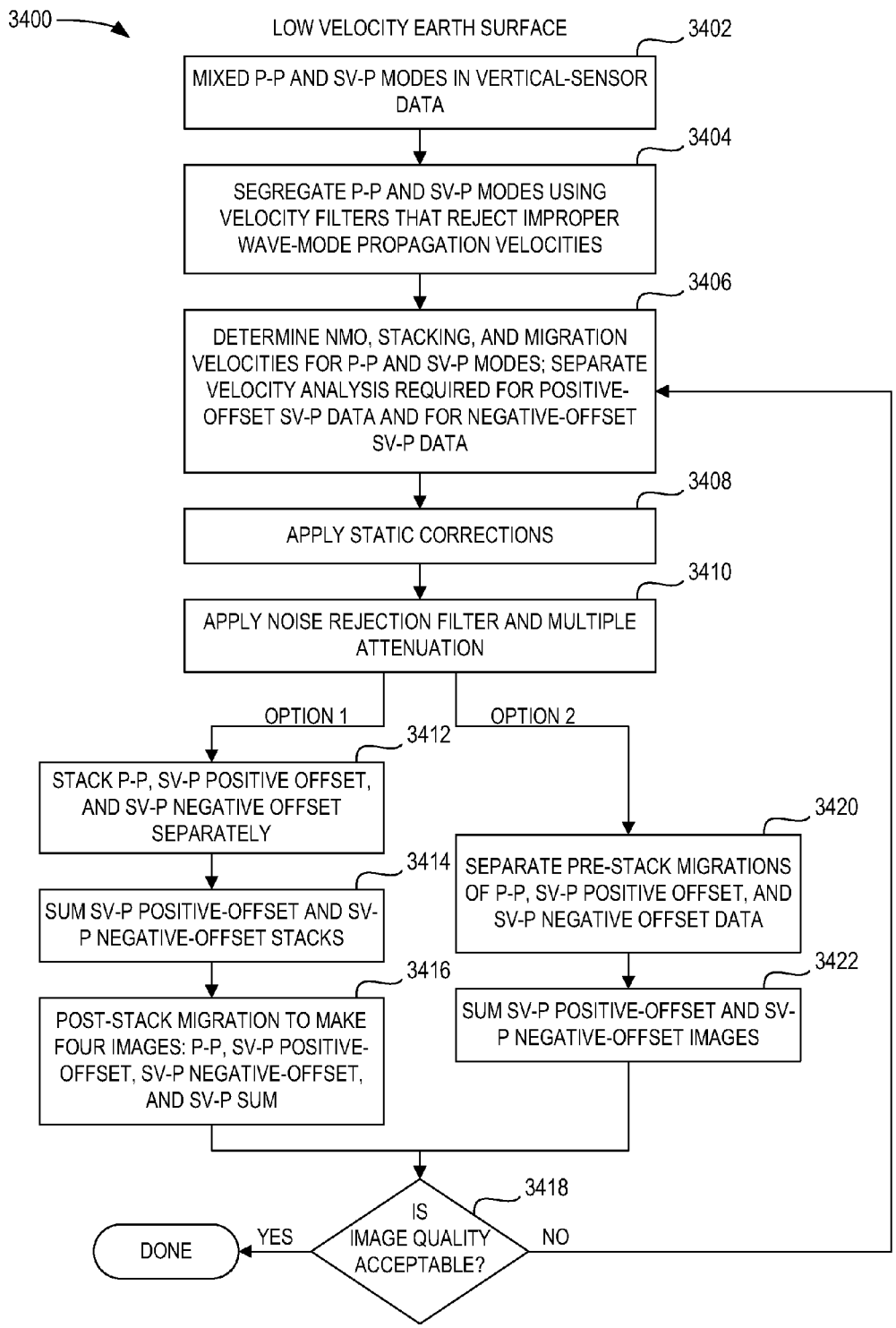
FIG. 34 is a flow diagram illustrating a method of processing shear wave data from a vertical receiver in a situation involving a low-velocity Earth surface, according to an exemplary embodiment.

Referring now to FIG. 34, a flow diagram illustrating a method 3400 of processing vertical sensor data for low-velocity Earth surface will be described. The method may be operable on one or more processing circuits, such as digital computation system 3202. The method 3400 may use similar techniques to those described above with reference to FIG. 20, which contains further explanation of some of the processing procedures described in FIG. 34. At a block 3402, a processing circuit is provided with mixed P-P and SV-P modes in vertical-sensor data from acquisition steps described previously. At block 3404, the processing circuit is configured to or programmed to segregate, separate or otherwise remove P-P and SV-P mode data by applying velocity filters to reject or filter out improper wave-mode propagation velocities.

At a block 3406, the processing circuit is configured to determine NMO, stacking and/or migration velocities for P-P and SV-P modes. Separate velocity analyses should be done for positive-offset SV-P data and for negative offset SV-P data. The processing circuit performs separately velocity analyses for positive-offset data and negative-offset data to determine how the magnitudes of interval velocities differ in these two offset domains. If there is no lateral variation in P and SV velocities around a source station, there is no need to do two separate SV-P velocity analyses—one velocity analysis for positive-offset data, and a second velocity for negative-offset data. In such a simple, uniform-velocity Earth, positive-offset SV-P reflections and negative-offset SV-P reflections have the same velocity curvatures, and a velocity analysis done in one offset domain can be used for the opposite-azimuth offset domain. However, it is rare for there to not be lateral variations in P and SV velocities around a source station as illustrated on FIG. 27. When layer velocities vary laterally for any reason, positive-offset and negative-offset SV-P data should undergo separate velocity analyses as previously discussed using FIG. 27. To ensure lateral velocity variations are accounted for, converted-mode data are processed as two separate data sets. One data set involves only positive-offset data, and the second data set involves only negative-offset data. Velocity filtering may be done separately for positive-offset data and negative-offset data to determine offset dependent interval velocities that can be used to image SV-P data. Velocity filtering may be done separately for positive-offset data and negative-offset data to output SV-P reflection data corresponding to the calculated SV-P velocities. The velocities used in some embodiments are the magnitudes of interval velocities and average velocities needed to stack and/or migrate SV-P data. These velocities may have no algebraic sign.

At a block 3408, static corrections are applied to improve reflector alignment. These corrections involve time shifts of data acquired at each source and receiver station. Because these time shifts are applied to an entire data trace, they are termed static corrections to differentiate them from dynamic time adjustments done by other processes. One static correction removes timing differences caused by variations in station elevations by adjusting time-zero on each data trace to mathematically move all source and receiver stations to a common datum plane. A second static correction removes timing differences cause by different velocities being local to different source and receiver stations. The end result of these static corrections is an improvement in reflection continuity.

At a block 3410, any one of many noise rejection procedures may be applied to the data to improve the signal-to-noise ratio. Some noise rejection options may be simple frequency filters. Others may be more sophisticated tau-p, f-k, or deconvolution procedures. At block 3410, multiple attenuation may be applied to attenuate noise attributable to multiples.

As described, multiple methods are available for processing the data to identify SV-P mode data and use it for generating an image, such as Method 1 and Method 2 described above. If Method 1 is used, at a block 3412, the processing circuit is configured to stack (or sum) P-P, SV-P positive-offset and SV-P negative-offset data separately using either CCP coordinates or ACP coordinates. At a block 3414, the processing circuit is configured to sum SV-P positive-offset and SV-P negative offset stacks. Block 3414 may use a CCP binning process. At a block 3416, the processing circuit is configured to migrate post-stack data to make four images: a P-P image, an SV-P positive offset image, an SV-P negative-offset image and an SV-P summed image.

If Method 2 is used, at a block 3420, the processing circuit is configured to do separate pre-stack time migrations, depth migrations, or reverse-time migrations of P-P, SV-P positive offset data and SV-P negative-offset data and, at a block 3422, sum SV-P positive-offset and SV-P negative-offset images.

At block 3418, an operator views the images created by either or both of Method 1 and Method 2 and makes a determination as to whether the image quality is acceptable. If not, the process returns, for example to block 3406 for further processing. An operator may adjust static corrections, recalculate velocities, etc. Alternatively, block 3418 may be automated to not require a person to make the determination, but rather to have the processing circuit make the determination based on certain image goals.

Data Processing in High-Velocity Earth Surface

Figure 35:
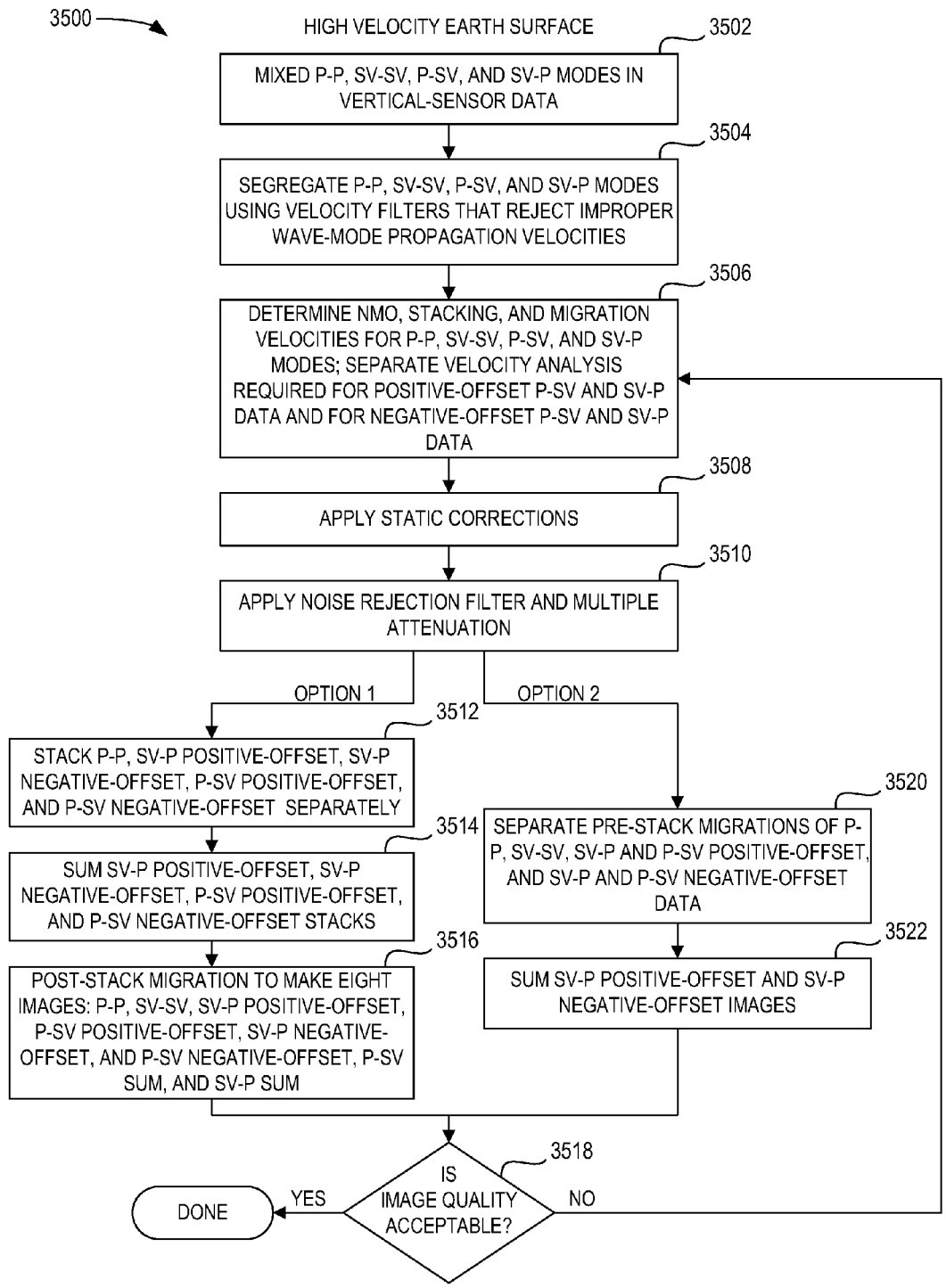
FIG. 35 is a flow diagram illustrating a method of processing shear wave data from a vertical receiver in a situation involving a high-velocity Earth surface, according to an exemplary embodiment.

Referring now to FIG. 35, a flow diagram illustrating a method 3500 of processing vertical sensor data for high-velocity Earth surface will be described. The method 3500 may use similar techniques to those described above with reference to FIGS. 20 and 34, which contains further explanation of some of the processing procedures described in FIG. 35. As explained previously, in high-velocity Earth surface situations, upgoing SV data can be detected by a vertical-force source, meaning that the data that can be processed into images now includes the SV-SV mode and the P-SV mode.

At a block 3502, a processing circuit is provided with mixed P-P, SV-SV, P-SV and SV-P modes in vertical-sensor data from acquisition steps described previously. At block 3504, the processing circuit is configured to or programmed to segregate, separate or otherwise remove P-P, SV-SV, P-SV and SV-P mode data by applying velocity filters to reject or filter out improper wave-mode propagation velocities.

At a block 3506, the processing circuit is configured to determine NMO, stacking and/or migration velocities for P-P, SV-SV, P-SV and SV-P modes. Separate velocity analyses are required for positive-offset P-SV and SV-P data and for negative offset P-SV and SV-P data.

At a block 3508, static corrections are applied to improve reflector alignment, as described with reference to block 3408. At a block 3510, any one of many noise rejection procedures may be applied to the data to improve the signal-to-noise ratio. Some noise rejection options may be simple frequency filters. Others may be more sophisticated tau-p, f-k, or deconvolution procedures. At block 3510, multiple attenuation may be applied to reduce noise attributable to multiples.

As described, multiple methods are available for processing the data to identify SV-P mode data and use it for generating an image, such as Method 1 and Method 2 described above. If Method 1 is used, at a block 3512, the processing circuit is configured to stack (or sum) P-P, SV-P positive-offset and SV-P negative-offset data and P-SV positive-offset data and P-SV negative-offset data, each to be stacked separately. At a block 3514, the processing circuit is configured to sum SV-P positive-offset and SV-P negative offset stacks and separately sum P-SV positive-offset and P-SV negative-offset stacks. At a block 3516, the processing circuit is configured to migrate post-stack data to make eight images: a P-P image, an SV-P positive offset image, an SV-P negative-offset image, an SV-SV image, a P-SV positive offset image, a P-SV negative offset image, P-SV summed image and an SV-P summed image.

If Method 2 is used, at a block 3520, the processing circuit is configured to do separate pre-stack time migrations, depth migrations, or reverse-time migrations of P-P, SV-SV, SV-P and P-SV positive offset data and SV-P and P-SV negative-offset data and, at a block 3522, sum SV-P positive-offset and SV-P negative-offset images.

At block 3518, an operator views the images created by either or both of Method 1 and Method 2 and makes a determination as to whether the image quality is acceptable. If not, the process returns, for example to block 3506 for further processing. An operator may adjust static corrections, recalculate velocities, etc. Alternatively, block 3518 may be automated to not require a person to make the determination, but rather to have the processing circuit make the determination based on certain image goals.

As illustrated in a comparison of FIGS. 20, 34 and 35, it is not necessary in the methods of FIGS. 34 and 35 to change the polarity of negative-azimuth SV-P data to agree with the polarity of positive-azimuth SV-P data when dealing with vertical-sensor data. Also, two separate velocity analyses are performed when processing SV-P data as in the methods of FIGS. 34 and 35 because that imaging is based on common-conversion point concepts, not on common-midpoint concepts as used in the methods of FIG. 20. In the methods of FIGS. 34 and 35, one velocity analysis is done for positive-azimuth data and a second analysis is done for negative-azimuth data (as explained with reference to FIG. 27).

Extracting Shear Wave Information from Towed Cable Marine Seismic Data

According to one or more embodiments, S-wave information can be extracted from towed-cable marine data when certain data-processing steps are implemented by a data processor.

In some embodiments, a single-component compressional P wave sensor is used as a receiver to receive both P-P and SV-P modes.

In some embodiments, multi-component sensors are not needed.

In some embodiments, the single-component compressional P wave sensor is disposed in the water well above the sea floor, within the water column, for example being towed behind a boat. The single-component compressional P wave sensor may be similarly disposed. In some embodiments, neither the P wave source nor P wave receiver are disposed on, in contact with, or within the seafloor.

In some embodiments, an SV-P mode is sensed in a marine environment and processed to generate a visual image of one or more formations beneath the sea floor.

In some embodiments, a virtual source and/or virtual receiver are used in the acquisition of the seismic data, wherein the virtual source or receiver is computationally derived from data from an actual source or receiver, respectively.

In some embodiments, a single-component or one-component P wave source towed by a boat generates a downgoing P wave which upon contact with the seafloor generates a downgoing SV shear wave mode directly at the point of contact of the P wave with the seafloor, at the seafloor surface. In some embodiments, this downgoing SV mode is not a converted shear mode created by reflections of a downgoing P mode off formations below the sea floor, but is instead an SV mode generated directly at the point of contact of the P wave with the seafloor.

In some embodiments, image processing is based on towed-cable marine data in which there are no receivers other than those in the towed cable.

Marine Seismic Sources

Marine seismic data are generated by towing a seismic source below the sea surface. Although some seismic sources, primarily shear-wave generators, have been devised that function on the seafloor, seafloor-positioned sources are generally not used to generate seismic reflection data because of deployment challenges and environmental regulations that protect seafloor biota. Thus, marine seismic data acquisition typically involves sources that can be towed at a desired depth below the sea surface (e.g., 3 to 15 meters or other depths).

One energy source that may be used in marine environments is a towed air gun. Air gun sources can be a single air gun, an array of air guns, or several arrays of air guns with each array containing numerous air guns. Sources other than air guns can be encountered when legacy marine data are considered. Among source types that may be used to acquire marine seismic data are vibrators, explosives, sparkers, and various mechanisms that produce impulsive wavelets in the water column. The embodiments described herein may use any types of source, such as towed sources, used to generate marine seismic reflection data.

Marine Seismic Sensors

Marine seismic data may be recorded by towing an array of hydrophones below the sea surface. These hydrophones are embedded in one or more long cables that trail behind a seismic recording boat. Geophones and/or accelerometers are used in some towed-cable systems. Marine seismic data can also be acquired with stationary sensors placed on the seafloor. Stationary seafloor sensors typically involve combinations of hydrophones and geophones or combinations of hydrophones and accelerometers. The embodiments described herein may use any type of sensor, such as towed-cable sensors, whether the sensors comprise hydrophones, geophones, accelerometers, etc.

Virtual Sources and Receivers

Figure 38:
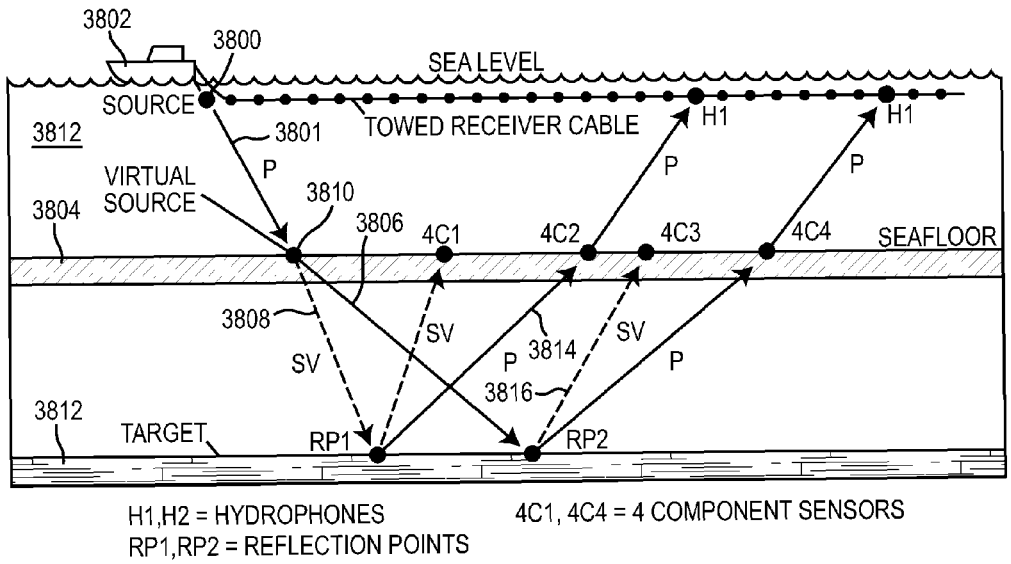
FIG. 38 is a schematic diagram of equipment used in marine seismic data acquisition and raypaths of seismic modes, according to an exemplary embodiment.

Referring now to FIG. 38, a diagram illustrates exemplary components of a marine seismic data-acquisition system and raypaths of compressional (P) and vertical shear (SV) seismic modes generated during seismic illumination of sub-seafloor geology. P-wave raypaths are shown as solid lines. S-wave raypaths are shown as dashed lines. A source 3800 is towed by a boat 3802. Only P waves propagate in the water layer because water has a shear modulus of zero and cannot support shear-mode propagation. When the downgoing P mode 3800 produced by a marine energy source impinges on the seafloor 3804 at any incident angle other than true vertical, two downgoing modes—a P mode 3806 and an SV mode 3808—are created at the seafloor interface 3804 and continue to propagate downward and illuminate sub-seafloor targets, such as target 3812. The downgoing P raypath 3800 in the water layer 3812 originates at a real seismic source 3800. The origin point 3810 of the downgoing SV raypath at the seafloor is a virtual seismic source. The acquisition and processing described herein exploits the downgoing SV mode 3808 produced at virtual-source coordinates along seafloor 3804.

The embodiment of FIG. 38 may use any type of towed marine energy sources, any type of seismic sensors, and may use sensor stations that are towed in the water layer and/or stationary sensors on the seafloor.

Figure 39:
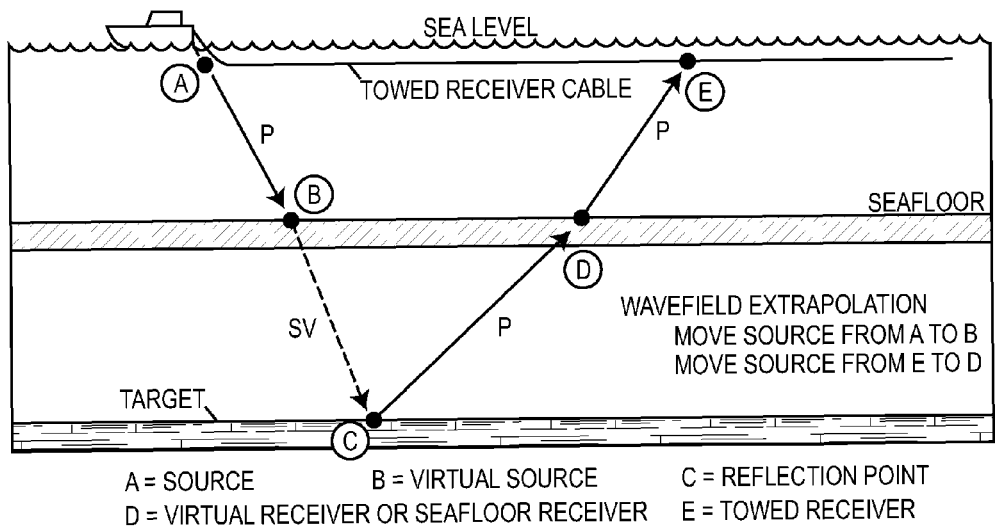
FIG. 39 is a schematic diagram illustrating raypaths associated with a virtual seafloor source and a virtual seafloor receiver, according to an exemplary embodiment.

Referring now to FIG. 39, a simplified version of the diagram of FIG. 38 illustrates the wave physics of exemplary embodiments.

A is the real seismic source where a downgoing P wave is generated.

B is the position of the virtual source on the seafloor where, by downward wavefield extrapolation, the downgoing P wave from source A segregates into downgoing P and SV transmitted wave modes and an upgoing P reflected mode. The upgoing P reflection from seafloor coordinate 3810 is not shown.

C is a reflection point from a sub-seafloor target where the downgoing SV from virtual source B creates an upgoing P reflection event, as described herein with reference to, for example, FIGS. 21 through 25, 27, etc.

D is the position of a virtual receiver created when the upgoing P reflection recorded by towed-sensor E is projected downward to the seafloor by wavefield extrapolation, as will be described below.

E is a real, towed receiver that records the upgoing P reflection from target point C.

Downward Wavefield Extrapolation

As illustrated in FIG. 39, real source A generates a downgoing P wave that reaches the seafloor and creates a virtual source. Any coordinate along a raypath associated with a propagating seismic wave mode can be defined as the position of a virtual source or a virtual receiver for that wave mode. For this reason, the position of a virtual source in this application may be defined by downward extrapolation of a seismic wavefield from the position of an actual towed marine seismic source to a desired source-origin point on or near the seafloor, and the position of a virtual sensor may be defined by extrapolating a seismic wavefield downward from a real towed seismic receiver to a preferred location for that receiver on or near the seafloor. For an explanation of recent virtual source/receiver principles, see, for example, U.S. Pat. No. 7,706,211 to Bakulin et al. titled "Method of Determining a Seismic Velocity Profile" and U.S. Patent Application Publication No. 2010/0139927 published Jun. 10, 2010 to Bakulin et al. titled "Method of Imaging a Seismic Source Involving a Virtual Source, Methods of Producing a Hydrocarbon Fluid, and a Computer Readable Medium." Similarly, the SV-P wave from virtual source B is received at point D, which may be a virtual receiver. Point D becomes a virtual receiver by way of wavefield extrapolation processing. Downward wavefield extrapolation may be used to transform data generated by a real source and recorded by a real receiver to data equivalent to that generated by a deeper source and recorded by a deeper receiver. In this manner, virtual sources and virtual receivers may be computationally, numerically, or mathematically created, though in alternative embodiments other techniques may be used.

Downward wavefield extrapolation is used for wave-equation migration of seismic data, whether migration is done in the depth domain or in the image-time domain. In one embodiment, wavefield extrapolation may be implemented as described in Wapenaar, C. P. A., and A. J. Berkhout, 1989, Elastic wavefield extrapolation—redatuming of single- and multi-component seismic data: Elsevier Science, 468 pages. The principles of wavefield extrapolation and computational procedures used to perform the data transformations described in Wapenaar may be used in an exemplary embodiment. The processing of waveforms may comprise redatuming sources and receivers, and redatuming that applies to S wavefields as well as P wavefields. In another embodiment, the wavefield extrapolation process of U.S. Pat. No. 7,035,737 to Ren, J., 2006, Method for seismic wavefield extrapolation, may be used. The portions of this patent describing how to do wavefield extrapolation using a variable extrapolation step size followed by phase-shifted linear interpolation of the extrapolated wavefield are expressly incorporated herein by reference. Alternative methods and procedures of wavefield extrapolation may be used in one or more of the embodiments described herein, and reference to wavefield extrapolation herein is not to be construed as limiting to any particular method or algorithm.

According to some embodiments, wavefield extrapolation may refer to any process by which the downgoing, P-only, wavefield produced by a towed marine seismic source is computationally or numerically replaced by downgoing P and SV wavefields produced by a virtual source at an interface illuminated by the downgoing, real-source, P-wavefield. Wavefield extrapolation may also refer to any process by which the upgoing, P-only wavefield received at towed receiver E is computationally replaced by virtual receiver D on the seafloor. In one embodiment, the interface where a virtual source should be computationally positioned is the seafloor. However, according to an exemplary embodiment, a virtual source could be computationally positioned below the seafloor or even above the seafloor as long as the medium below the source station physically has, or is numerically assigned, a non-zero shear modulus that will allow a downgoing SV mode to propagate.

Referring to FIG. 39, downward wavefield extrapolation is used in this embodiment to migrate data generated by real towed-source A and recorded by real towed-receiver E downward so that the data are transformed to data that would have been generated by virtual-source B on the seafloor and recorded by virtual-receiver D also on the seafloor.

Marine Shear Waves

An example of a P-SV reflection is shown on FIG. 38 by the downgoing P raypath 3806 from the towed source that converts to an upgoing SV raypath 3816 at reflection point RP2. Because S-waves cannot propagate in water, this upgoing SV mode must be recorded by a multicomponent sensor, preferably a 4-component (4C) sensor package that has horizontal geophones or accelerometers and is deployed on the seafloor at position 4C3.

According to one embodiment, a system and method involves acquiring and processing an SV-P mode in a marine seismic application, which is an event comprising a downgoing SV raypath produced at the virtual seafloor source position 3810 that converts to an upgoing P raypath at reflection point RP1. In FIG. 38, the SV-P mode is illustrated for example by SV raypath 3808 and P raypath 3814. An SV-P mode is the inverse of the P-SV mode utilized by marine geophysicists. Because this upgoing P raypath extends upward to towed sensor H1, SV-P data are embedded in conventional towed-cable marine data (e.g., legacy data). No seafloor sensor is required to capture SV-P data, although the technology applies if seafloor sensors are used rather than towed-cable sensors.

Positive-Offset and Negative-Offset Data

Figure 40:
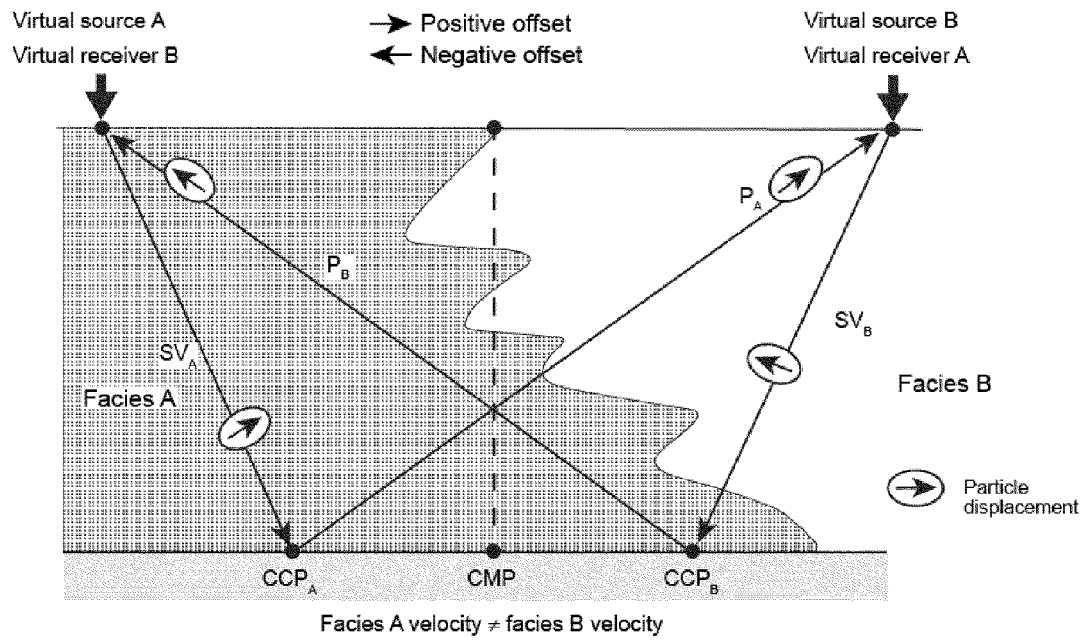
FIG. 40 is a diagram of a subsurface geology illustrating positive-offset and negative-offset domains for SV-P data and Facies A and B causing different velocities, according to an exemplary embodiment.

Raypaths involved in positive-offset and negative-offset marine SV-P imaging are illustrated on FIG. 40. $V_P$ and $V_S$ velocities in Facies A are different than they are in Facies B. Straight raypaths are drawn for simplicity.

In this diagram, SV-P data generated at virtual source A and recorded at virtual receiver A are labeled $SV_A$ for the downgoing SV mode and $P_A$ for the upgoing P mode. The offset direction from virtual source A to virtual receiver A is arbitrarily defined as positive offset. When the positions of source and receiver are exchanged, creating virtual source B and virtual receiver B, the source-to-receiver offset direction reverses and is defined as negative offset. The raypath for negative-offset SV-P data is labeled $SV_B$ for the downgoing SV mode and $P_B$ for the upgoing P mode. The polarities shown for the downgoing SV particle-displacement vector conform to the polarity convention established by Aki and Richards (1980) and documented by Hardage et al. (2011). Note that for both positive-offset data and negative-offset data, the vertical component of the particle-displacement vectors for the upgoing P modes are in the same direction (pointing up), hence there is no change in SV-P data polarity between positive-offset data and negative-offset data.

Figure 41:
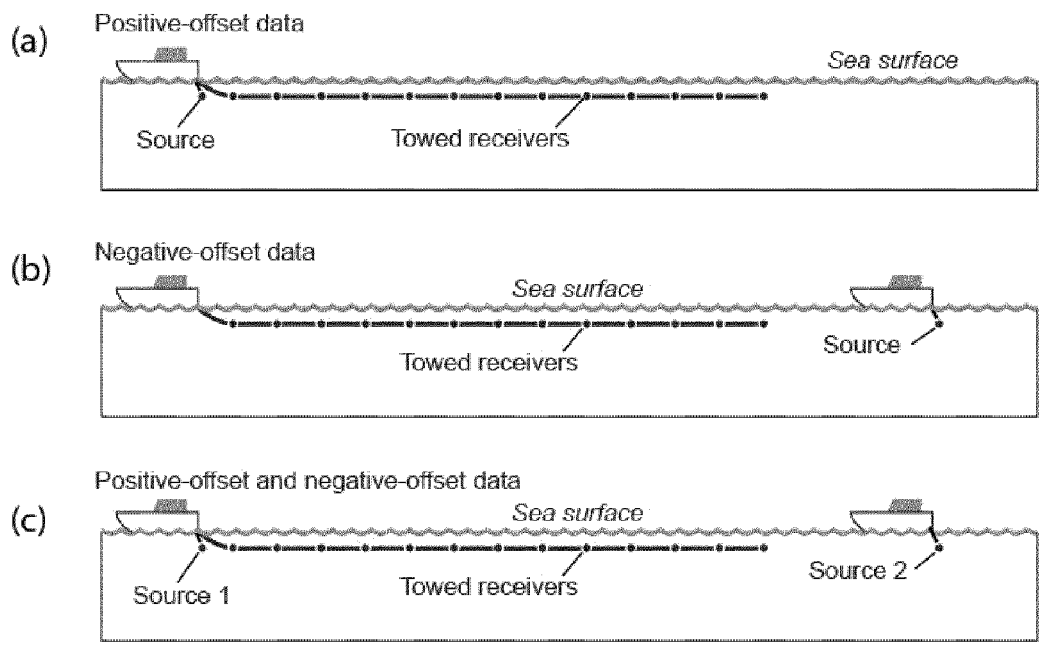
FIG. 41 is a diagram illustrating (a) positive-offset marine data, (b) negative-offset marine data, and (c) a combination of positive-offset and negative-offset marine data, according to an exemplary embodiment.

The consideration of positive-offset and negative-offset data is used in land-based seismic data acquisition where receivers extend in all azimuths away from a source point. The possibility of positive-offset and negative-offset data is also considered for marine seismic data. Most towed-cable marine seismic data involve only positive-offset data because the source is usually positioned in front of the receiver cable (FIG. 41 at (a)). However, a source could be attached to a separate boat trailing at the rear of a towed receiver cable (FIG. 41 at (b)). In such a case, the data would be negative-offset data. In modern marine surveys, source boats often precede and trail towed cables as shown on FIG. 41 at (c), and the recorded data then involve both positive-offset and negative-offset data.

SV-P Velocity Analysis

One or more embodiments described herein may comprise performing a velocity analysis as a data-processing step when constructing seismic images. When converted modes are involved, two velocity analyses can be done—one analysis for positive-offset data and a second analysis for negative-offset data. The reason for this dual-offset-domain velocity analysis is illustrated on FIG. 40 which shows two distinct rock facies A and B between two source and receiver stations. Laterally varying rock conditions such as shown on this diagram are found in many marine basins. For purposes of illustration, assume the P and S velocities in Facies A are significantly different from the P and S velocities in Facies B. The travel time required for a positive-offset SV-P event to travel raypath $SV_A$-$P_A$ is not the same as the travel time for a negative-offset SV-P event to travel raypath $SV_B$-$P_B$. This difference in travel time occurs because the $SV_A$ mode is totally in Facies A, but the $SV_B$ mode is almost entirely in Facies B, Likewise, all of mode $P_B$ is in Facies A, but mode $P_A$ has significant travel paths inside both Facies A and Facies B. Because travel times differ in positive-offset and negative-offset directions, seismic interval velocities determined from positive-offset data differ from interval velocities determined from negative-offset data. Thus, in some embodiments, one velocity analysis is done on positive-offset data, and a separate velocity analysis is done for negative-offset data.

Figure 42:
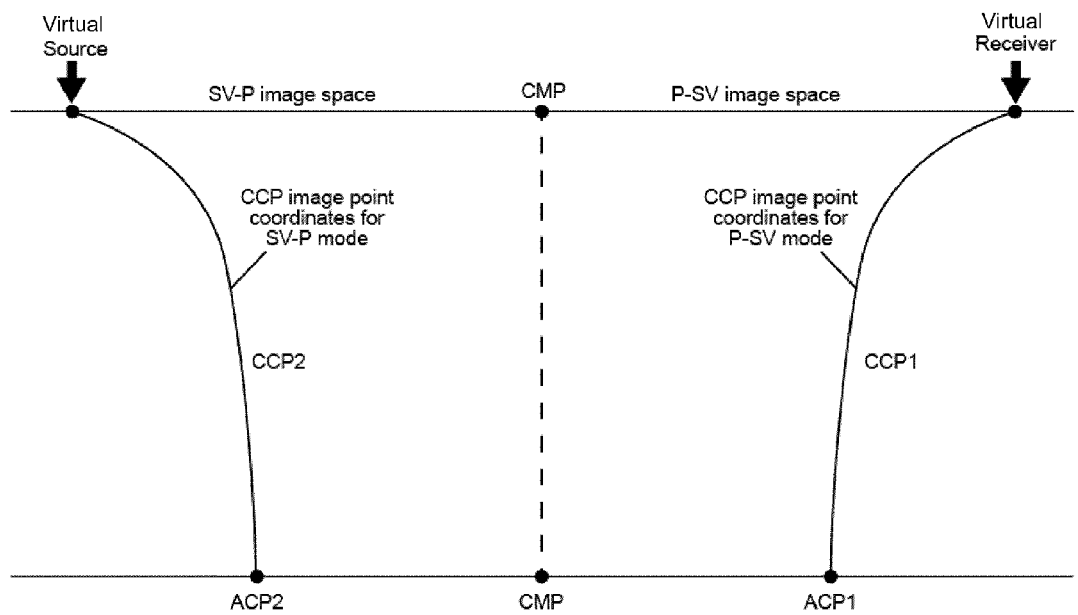
FIG. 42 illustrates SV-P and P-SV CCP imaging principles, according to an exemplary embodiment.

FIG. 42 illustrates SV-P and P-SV CCP imaging principles. Curve CCP1 shows the trend of common-conversion points for P-SV data. Curve CCP2 shows the trend of common-conversion points for SV-P data. ACP1 and ACP2 are asymptotic conversion points for trends CCP1 and CCP2, respectively. CCP1 and CCP2 are mirror images of each other relative to the common midpoint CMP for this source-receiver pair.

Constructing SV-P Images

The processing of SV-P data for generating SV-P images can be done in a number of ways, such as: (1) by common-conversion-point (CCP) binning and stacking of SV-P reflections, followed by post-stack migration of the stacked data, or (2) by implementing prestack migration of SV-P reflections. Method 2 (prestack migration) is a more rigorous approach; method 1 (CCP binning/stacking and post-stack migration) is lower cost. To perform CCP binning and migration of SV-P data, CCP coordinates of SV-P image points relative to this common-midpoint between a source and a receiver are mirror images of CCP image points associated with P-SV data, as illustrated on FIG. 42. The SV-P data-processing strategy may be based on this mirror-image symmetry of CCP image-point profiles for P-SV and SV-P modes.

Because positive-offset and negative-offset SV-P data have different velocity behaviors, two separate CCP binning/stacking steps are done to create an SV-P stacked image. In Step 1, positive-offset data are binned and stacked into an image using velocities determined from positive-offset data, and in Step 2, negative-offset data are binned and stacked into a second image using velocities determined from negative-offset data. The final SV-P image is the sum of these two images. This same dual-image strategy may implemented when binning and stacking P-SV marine data. The three stacked images (positive-offset, negative-offset, and summed offsets) can be migrated and used in geological applications. As documented by Hardage et al. (2011) relative to P-SV imaging, some geologic features are sometimes better seen in one of these three images than in its two companion images. Thus all three stacked and migrated SV-P images may be used in geological interpretations.

Marine SV-P Data Processing: Imaging Method 1—CCP Binning, Stacking, and Post-Stack Migration Some commercial seismic data-processing software that can be purchased or leased by the geophysical community can calculate converted-mode image coordinates called asymptotic conversion points, which are abbreviated as ACP. Two examples are Vista seismic data processing software, sold by Geophysical Exploration & Development Corporation, Alberta, Canada and ProMAX seismic data processing software, sold by Halliburton Company, Houston, Tex. Such software calculates converted-mode image coordinates called asymptotic conversion points, which are abbreviated as ACP. An ACP is an image coordinate where the trend of correct CCP image points for a specific source-receiver pair becomes quasi-vertical (FIG. 42). Deep geology is correctly imaged using P-SV data binned by ACP principles, and would also be correctly imaged by SV-P data binned using ACP concepts that are adjusted for SV-P data. However, shallow geology is not correctly imaged for either P-SV data or SV-P data when ACP binning methods are used. True CCP binning can produces correct stacked images of both shallow and deep geology for converted modes appropriate for post-stack migration. On FIG. 42, the asymptotic conversion point for the P-SV mode is labeled ACP1, and the asymptotic conversion point for the SV-P mode is labeled ACP2. Neither image point is correct except where their associated CCP binning profile is quasi-vertical (i.e., for deep targets). As has been emphasized, these two image points are mirror images of each other relative to the common midpoint (point CMP on FIG. 42) for any source-receiver pair involved in a seismic survey.

One exemplary method of producing CCP or ACP binning for marine SV-P data comprises adjusting software that performs CCP binning for marine P-SV data so that the coordinates of sources and receivers are exchanged when determining image-point coordinates. Referring to the source-receiver pair drawn on FIG. 42, an exchange of station coordinates has the effect of moving the receiver station to the source station and the source station to the receiver station. Software used to process P-SV data will then calculate the image point trend labeled CCP2 rather than the trend labeled CCP1. Using coordinates specified by profile CCP2 to bin marine SV-P reflections extracted from marine towed-sensor data will produce SV-P images, which should be equal in quality to what is now achieved with marine P-SV data.

Marine SV-P Data Processing: Imaging Method 2—Prestack Migration

Figure 43:
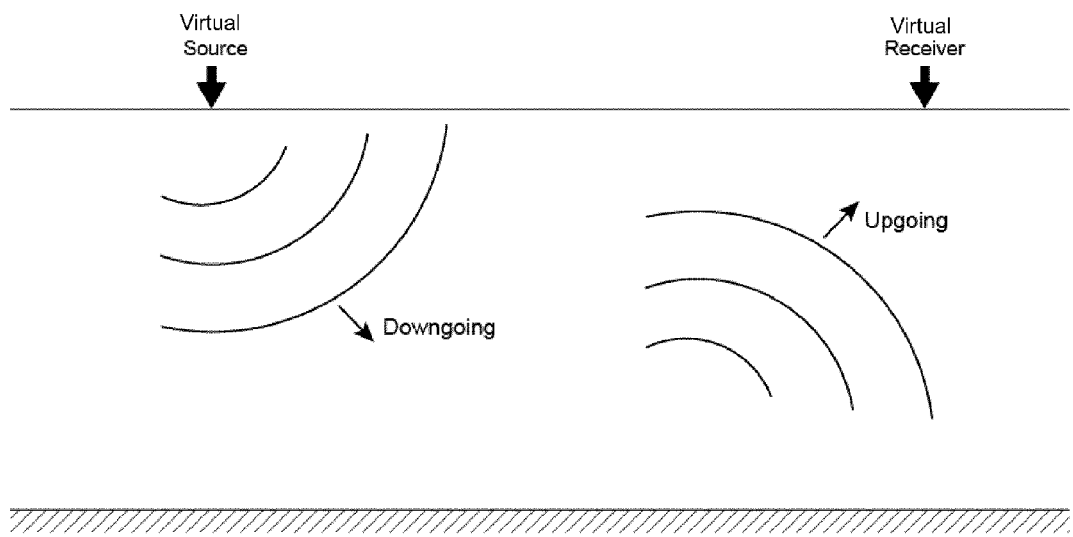
FIG. 43 illustrates a time-space distribution of velocities for each specific seismic mode, according to an exemplary embodiment.

According to an alternative embodiment, prestack migration can be done to create a time-based seismic image or a depth-based seismic image. Referring to FIG. 43, prestack migration can be done by numerically propagating a specific seismic wavefield downward from each source station to illuminate geologic targets, and then numerically propagating a specific seismic wavefield upward from reflecting interfaces to each receiver station.

The specific wavefields used in prestack migration may be created by applying velocity filters to seismic data so that reflection events having only a predetermined velocity behavior remain after velocity filtering. Velocity wavefields are listed in the table of FIG. 43. The specific velocity behaviors of interest in this exemplary embodiment are those downgoing and upgoing velocities associated with P-P and SV-P seismic modes. These modes are listed as option 1 and option 3 on FIG. 43. The result of prestack migration is an image of geologic interfaces seen by each specific seismic mode (P-P and SV-P). For simplicity, only one source station and only one receiver station are shown on FIG. 43.

As indicated by the table on FIG. 43, prestack time migration, depth migration, or reverse-time migration processing can create a SV-P image if the velocity of the downgoing wavefield is that for a propagating SV wavefield and the velocity of the upgoing wavefield is that for a P wavefield.

In FIG. 43, a time-space distribution of velocities for a specific seismic mode is defined so that a specific downgoing wavefield (D) can be propagated through this Earth velocity model from every source station to illuminate targets. A second time-space distribution of velocities for a second specific seismic mode is then imposed to propagate that specific upgoing wavefield (U) to every receiver station. The combinations of downgoing and upgoing velocities that can be implemented for towed-cable marine seismic in this exemplary embodiment involve options 1 and 3 listed in the table.

Prestack Time Migration

Prestack time migration of seismic data may be done by constructing common-source trace gathers and calculating where individual data points in each trace of each shot gather need to be positioned in seismic image space. An exemplary calculation is illustrated in FIG. 44. In this diagram, S is the position of a source station in migrated image space, R is the position of a specific receiver station in migrated image space, and A is the position of an image point that is being constructed.

The position of image point A is defined as space-time coordinates $(X_A, t)$. To perform prestack time migration, coordinate $X_A$ is defined by a data processor, and time coordinate t then is incremented from 0 to $t_{MAX}$, where $t_{MAX}$ is the length of the migrated data trace. The diagram shows the migration of only one data point from only one trace of only one shot gather. The objective is to calculate the time coordinate T of the data sample from the S-to-R data trace that needs to be placed at image-space coordinates $(X_A, t)$.

The calculation is done by the two square-root equations shown on FIG. 44 and shown below:

$$T_{SA} = \sqrt{\left(\frac{t}{2}\right)^2 + \left(\frac{D_{SA}}{V_{SA}}\right)^2}$$

$$T_{AR} = \sqrt{\left(\frac{t}{2}\right)^2 + \left(\frac{D_{AR}}{V_{AR}}\right)^2}$$

in which:
A=Image point
t=Image-trace time coordinate
$X_A$=Image-trace coordinate
$D_{SA}$=Horizontal distance from S to A
$D_{AR}$=Horizontal distance from A to R
$T_{SA}$=One-way time from S to A
$T_{AR}$=One-way time from A to R
$V_{SA}$=RMS velocity for downgoing mode at $(X_A, t)$
$V_{AR}$=RMS velocity for upgoing mode at $(X_A, t)$
$T=T_{SA}+T_{AR}$=Time coordinate of data sample placed at image coordinates $(X_A, t)$ FIG. 44 illustrates the double square root calculation used in prestack time migration of seismic data. Image coordinate $X_A$ is defined by the data processor. Image time t varies from zero to the maximum time coordinate of the migrated data. Velocities $V_{SA}$ and $V_{AR}$ are rms velocities determined by a separate velocity analysis and preserved in a file that can be accessed to calculate time coordinate T of the data sample that needs to be moved to image coordinate at (XA, t).

One square-root equation calculates one-way time $T_{SA}$ for the downgoing raypath from S to A. The second square-root equation calculates the one-way time $T_{AR}$ for the upgoing raypath from A to R. The time coordinate T of the data sample from shot-gather trace S-to-R which needs to be placed at migration coordinates $(X_A, t)$ is the sum of $T_{SA}$ and $T_{AR}$. This prestack time-migration procedure is called the double square-root calculation. An assumption built into the calculation is that down and up one-way travel times can be represented as travel times along straight, not curved, raypaths.

Figure 45:
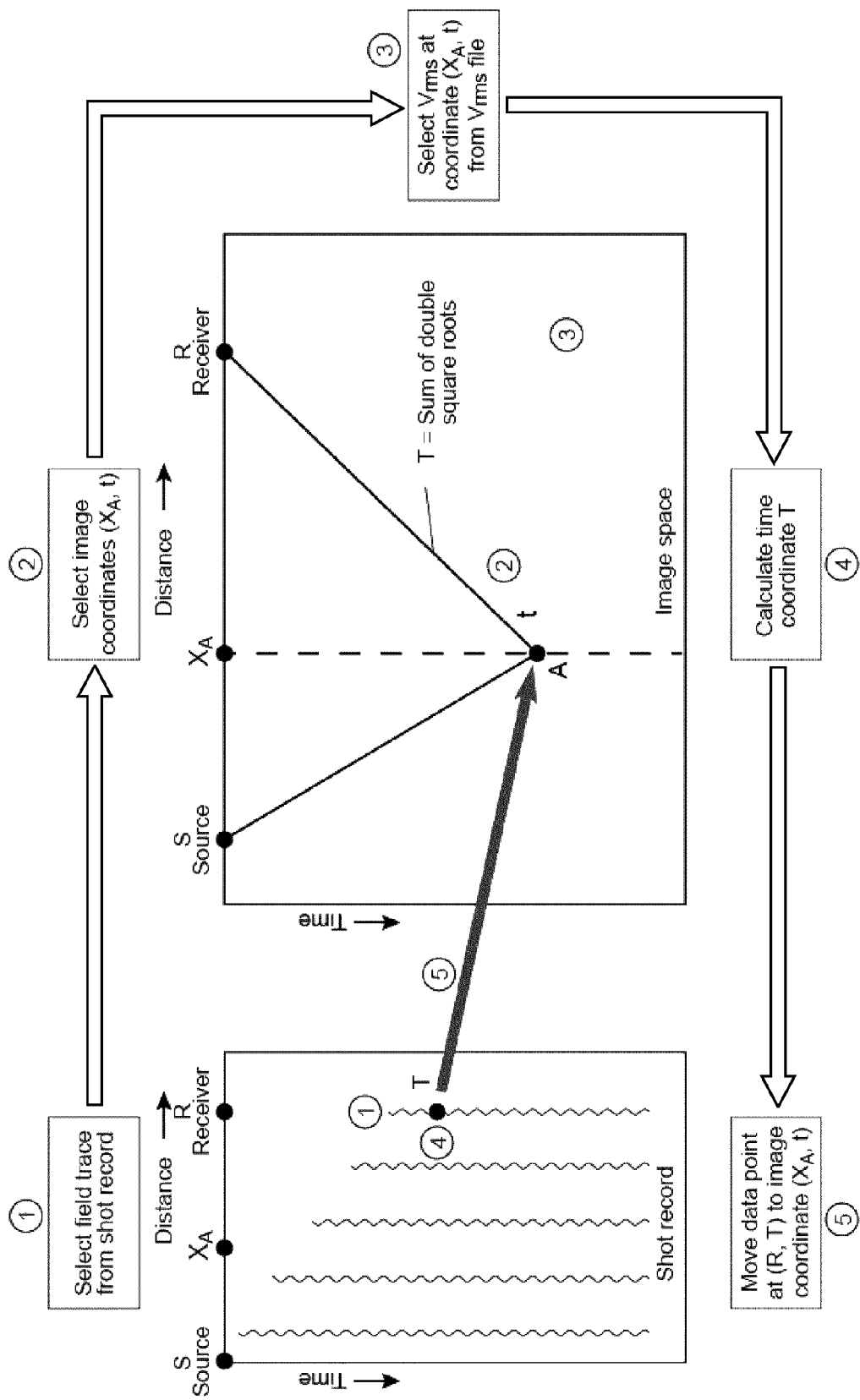
FIG. 45 is a flow diagram illustrating a process of prestack time migration, according to an exemplary embodiment.

Another view of prestack time migration is shown as FIG. 45. This diagram illustrates a process of prestack time migration, according to an exemplary embodiment. In step 1, a data processor or processing circuit is configured to select from a memory a particular data trace recorded by receiver R of a particular Shot Record for performing prestack time migration. Image coordinate $X_A$ defined by the data processor may or may not coincide with the position of a receiver station. In this example, $X_A$ is not coincident with a receiver station. In step 2, the data processor is configured to build one migrated image trace at image-space coordinate $X_A$. Image-time coordinate t is a time coordinate of this migrated data trace. Raypaths SA and AR shown relative to step 2 are the raypaths from FIG. 44.

In step 3, the data processor is configured to access from memory a velocity file that defines rms velocities at every coordinate in the migrated image space. In step 4, one-way travel times $T_{SA}$ and $T_{AR}$ defined by the square-root equations on FIG. 44 are calculated to define the time coordinate T of the input data trace that needs to be moved to image coordinates $(X_A, t)$. In step 5, the data processor is configured to move the data sample from shot-gather data space to migrated image space.

Figure 46:
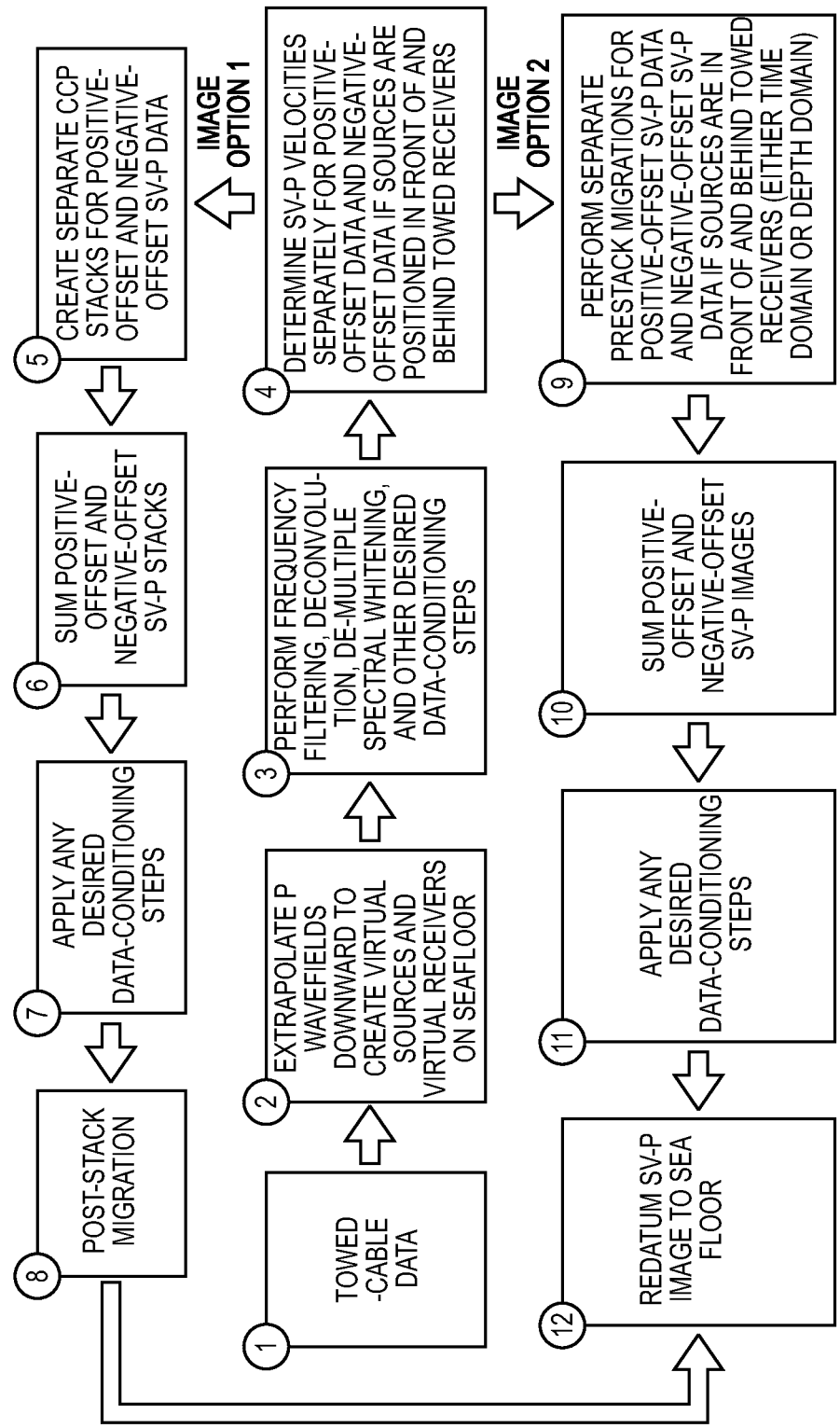
FIG. 46 is a flowchart illustrating a system and method for processing marine SV-P data, according to an exemplary embodiment.

Referring now to FIG. 46, a system and method for processing marine SV-P data is shown, according to an exemplary embodiment. This system is configured to produce (1) trace gathers, and (2) images of sub-seafloor geology that describe S-wave propagation through imaged strata. At block 1, towed-cable seismic data are retrieved from a storage device or memory. The seismic data may have been acquired using any of the processes described herein, such as those described with reference to FIGS. 38, 39 and/or 41. As stored in the storage device, the seismic data may comprise P-P data as well as shear mode data, such as SV-P data, said P-P and SV-P data having been received through a towed receiver or other sensor configured to measure compressional P waves to generate the seismic data.

At block 2, the data processor is configured to extrapolate the P wavefields of the seismic data downward to create virtual sources and virtual receivers on the seafloor, for example as described above with reference to FIG. 39. At block 3, the data processor is configured to perform data conditioning steps, such as frequency filtering, deconvolution, de-multiple, spectral whitening and/or other data conditioning processes that adjust the appearance of seismic data. Deconvolution may refer to a numerical process that restores the shape of a seismic wavelet to the shape it had before it was distorted by interfering wavelets or by any phase and amplitude changes caused by sensor responses, equipment filtering, background noise, etc. De-multiple may refer to a numerical process that removes interbed multiple reflections from seismic data. De-multiple is one type of deconvolution, i.e., the removal of interfering wavelets. Spectral whitening may refer to a process of adjusting the frequency spectrum of a seismic wavelet so that the spectrum is as flat as possible over the widest possible frequency range. Wide, flat spectra result in compact time wavelets that have optimal resolution. At block 4, the data processor is configured to determine SV-P velocities separately for positive-offset data and negative-offset data if the sources were positioned in front of and behind towed receivers during the acquisition of the data being processed, as described for example with reference to FIGS. 40 and 41 herein.

As described above, two illustrative image processing methods are described herein, though others may be used. In a first imaging option, at block 5, the data processor is configured to create separate CCP stacks for positive-offset and negative-offset SV-P data. At block 6, the data processor may be configured to sum the positive-offset and negative-offset SV-P stacks. At block 7, the data processor may be configured to apply any desired data conditioning steps, such as those described above with reference to block 3. At block 8, the data processor is configured to migrate post-stack data to make SV-P and P-P images.

If the second imaging option is used, at block 9 the data processor is configured to perform separate prestack migrations for positive-offset SV-P data and negative-offset SV-P data if sources are in front of and behind towed receivers (either time domain or depth domain). At block 10, the data processor is configured to sum positive-offset and negative-offset SV-P images. At block 11, the data processor is configured to apply any desired data-conditioning steps.

Once an image is made by either image processing option 1 or image processing option 2, that image is difficult to compare against normal towed-cable image because the image uses the seafloor (or near seafloor) as a datum (datum=depth where seismic image time is defined to be zero). In contrast, towed-cable images use sea level as a datum. The images look significantly different when the seafloor has considerable slope or topographic relief. Thus the seafloor datum image can be re-datumed to sea level so image comparisons are easier to do, as shown at block 12. This re-datuming may comprise a time shift of each trace that accounts for the two-way P-wave travel time through the water layer to the seafloor coordinate where each trace is positioned in SV-P image space. The SV-P image was created by stripping off the water layer. After SV-P imaging is completed, the processing can then add the water layer back into the picture.

SV-P Data Acquisition

Figure 47:
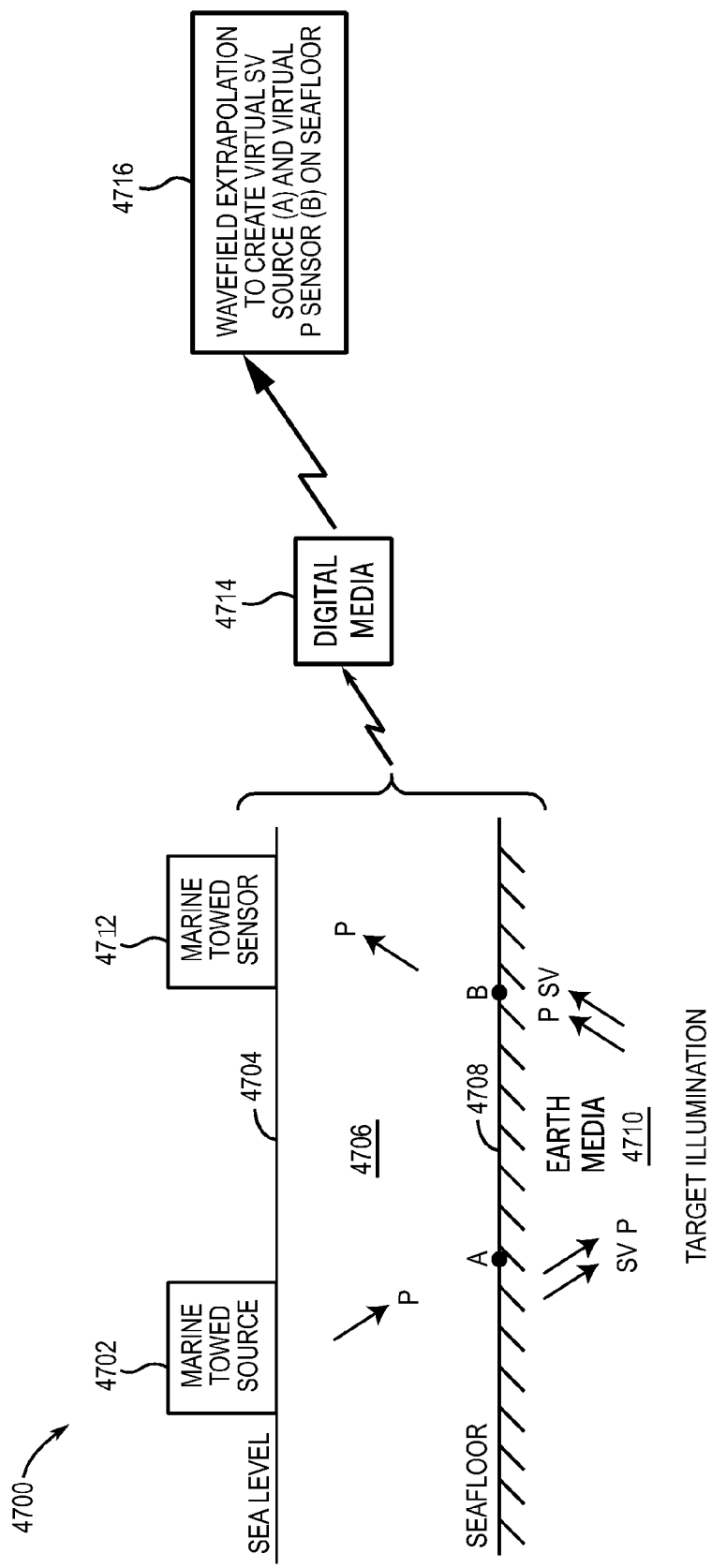
FIG. 47 is a system diagram illustrating a system for acquisition and processing of marine SV-P data, according to an exemplary embodiment.

Referring now to FIG. 47, a diagram of a data acquisition system 4700 and method for acquiring SV-P data in a marine environment will be described. A marine towed source 4702 is disposed under, near, or about a surface of a marine environment, near sea level 4704. Source 4702 is towed by a boat while in operation, while transmitting compressional P waves into the water column 4706. Source 4702 is configured to impart an impulsive force to water column 4706 to provide seismic waves to point A on a seafloor 4708. Source 4702 may comprise an air gun or other impulsive or swept-frequency force sources. In this example, source 4702 produces compressional P mode, but not shear modes (SH and SV) because the shear modulus of water is zero. However, upon contact, encounter, or impingement of the P mode wavefield with seafloor 4708 at point A, a downgoing P and a downgoing shear wave mode (SV) is produced. In this embodiment, at least some of the SV shear waves are generated at point A and not by sub-seafloor mode conversion at sub-seafloor interfaces within Earth media 4710.

A seismic sensor 4712, in this case a marine towed sensor, is towed by a boat attached to the sensor by a cable, which also may be disposed under, near, or about a surface of the marine environment at sea level 4704. Sensor 4712 is configured to detect or sense upgoing wavefields, reflected from subsurface sectors, formations, targets of interest, etc. within Earth media 4710 to point B. Upgoing waves within Earth media 4710 comprise P-P waves (P waves downgoing from point A and upgoing to point B) and upgoing SV waves (both SV-SV waves and P-SV waves). The upgoing SV waves cannot propagate through water column 4706 to marine towed sensor 4712 and, therefore, only the upgoing P waves reach marine towed sensor 4712. In this embodiment, sensor 4712 comprises a sensor configured to sense compressional P modes and, as described herein, other modes such as SV-P (e.g., direct SV-P). In one embodiment, sensor 4712 is a hydrophone, which may be configured to provide an output which has no directional information about the waves being sensed. Various arrays and configurations of sources 4702 and sensors 4712 may be implemented in different embodiments. Towed sources and receivers may be in constant motion throughout the acquisition of seismic data.

In alternative embodiments, marine towed source 4702 and/or marine towed sensor 4712 may instead by disposed on, at, embedded within or in contact with seafloor 4708. In this case, the sensor may be a vertical-force sensor configured to record a vertical response.

Data sensed by marine towed sensor 4712 are configured to be stored by a suitable processing circuit in a digital media or data storage device 4714, which may be any type of memory or other data storage device described herein. Block 4716 illustrates a data processor configured to perform wavefield extrapolation to create virtual SV source A and virtual P sensor B on seafloor 4708, and/or other processing steps described herein. One or more of the aspects described with reference to FIG. 17 and FIG. 33 may be used with aspects of FIG. 47 in alternative embodiments.

Determining S-Wave Velocity

To calculate either of the CCP binning profiles shown on FIG. 42, a data processor may be configured to determine S-wave velocities within the geological layering that is being imaged. If the second option of creating converted-mode images with prestack migration techniques is used, the data processor uses estimates of S-wave velocities within the rocks that are illuminated by the seismic data. Determining the S-wave velocities needed for calculating SV-P image points can be done using techniques for determining S-wave imaging velocities when processing P-SV data.

Exemplary methods for determining S-wave velocity needed for calculating converted-mode image points include: 1) using vertical seismic profile data acquired local to the seismic image area to calculate interval values of $V_P$ and $V_S$ velocities, 2) using dipole sonic log data acquired local to the seismic image space to determine $V_P$ and $V_S$ velocities, 3) combining laboratory measurements of $V_P/V_S$ velocity ratios for rock types like those being imaged with seismic-based estimates of P-wave velocities to back-calculate S-wave velocities, 4) calculating CCP binning profiles for a variety of $V_P/V_S$ velocity ratios, making separate stacks of converted-mode data for each CCP trend, and examining the series of stacked data to determine which CCP profile produces the best quality image, or other methods. These methods can be used to provide reliable S-wave velocities to use for velocity filtering to define S-wave modes, stacking, and migrating SV-P data.

It is understood that principles, steps, components, or teachings from any of the embodiments described herein may be combined with other embodiments described herein to provide yet further embodiments.

In an alternative embodiment, as taught herein, a downgoing P wave that impinges on point A on the seafloor generates both an SV shear wave mode and an SH shear wave mode. This is because the vertical component of the downgoing P wave can be viewed as a low-energy vertical force source at point A that produces the radiation patterns shown as FIG. 6. In this alternative embodiment, seafloor-based sensors, such as 4 component (4C) sensors may be used to receive a variety of upgoing wavemodes and store them in a memory for further processing.

Various embodiments disclosed herein may include or be implemented in connection with computer-readable media configured to store machine-executable instructions therein, and/or one or more modules, circuits, units, or other elements that may comprise analog and/or digital circuit components (e.g. a processor or other processing circuit) configured, arranged or programmed to perform one or more of the steps recited herein. By way of example, computer-readable media may include non-transitory media such as RAM, ROM, CD-ROM or other optical disk storage, magnetic disk storage, flash memory, or any other non-transitory medium capable of storing and providing access to desired machine-executable instructions. The use of circuit or module herein is meant to broadly encompass any one or more of discrete circuit components, analog and/or digital circuit components, integrated circuits, solid state devices and/or programmed portions of any of the foregoing, including microprocessors, microcontrollers, ASICs, programmable logic, or other electronic devices. In various embodiments, any number of sources and receivers may be used, from one to hundreds, thousands, or more.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the present disclosure as expressed in the appended claims.

What is claimed is:

1. A system for transferring processed seismic data, comprising:
    one or more geophones configured to receive reflections of seismic waves and to record direct shear wave mode data based on the seismic waves and representing seismic waves which were provided as shear waves directly at a point of application of either a vertical force source or a vertical force P wave from a remote vertical force source;
    a processing circuit configured to receive the direct shear wave mode data and to process the data to generate direct SV and direct SH images; and
    a memory device, wherein the processing circuit is configured to transfer the processed seismic data to the memory device.

2. The system of claim 1, wherein the processing circuit is configured to process the data by:
    providing polarity correction to the direct shear wave mode data to achieve horizontal shear wave mode and vertical shear wave mode data;
    segregating direct SH and direct SV modes from the seismic data;
    separately processing each of the direct SH and SV modes using at least one of a velocity analysis, a static correction, a noise rejection filter, a stacking process and a migration step; and
    generating the direct SH and direct SV images based on the separate processing.

3. The system of claim 1, wherein the geophones comprise a plurality of vertical single-component surface-based receivers configured to measure vertical movement of the Earth without co-located horizontal receivers, wherein the processing circuit is configured to:
    retrieve the seismic data from a storage device, the seismic data comprising P-P data and shear mode data comprising SV-P data, wherein the P-P data and shear mode data comprising SV-P data were both received from reflections of seismic waves which originated from at least one vertical force source and were received at the plurality of vertical single-component surface-based receivers without the presence of co-located horizontal single-component receivers and without the presence of co-located multi-component receivers;
    process the seismic data to extract the shear mode data comprising SV-P data; and
    generate a shear mode image based on the extracted shear mode data.

4. The system of claim 1, wherein the geophones comprise a plurality of towed receivers in a marine environment, the towed receivers configured to measure compressional P waves, wherein the processing circuit is configured to:
    retrieve the seismic data from a storage device, the seismic data comprising P-P data and shear mode data, wherein the P-P data and shear mode data were both received at the towed receivers without the presence of co-located horizontal single-component receivers;
    process the seismic data to extract SV-P shear mode data, wherein the processing comprises extrapolating wavefields represented by the seismic data downward to computationally create virtual sources and virtual receivers on a seafloor in the vicinity of an area imaged by the seismic data; and
    generate shear mode image data based on the extracted shear mode data using the processing circuit.

5. The system of claim 1, further comprising a network interface circuit configured to communicate with a wired or wireless network, wherein the processing circuit is configured to transfer the stored, processed seismic data over a wired or wireless network to another computing device.

6. The system of claim 1, wherein the memory device comprises at least one of a hard drive, a tape drive, a disk drive, optical disk storage, magnetic disk storage or flash memory.

\* \* \* \* \*